(12) United States Patent
Zenou

(10) Patent No.: US 11,465,173 B2
(45) Date of Patent: Oct. 11, 2022

(54) KIT AND SYSTEM FOR LASER-INDUCED MATERIAL DISPENSING

(71) Applicant: IO Tech Group LTD., London (GB)

(72) Inventor: Michael Zenou, Hashmonaim (IL)

(73) Assignee: IO Tech Group LTD., London (GB)

(*) Notice: Subject to any disclaimer, the term of this patent is extended or adjusted under 35 U.S.C. 154(b) by 149 days.

(21) Appl. No.: 16/838,245

(22) Filed: Apr. 2, 2020

(65) Prior Publication Data

US 2020/0222938 A1 Jul. 16, 2020

Related U.S. Application Data

(63) Continuation of application No. 16/173,793, filed on Oct. 29, 2018, now abandoned, which is a (Continued)

(51) Int. Cl.
*B05D 3/06* (2006.01)
*B41J 2/48* (2006.01)
(Continued)

(52) U.S. Cl.
CPC ............... *B05D 3/06* (2013.01); *B41J 2/48* (2013.01); *G02B 6/262* (2013.01); *G02B 6/3598* (2013.01);
(Continued)

(58) Field of Classification Search
CPC ........... B41J 2/455; C23C 14/28; C23C 14/04
See application file for complete search history.

(56) References Cited

U.S. PATENT DOCUMENTS

| 3,325,594 A | 6/1967 | Goldham et al. |
| 4,564,866 A | 11/1986 | Comberg |

(Continued)

FOREIGN PATENT DOCUMENTS

| EP | 0331022 | 9/1989 |
| JP | H2-34916 A | 2/1990 |

(Continued)

OTHER PUBLICATIONS

Office Action dated Jan. 6, 2021, from the Japanese Patent Office, for Japanese Patent Application No. 2019-503237 (filed Jul. 13, 2017), 18 pgs.

(Continued)

*Primary Examiner* — Lam S Nguyen
(74) *Attorney, Agent, or Firm* — Ascenda Law Group, PC

(57) ABSTRACT

The laser-induced dispensing system includes a cartridge assembly having a supply reel for supplying a foil having a light transmissive layer wound around the supply reel, and a take-up reel for taking up the foil. There is provided a coating device for coating the foil by a donor material during a motion of the foil. The laser-induced dispensing system also includes an irradiation head having optics configured for focusing a laser beam. Additionally, a controller, for controlling the cartridge assembly to establish motion of the foil, and the optics to focus the laser beam onto the foil at a location downstream of the outlet of the coating device so as to release droplets of the donor material from the foil is provided.

35 Claims, 31 Drawing Sheets

Related U.S. Application Data continuation of application No. 15/648,980, filed on Jul. 13, 2017, now Pat. No. 10,144,034.

(60) Provisional application No. 62/363,278, filed on Jul. 17, 2016.

(51) Int. Cl.
| | |
|---|---|
| *G02B 6/35* | (2006.01) |
| *G02B 6/42* | (2006.01) |
| *G02B 6/26* | (2006.01) |
| *G02B 6/028* | (2006.01) |
| *G02B 6/04* | (2006.01) |

(52) U.S. Cl.
CPC ......... *G02B 6/4206* (2013.01); *G02B 6/4214* (2013.01); *G02B 6/0288* (2013.01); *G02B 6/04* (2013.01); *G02B 6/3512* (2013.01); *G02B 6/3548* (2013.01)

(56) References Cited

U.S. PATENT DOCUMENTS

| | | | |
|---|---|---|---|
| 4,674,834 | A | 6/1987 | Margolin |
| 4,752,455 | A | 6/1988 | Mayer |
| 4,895,735 | A | 1/1990 | Cook |
| 4,970,196 | A | 11/1990 | Kim et al. |
| 4,975,729 | A | 12/1990 | Gordon |
| 5,015,064 | A | 5/1991 | Detig |
| 5,087,937 | A | 2/1992 | Frick et al. |
| 5,159,656 | A | 10/1992 | Goldstein |
| 5,170,178 | A | 12/1992 | Takayuki |
| 5,173,441 | A | 12/1992 | Yu |
| 5,292,559 | A | 3/1994 | Joyce, Jr. et al. |
| 5,492,861 | A | 2/1996 | Opower |
| 5,521,140 | A | 5/1996 | Matsuda |
| 5,725,706 | A | 3/1998 | Thoma et al. |
| 5,725,914 | A | 3/1998 | Opower |
| 5,736,464 | A | 4/1998 | Opower |
| 6,474,783 | B1 | 11/2002 | Pilossof |
| 7,245,804 | B2 | 7/2007 | Teramura |
| 9,555,644 | B2 | 1/2017 | Rogers et al. |
| 2003/0193557 | A1 | 10/2003 | Ornellas |
| 2003/0226834 | A1 | 12/2003 | Ishikawa et al. |
| 2006/0237404 | A1 | 10/2006 | Ishikkawa et al. |
| 2008/0117255 | A1 | 5/2008 | Cannon et al. |
| 2014/0160452 | A1 | 6/2014 | De Jager et al. |
| 2017/0210142 | A1* | 7/2017 | Kotler ............... C23C 14/28 |

FOREIGN PATENT DOCUMENTS

| | | | |
|---|---|---|---|
| JP | 2005-161398 | A | 6/2005 |
| JP | 2009-517084 | A | 4/2009 |
| JP | 2009-536882 | A | 10/2009 |
| JP | 2014-522128 | A | 8/2014 |
| JP | 2014-220077 | A | 11/2014 |
| KR | 10-1483387 | B | 1/2015 |
| TW | 201604296 | A | 2/2016 |
| WO | 03/101165 | | 12/2003 |
| WO | 2013/010113 | | 1/2013 |
| WO | 2013/023874 | | 2/2013 |
| WO | 2016/020817 | | 2/2016 |

OTHER PUBLICATIONS

Office Action dated Jun. 21, 2021, from the Japanese Patent Office, for Japanese Patent Application No. 2019-503237 (filed Jul. 13, 2017), 21 pgs.
The Third Office Action dated Feb. 24, 2021, from The State Intellectual Property Office of the People's Republic of China, for Chinese Patent Application No. 201780050011.2 (filed Jul. 13, 2017).
Notice of Allowance dated Aug. 16, 2018, for U.S. Appl. No. 15/648,980 (filed Jul. 13, 2017), 4 pgs.
Amendment and Response under 37 C.F.R 1.111 filed Apr. 30, 2018, for U.S. Appl. No. 15/648,980 (filed Jul. 13, 2017), 27 pgs.
Applicant Initiated Interview Summary dated Apr. 16, 2018, for U.S. Appl. No. 15/648,980 (filed Jul. 13, 2017), 3 pgs.
Non-Final Rejection dated Feb. 5, 2018, for U.S. Appl. No. 15/648,980 (filed Jul. 13, 2017), 9 pgs.
Final Rejection dated Jan. 2, 2020, for U.S. Appl. No. 16/173,793 (filed Oct. 29, 2018), 9 pgs.
Amendment and Response under 37 C.F.R. 1.111 filed Sep. 30, 2019, for U.S. Appl. No. 16/173,793 (filed Oct. 29, 2018), 14 pgs.
Non-Final Rejection dated Jun. 28, 2019, for U.S. Appl. No. 16/173,793 (filed Oct. 29, 2018), 9 pgs.
Second Preliminary Amendment filed Mar. 14, 2019, for U.S. Appl. No. 16/173,793 (filed Oct. 29, 2018), 7 pgs.
Partial International Search issued in International Trademark Patent Application No. PCT/IB2017/054253, dated Jan. 4, 2018.
International Search Report from Patent Application No. PCT/IB2017/054253, dated Apr. 13, 2018.
International Preliminary Report on Patentability received in PCT/IB2017/054253, dated Jan. 22, 2019.
P. Serra, M. Colina, J. M. Fernández-Pradas, L. Sevilla, and J. L. Morenza, "Preparation of functional DNA microarrays through laser-induced forward transfer," Appl. Phys. Lett. 85(9), 1639 (2004).
L. Xin-Mei, H. Jie, L. Jian, and N. Xiao-Wu, "Growth and collapse of laser-induced bubbles in glycerol-water mixtures," Chin. Phys. B 17(7), 2574 2579 (2008).
P. B. Robinson, J. R. Blake, T. Kodama, A. Shima, and Y. Tomita, "Interaction of cavitation bubbles with a free surface," J. Appl. Phys. 89(12), 8225 (2001).
P. Serra, J. M. Fernández-Pradas, F. X. Berthet, M. Colina, J. Elvira, and J. L. Morenza, "Laser direct writing of biomolecule microarrays," Appl. Phys., A Mater. Sci. Process. 79(4-6), 949 (2004).
A. Doraiswamy, R. J. Narayan, T. Lippert, L. Urech, A. Wokaun, M. Nagel, B. Hopp, M. Dinescu, R. Modi, R. C. Y. Auyeung, and D. B. Chrisey, "Excimer laser forward transfer of mammalian cells using a novel triazene absorbing layer," Appl. Surf. Sci. 252(13), 4743-4747 (2006).
A. Palla-Papavlu, L. Paraico, J. Shaw-Stewart, V. Dinca, T. Savopol, E. Kovacs, T. Lippert, A. Wokaun, and M. Dinescu, "Liposome micropatterning based on laser-induced forward transfer," Appl. Phys., A Mater. Sci. Process. 102(3), 651-659 (2011).
M. Duocastella, H. Kim, P. Serra, and A. Piqué, "Optimization of laser printing of nanoparticle suspensions for microelectronic applications," Appl. Phys., A Mater. Sci. Process. 106(3), 471-478 (2012).
C. Boutopoulos, I. Kalpyris, E. Serpetzoglou, and I. Zergioti, "Laser-induced forward transfer of silver nanoparticle ink: time-resolved imaging of the jetting dynamics and correlation with the printing quality," Microfluid. Nanofluidics 16(3), 493-500 (2014).
M. Makrygianni, I. Kalpyris, C. Boutopoulos, and I. Zergioti, "Laser induced forward transfer of Ag nanoparticles ink deposition and characterization," Appl. Surf. Sci. 297, 40-44 (2014).
L. Rapp, A. K. Diallo, A. P. Alloncle, C. Videlot-Ackermann, F. Fages, andP. Delaporte, "Pulsed-laser printing of organic thin-film transistors," Appl. Phys. Lett. 95(17), 171109 (2009).
R. C. Y. Auyeung, H. Kim, S. A. Mathews, and A. Piqué, "Laser direct-write of metallic nanoparticle inks," J. Laser Mirco/Nanoeng. 2(1), 21-25 (2007).
M. Zenon, S. Winter, A. Saar, and Z. Kotler, "Laser-Forward-Transfer of metal NP ink droplets: parametric analysis," Nanosci. Nanotechnol. Lett. 5(4), 435 (2013).
Office Action dated Oct. 5, 2021, for Korean Patent Application No. 10-2019-7004339 (filed Feb. 13, 2019), 18 pgs.
Office Action dated Jun. 9, 2021, for Taiwan (R.O.C.) Patent Application No. 106123675, 7 pgs.

\* cited by examiner

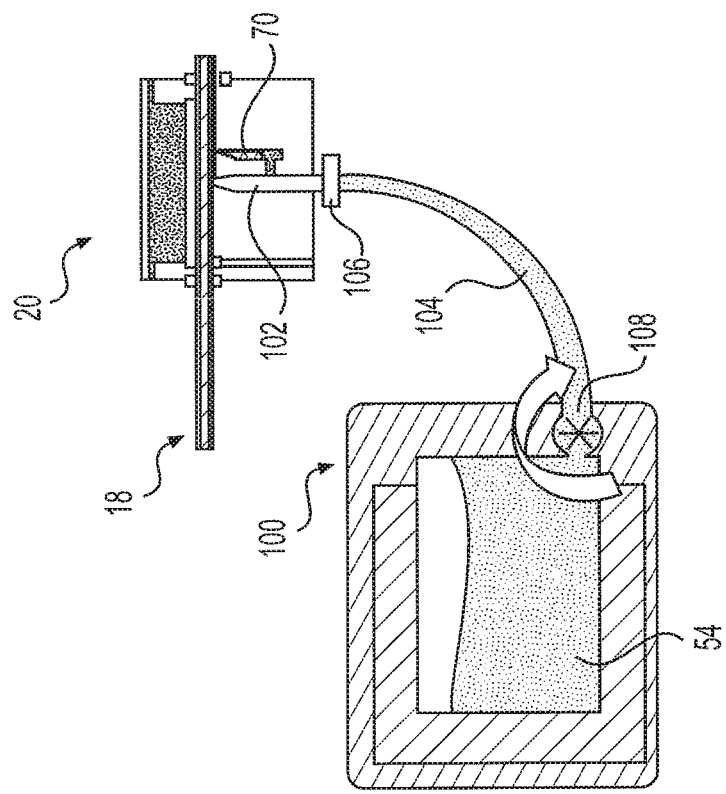
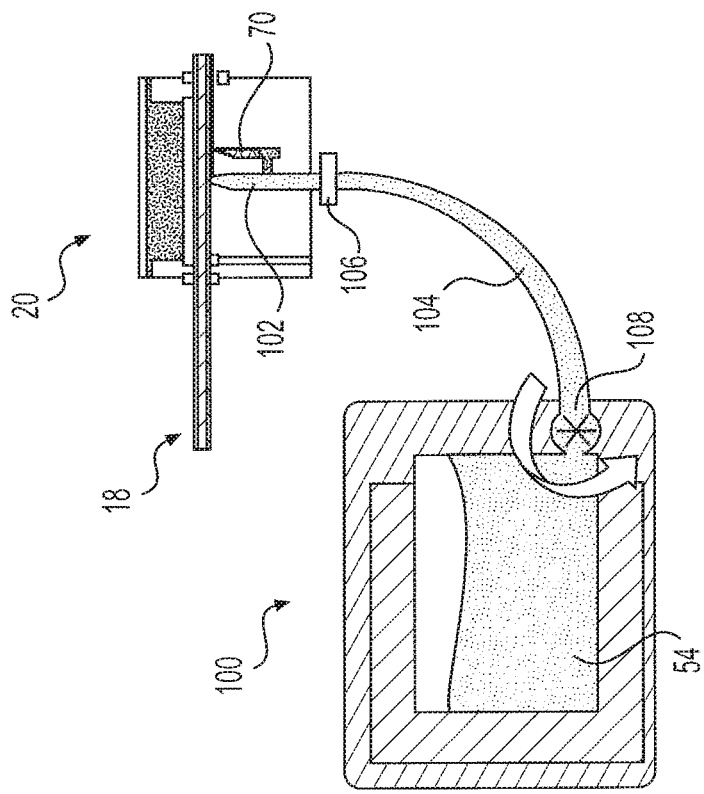

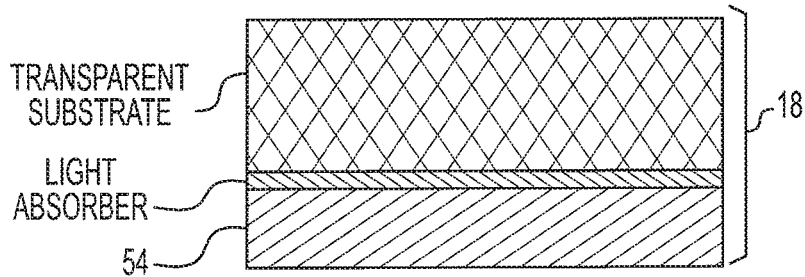
FIG. 15A
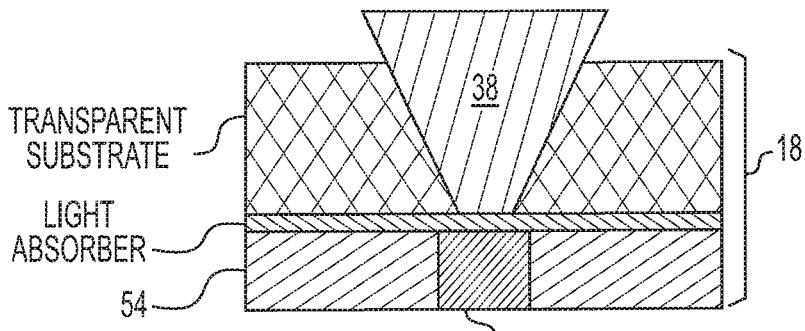
FIG. 15B
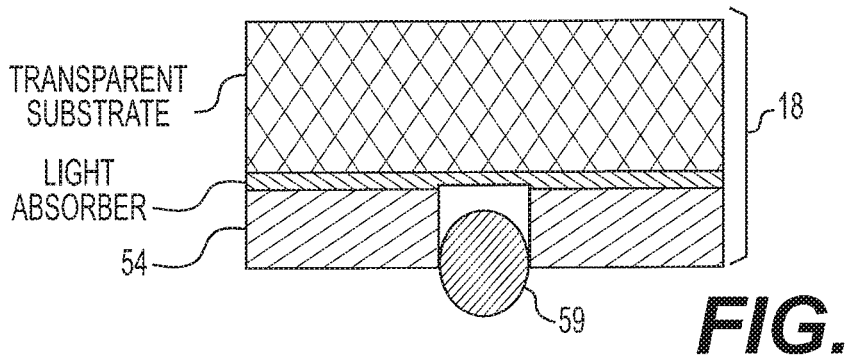
FIG. 15C
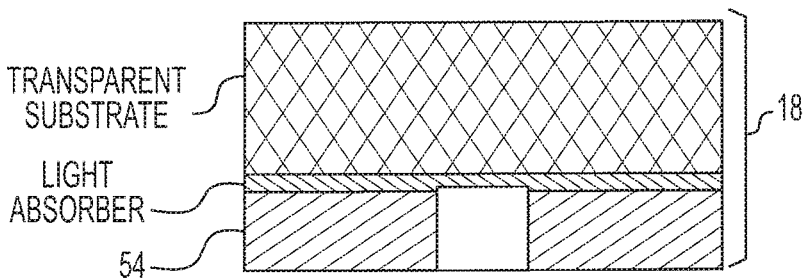
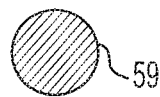
FIG. 15D

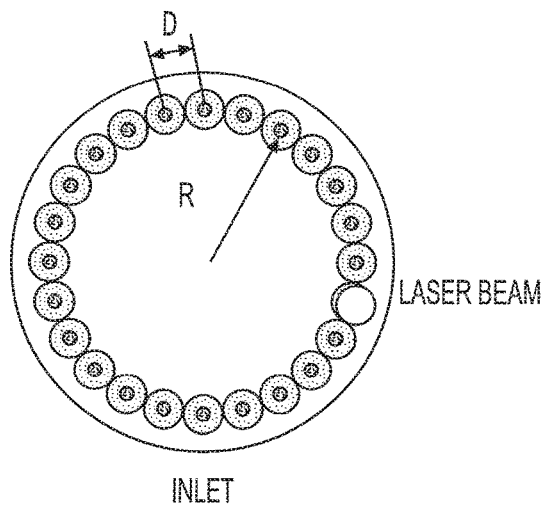 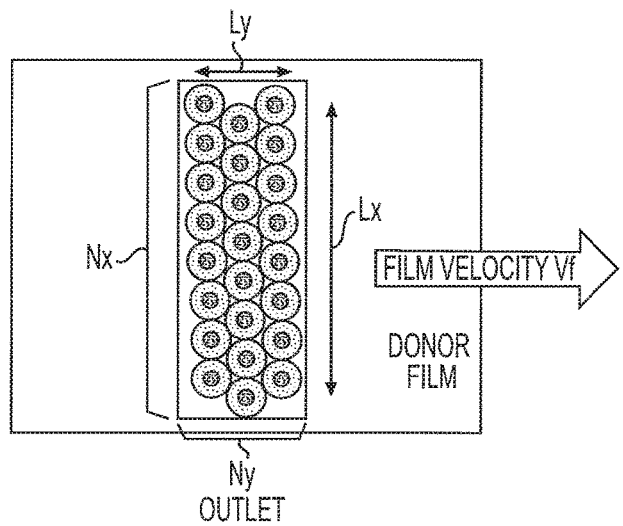
FIG. 17A  FIG. 17B
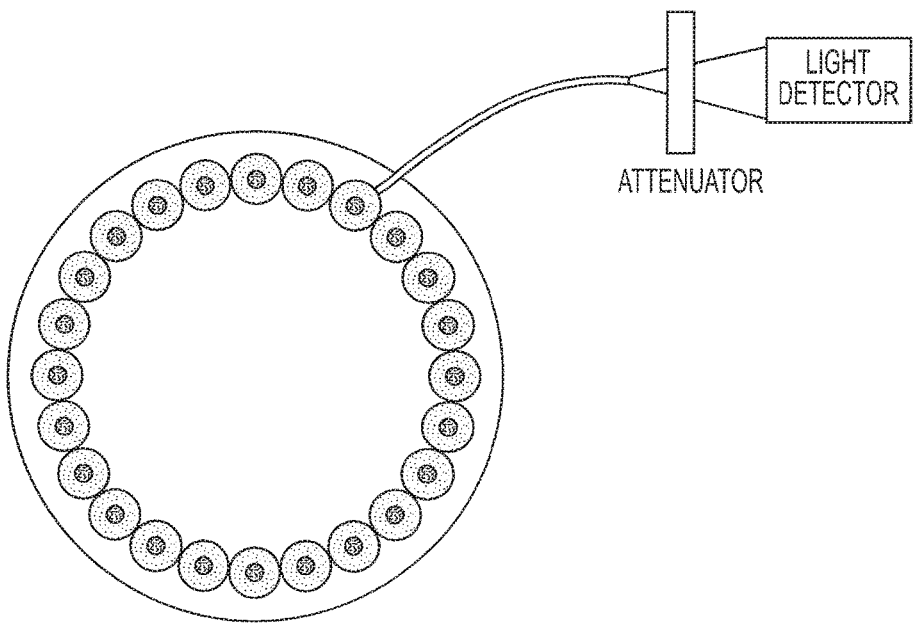
FIG. 18

KIT AND SYSTEM FOR LASER-INDUCED MATERIAL DISPENSING

CROSS REFERENCE TO RELATED APPLICATIONS

This is a continuation application of U.S. patent application Ser. No. 16/173,793 filed Oct. 29, 2018, which is a continuation application of U.S. patent application Ser. No. 15/648,980, filed Jul. 13, 2017 and now U.S. Pat. No. 10,144,034, issued on Dec. 4, 2018, which claims the benefit of U.S. Provisional Application No. 62/363,278 filed on Jul. 17, 2016, the disclosures of which are expressly incorporated by reference herein in their entireties.

FIELD OF THE INVENTION

The present disclosure, in some embodiments thereof, relates to material dispensing and, more particularly, but not exclusively, to laser-induced material dispensing.

BACKGROUND

Many technologies are enabled, facilitated or improved by the ability to pattern a wide variety of materials for specific purposes. Examples of patterning techniques that may be used for defining patterns in materials or depositing materials in desired patterns include contact lithography, projection lithography, screen printing, inkjet printing, and a variety of direct write technologies.

Direct write technologies are considered advantageous in that they allow the materials to be deposited, and patterns defined therein, quickly without the intermediate step of producing a mask, as is typically required for traditional lithography processes. Several direct write technologies are known. These include inkjet printing, laser chemical vapor deposition (LCVD), laser engineered nano-shaping (LENS), and laser induced forward transfer (LIFT).

In LIFT, a pulsed laser beam is directed through a laser-transparent target substrate to strike a film of material coated on the opposite side of the target substrate. The laser vaporizes the film material as it absorbs the laser radiation and, due to the transfer of momentum, the material is removed from the target substrate and is redeposited on a receiving substrate that is placed in proximity to the target substrate.

Laser induced forward transfer is typically used to transfer opaque thin films, typically metals, from a pre-coated laser transparent support, to the receiving substrate. Various apparatus employing laser-induced forward transfer are known. For example, U.S. Published Application No. 2014/0160452 discloses an apparatus in which the donor is refreshed to enable continued material deposition. The refreshment can be substitution of a new donor structure for a donor structure used during exposure, regeneration of the donor material on the donor structure, use of a flexible membrane that is rolled, or use of a conveyor system to transport fresh donor structure to the deposition area.

Further, conventional LIFT systems are slow, expensive, and are generally only capable of depositing a single material on a receiver substrate.

Usually the "LIFT system" approach and its requirement of long term robustness has led all innovators to optimize for continuous delivery using permanent parts only. This constraint increases the complexity of the system and reduces flexibility in term of the ability to deliver multi-material, material mixing and variable coating thickness.

Furthermore, for example, in conventional LIFT systems the laser is large and forms part of the print head; and therefore, the print head cannot be made compact (i.e., since the laser is integrated into the print head). Further, the wait time between successively depositing droplets of a donor material on a substrate and the linear movement of the scanner makes the conventional LIFT print head slow. Therefore, in order to have the conventional LIFT system operate at a reasonable rate, very expensive optics must be provided for the conventional LIFT system.

Also, the conventional LIFT system has a disadvantage in that when it deposits two droplets next to each other, it needs to wait a few milliseconds in between droplets. During this time, no printing can take place to avoid material disturbance. This wait time or "relaxation time" is disadvantageous because it reduces the throughput of the LIFT system.

Additional background art includes U.S. Pat. Nos. 4,752,455, 4,895,735, 5,725,706, 5,292,559, 5,492,861, 5,725,914, 5,736,464, 4,970,196 and 5,173,441.

SUMMARY OF THE INVENTION

According to a feature of some embodiments of the present disclosure, there is provided a material supply kit for a laser-induced dispensing system. The material supply kit comprises a cartridge assembly having a supply reel for supplying a foil having a light transmissive layer wound around the supply reel and a take-up reel for taking up the foil, and a coating device for coating the foil by a donor material during a motion of the foil.

According to some embodiments of the present disclosure, the coating device has an inlet for continuously receiving a foil from the supply reel, an outlet for continuously releasing the foil to be taken up by the take-up reel, and a coating section between the inlet and the outlet, where the coating of the foil by the donor material is in the coating section.

According to some embodiments of the present disclosure, the coating device is configured to coat the foil by the donor material from below.

According to some embodiments of the present disclosure, the coating device is configured to coat the foil by the donor material from above.

According to some embodiments of the present disclosure, the coating device comprises a nozzle for dispensing the donor material onto the foil.

According to some embodiments of the present disclosure, the coating device comprises a cavity located below the inlet and the outlet for holding the donor material, and a bias mechanism for upwardly biasing the donor material to establish contact between the foil and the donor material during the motion.

According to some embodiments of the present disclosure, the bias mechanism comprises a plunger and a mechanical biasing member for upwardly biasing the plunger.

According to some embodiments of the present disclosure, the bias mechanism comprises a plunger and a pressure port connectable to a pump for applying fluid pressure thereby to upwardly bias the plunger.

According to some embodiments of the present disclosure, the coating device comprises a donor material inlet connectable to a source of donor material for supplying the donor material to the coating device.

According to some embodiments of the present disclosure, the foil comprises a sacrificial protective layer above the light transmissive layer, wherein the cartridge assembly comprises a lift off reel for lifting off the sacrificial protective layer during the supply of the foil.

According to some embodiments of the present disclosure, the foil comprises a heat conducting layer below the light transmissive layer for allowing heat transfer to the donor material.

According to some embodiments of the present disclosure, the foil comprises a passivation layer below the heat conducting layer.

According to a feature of some embodiments of the present disclosure, there is provided a laser-induced dispensing system. The laser-induced dispensing system comprises the material supply kit, and an irradiation head (e.g., a print head) having optics configured for focusing a laser beam. The laser-induced dispensing system may also comprise a controller, for controlling the cartridge assembly to establish motion of the foil, and the optics to focus the laser beam onto the foil at a location downstream the outlet of the coating device so as to release droplets of the donor material from the foil.

According to some embodiments of the disclosure, the system comprises a cooling element for cooling the donor material.

According to a feature of some embodiments of the present disclosure, there is provided a laser-induced dispensing system. The laser-induced dispensing system comprises a first substrate having a donor material thereon, an irradiation head having optics configured for focusing a laser beam on the substrate to release droplets of the donor material from the substrate, and a cooling element for cooling the donor material. According to some embodiments of the present disclosure, the first substrate is a foil.

According to some embodiments of the present disclosure, the controller is also configured for activating and deactivating the coating by the coating device.

According to some embodiments of the disclosure, the controller is also configured for controlling the coating device to coat the foil at a predetermined rate.

According to some embodiments of the present disclosure, the system comprises a waste collector for removing excess donor material from the foil following the release.

According to some embodiments of the present disclosure, the irradiation head comprises a laser source mounted on a body of the irradiation head for generating the laser beam.

According to some embodiments of the present disclosure, the optics is configured for coupling the laser beam to the irradiation head from a laser source generating the laser beam and located external to the irradiation head.

According to some embodiments of the present disclosure, the coupling is by direct propagation of the laser beam.

According to some embodiments of the present disclosure, the coupling is by an optical waveguide.

According to some embodiments of the present disclosure, there is a plurality of irradiation heads for generating a respective plurality of laser beam focal spots.

According to some embodiments of the present disclosure, the system comprises a beam scanning system configured for scanning the laser beam to selectively couple the laser beam into the irradiation heads.

According to some embodiments of the present disclosure, at least two of the irradiation heads comprises an array of optical nozzles for generating a respective plurality of laser beam focal spots. In these embodiments, the irradiation heads are arranged to form a two-dimensional array of the optical nozzles, and the beam scanning system is configured for two-dimensionally scanning the laser beam to selectively couple the laser beam into the optical nozzles of the array.

According to some embodiments of the present disclosure, the irradiation head comprises an array of optical nozzles for generating a respective plurality of laser beam focal spots. In these embodiments, the system comprises a beam scanning system configured for scanning the laser beam to selectively couple the laser beam into the optical nozzles.

According to some embodiments of the present disclosure, the coupling is by a plurality of optical waveguides arranged to form a round shape (e.g., circular, oval, elliptical, etc.) on an optical coupler.

According to some embodiments of the present disclosure, the system comprises a rotary mirror configured to sequentially focus the light beam onto entry ports of the plurality of optical waveguides.

According to some embodiments of the present disclosure, the optical waveguides are crossed such that adjacent entry ports at the optical coupler correspond to non-adjacent exit ports on the head.

According to some embodiments of the present disclosure, the beam scanning system is external to the irradiation head.

According to some embodiments of the present disclosure, the coating device comprises a plurality of vertically movable cavities each containing a different donor material, wherein the controller is configured for vertically displacing the cavities to intermittently generate contact between the foil and a donor material in a respective cavity.

According to some embodiments of the present disclosure, the coating device comprises a mixing chamber in fluid communication with each of the cavities for mixing donor materials from different cavities prior to the coating, wherein the controller is configured for controlling individual pressures within the cavities. The individual pressure is optionally and preferably selected to provide a predetermined mixing ratio among the donor materials.

According to some embodiments of the present disclosure, the coating device comprises a plurality of cavities, each containing a different donor material, and a mixing chamber in fluid communication with each of the cavities for mixing donor materials from different cavities prior to the coating. In these embodiments, the controller is configured for controlling individual pressures within the cavities. The individual pressures are optionally and preferably selected to provide a predetermined mixing ratio among the donor materials.

According to some embodiments of the present disclosure, the system comprises a source of donor material connectable to the coating device via a conduit, and a bidirectional pump for establishing flow of the donor material in the conduit, wherein the controller is configured to control the bidirectional pump in a temporally selective manner.

According to some embodiments of the present disclosure, the controller is configured to control the coating device to vary a thickness of the donor material on the foil.

According to some embodiments of the present disclosure, the system comprises an imaging device for imaging a section of the foil, in situ, before the foil interacts with the laser beam.

According to a feature of some embodiments of the present invention, there is provided a method of dispensing a donor material on a receiver substrate. The method comprises placing the receiver substrate below the foil of the laser-induced dispensing system, and operating the laser-induced dispensing system to release the donor material from the foil to the receiver substrate.

According to a feature of some embodiments of the present invention, there is provided a method of dispensing a donor material. The method comprises cooling a donor material on a first substrate and focusing a laser beam on the first substrate so as to release droplets of the donor material from the first substrate onto a receiver substrate. According to some embodiments of the invention, the first substrate is a foil.

According to some embodiments of the present disclosure, the method comprises establishing a relative lateral motion between the substrate and the irradiation head so as to pattern the substrate by the donor material.

According to some embodiments of the present disclosure, the method comprises establishing a relative lateral and vertical motion between the substrate and the irradiation head to form on the substrate a three-dimensional object.

According to some embodiments of the present disclosure, the cooling is to a temperature above, but within less than 5° C. from, a freezing temperature of the donor material.

In accordance with a non-limiting feature of the present disclosure, the laser-induced dispensing system for material processing may include an optical fiber bundle having optical fibers configured to receive laser beams from a laser source at a first interface of the fiber bundle and transmit the laser beams from a second interface of the fiber bundle. Further, the optical fibers may have first ends arranged at the first interface and second ends arranged at the second interface. Additionally, optics configured to direct the laser beams transmitted from the second interface by the optical fibers toward a material to be deposited on a substrate may be provided. Further, the optics may be configured to focus the laser beams on the material to be deposited and, as a result, cause the material to be deposited to be released onto the substrate. Also, in accordance with features of the present disclosure, each of the optical fibers may be arranged such that all of the optical fibers having a first end that is adjacent to a first end of another of the optical fibers at the first interface has a second end that is non-adjacent to a second end of the another of the optical fibers at the second interface.

In another non-limiting feature of the present disclosure, the laser-induced dispensing system may have a print head that includes the optics and the laser source may be located external to the print head.

Additionally, the first ends of the optical fibers may be arranged at the first interface in a polygonal configuration, and the second ends of the optical fibers may be arranged at the second interface in a polygonal configuration.

In a further non-limiting feature, the first ends of the optical fibers may be arranged at the first interface in one of a circular, elliptical and oval configuration, and the second ends of the optical fibers may be arranged at the second interface in a polygonal configuration.

Additionally, a beam scanning system may be provided to scan the laser beams from the laser source so as to selectively couple laser beams outputted from the laser source onto a lens element of an external lens array, which couples the outputted laser beams into respective optical fibers by transmitting the outputted laser beams into the first ends of the optical fibers at the first interface.

The beam scanning system may also include a motor, a shaft connected to the motor, and a reflecting mirror mounted at an end of the shaft so as to be oriented at angle with respect to a rotational axis of the shaft. Accordingly, the shaft may be configured to rotate so as to rotate the reflecting mirror and, as a result, sequentially reflect the outputted laser beams into the first ends of the optical fibers at the first interface. Further, the motor may be rotated at a constant speed. Alternatively, the motor may be rotated at a variable speed or the constant speed of the motor may be changed during rotation of the motor.

Additionally, as a further feature of the present disclosure, the second ends of the optical fibers at the second interface may be connected to a corresponding array of optical nozzles that generate respective laser beam focal spots that are configured to be focused on the material to be deposited.

Further, each of the optical nozzles may also include a respective focusing element configured to focus respective laser beams transmitted from the second ends of the optical fibers that are provided at the second interface.

Also, in accordance with a feature of the present disclosure, the optical fibers may be multi-mode optical fibers. Additionally, each of the optical fibers may have a core diameter of at least 25 µm and a cladding diameter of at least 65 µm.

Further, the array of optical nozzles may be configured such that successively emitted laser beams are emitted from non-adjacent ones of the array of optical nozzles as the outputted laser beams are coupled into the first ends of the optical fibers at the first interface. Additionally, the non-adjacent ones of the array of optical fibers that emit laser beams may be determined by adjusting a pulse of the laser such that the laser beams only enter entry ports of predetermined optical fibers. For example, the pulse of the laser may be set such that a laser beams are only received in the entry port of every other optical fiber. Further, it should be appreciated that the pulse of the laser may be adjusted such that the laser beams are received by specified or any desired number of optical fibers.

Also, in accordance with further non-limiting features of the present disclosure, the second ends of the optical fibers at the second interface are connected to a corresponding array of optical nozzles, which generate respective laser beam focal spots that are configured to be focused on the material to be deposited. Further, each of the optical nozzles may include a respective focusing element configured to focus respective laser beams transmitted from the second ends of the optical fibers.

Additionally, a print head including the array of optical nozzles and an optical coupler that couples the laser beam transmitted from the second interface may be provided. Also, the laser source may be an external laser source provided external to the print head. Further, the print head may be defined by a plurality of separate print heads having a respective array of optical nozzles.

As another non-limiting feature of the present disclosure, a fiber bundle for a material processing printer may include a fiber bundle having optical fibers configured to receive laser beams at a first interface and transmit the laser beams to a second interface. The optical fibers have first ends arranged at the first interface and second ends arranged at the second interface. Further, each of the optical may be arranged such that all of the optical fibers having a first end that is adjacent to a first end of another of the optical fibers at the first interface have a second end that is non-adjacent to a second end of the of the optical fibers at the second interface. Additionally, the optical fibers of the fiber bundle may be multi-mode optical fibers.

Also, as an alternative to a pulse laser, a shutter mechanism may be used to interrupt a continuous laser beam. The shutter mechanism could be provided with an aperture that opens and closes to selectively allow the laser beam from a laser source to enter only desired optical fibers that are provided at the first interface. For example, the shutter mechanism could be provided on the laser source as an optical shutter which is selectively positioned in and out of the path of the laser beam in order to interrupt the laser beam generated by a continuous laser.

Furthermore, the pulse may be synchronized with the rotational speed of the motor to ensure the laser beams are received by the desired optical fibers. The pulse of the laser and/or the speed of the motor may be changed to an appropriate value that may be required for synchronization.

Also, at least one of the optical fibers of the optical fiber bundle may be connected to a light detector. For example, accuracy (or synchronization) of the scanning system may be ensured by connecting two of the optical fibers of the optical fiber bundle to the light detector. It should be appreciated that any number of optical fibers may be connected to any number of light detectors. For example, each of the two optical fibers may be connected to a same or respective light detector.

As a result, matching or conformity between the laser frequency and the scanning velocity can be ensured and corrected if necessary. For example, each time a laser beam is coupled into the at least one optical fiber that is connected to the light detector, e.g., a position of an optical mirror of the scanning system can be determined based upon information received (the same applies when multiple optical fibers are connected to one of more light detectors).

Further, the first ends of the optical fibers may be arranged at the first interface in a polygonal configuration, and the second ends of the optical fibers may be arranged at the second interface in a polygonal configuration.

Also, in accordance with non-limiting features of the present disclosure, the first ends of the optical fibers may be arranged at the first interface in one of a circular, elliptical and oval configuration, and the second ends of the optical fibers may be arranged at the second interface in a polygonal configuration.

Additionally, a method of dispensing a donor material on a receiver substrate may be provided. For example, the method may include outputting laser beams from a laser source, providing a fiber bundle having optical fibers that receive the laser beams at a first interface of the fiber bundle and transmitting the laser beams from a second interface of the fiber bundle, and arranging first ends of the optical fibers at the first interface and arranging second ends of the optical fibers at the second interface.

As a non-limiting feature, each of the optical fibers may be arranged such that all of the optical fibers having a first end that is adjacent to a first end of another of the optical fibers at the first interface has a second end that is non-adjacent to a second end of the another of the optical fibers at the second interface. Further, optics that direct laser beams transmitted from the second interface by the optical fibers toward a donor material to be deposited on a received substrate may also be provided. Additionally, the optics may focus the laser beams on the donor material, thereby causing droplets of the donor material to be released and deposited onto the receiver substrate.

Also, the laser beams may be focused on the donor material at a predetermined intensity such that an energy absorbed by the donor material from the focused laser beams causes the droplets of the donor material to be released. Further, each of successive droplets of the donor material may be released in a non-adjacent order.

Additionally, in accordance with another non-limiting feature, the donor material may be applied to a foil having a light transmissive layer. Further, the laser beams may be focused on the donor material through the light transmissive layer and each of successively emitted laser beams, among the focused laser beams, may be emitted from the second ends of the optical fibers in a non-adjacent order so as to cause release of the droplets in the non-adjacent manner.

Further, in accordance with a non-limiting feature of the method of the present disclosure, the first ends of the optical fibers at the first interface may be arranged in one of a circular, elliptical and oval configuration, and the second ends of the optical fibers may be arranged at the second interface in a polygonal configuration.

Further, in accordance with the features of the present disclosure, a standalone print head that can be incorporated in a variety of printing systems is provided, for example, by virtue of providing the optical fiber bundle in a manner that can decouple the laser from the print head.

According to some embodiments of the present disclosure, the donor material comprises an organic material. According to some embodiments of the present disclosure, the donor material comprises an inorganic material. According to some embodiments of the present disclosure, the donor material comprises a metal. According to some embodiments of the present disclosure, the donor material comprises a dielectric material. According to some embodiments of the present disclosure, the donor material comprises a biological material. According to some embodiments of the present disclosure, the donor material comprises a metal oxide. According to some embodiments of the present disclosure, the donor material comprises a magnetic material. According to some embodiments of the present disclosure, the donor material comprises a semiconductor material. According to some embodiments of the present disclosure, the donor material comprises a polymer.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments of the present disclosure, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the present disclosure could be implemented as a chip or a circuit. As software, selected tasks according to embodiments of the present disclosure could be implemented as a plurality of software instructions being executed by a computer using any suitable operating system. In an exemplary embodiment of the present disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the present disclosure are herein described, by way of example only, with reference to the accompanying drawings. With specific reference now to the drawings in detail, it is stressed that the particulars shown are by way of example and for purposes of illustrative discussion of embodiments of the present disclosure. In this regard, the description taken with the drawings makes apparent to those skilled in the art how embodiments of the present disclosure may be practiced.

In the drawings:

FIGS. 6A and 6B are schematic illustrations of the coating device in embodiments of the invention in which an external source of donor material is connected to the coating device;

FIGS. 15A-D illustrate a laser-induced dispensing process of a donor material in embodiments of the present invention in which the temperature of the donor material is close to its freezing temperature;

FIG. 16B is a schematic illustration of a manner in which the fiber bundle may decouple a print head from a driver that contains a laser scanning system FIGS. 17A and 17B are schematic illustrations of the arrangement of the fiber optics at the inlet and outlet satisfying related motion equations; and FIG. 18 is a schematic illustration of an optical fiber bundle in which an optical fiber is connected to a light detector.

DETAILED DESCRIPTION

Figure 1A:
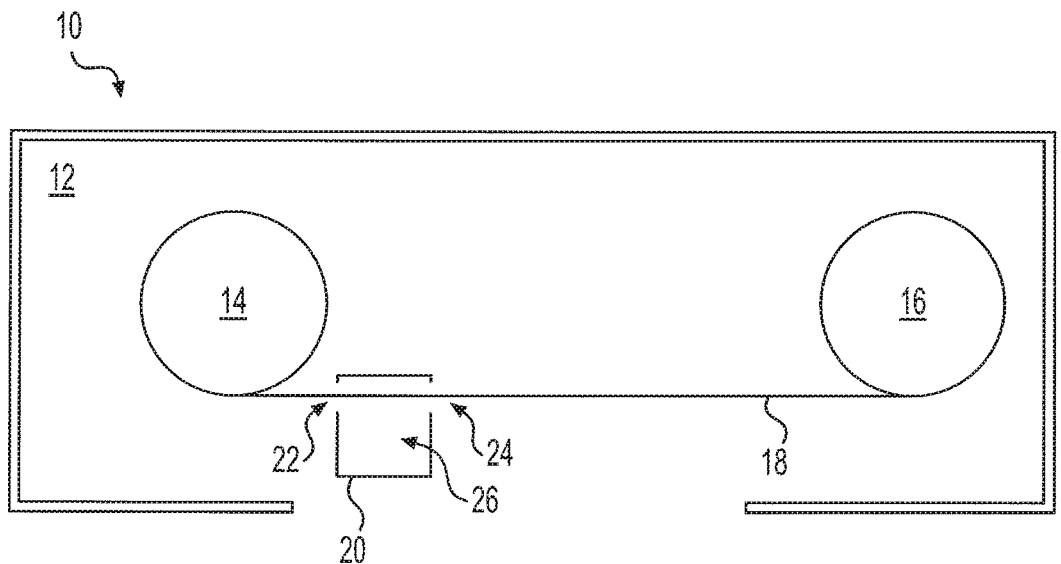
FIGS. 1A and 1B are schematic illustrations of a material supply kit for a laser-induced dispensing system, according to several embodiments of the present invention.

The present disclosure, in some embodiments thereof, relates to material dispensing and, more particularly, but not exclusively, to laser-induced material dispensing.

Before explaining at least one embodiment of the present disclosure in detail, it is to be understood that the present disclosure is not necessarily limited in its application to the details of construction and the arrangement of the components and/or methods set forth in the following description and/or illustrated in the drawings and/or the Examples. The present disclosure is capable of other embodiments or of being practiced or carried out in various ways.

Figure 1B:
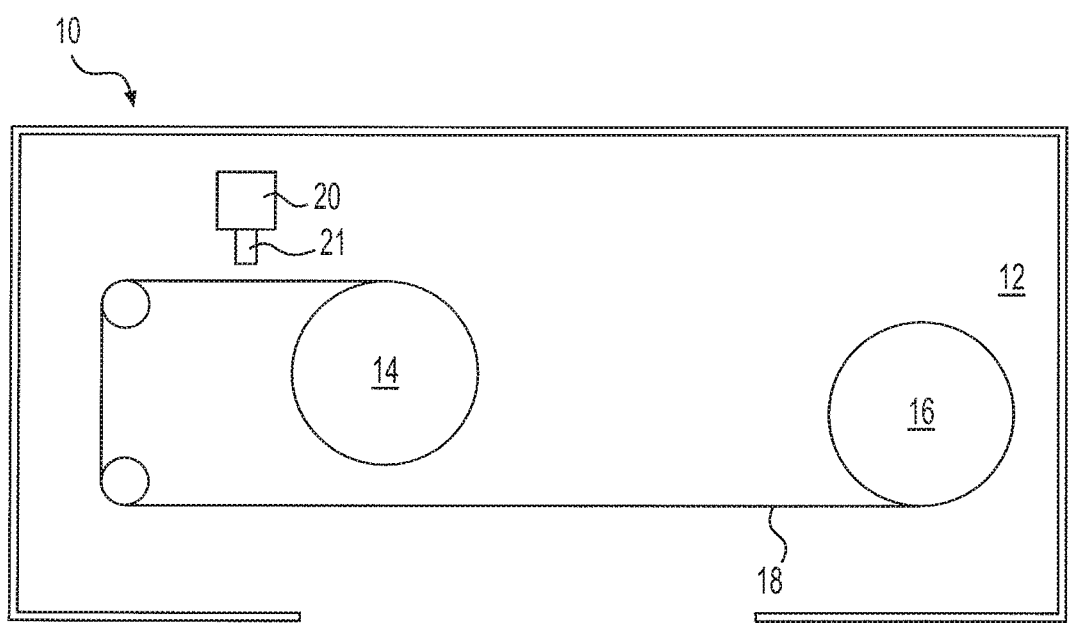

Referring now to the drawings, FIGS. 1A and 1B are schematic illustrations of a material supply kit 10 for a laser-induced dispensing system, according to some embodiments of the present invention. At least one component, more preferably all the components of material supply kit 10, can be made disposable or removable (e.g., the material supply kit 10 may be removed and disposed of or refurbished, cleaned or simply replaced with a replacement material supply kit). Material supply kit 10 preferably comprises a cartridge assembly 12 having a supply reel 14 and a take-up reel 16 for respectively supplying and taking up a foil 18 having a light transmissive layer. Cartridge assembly 12 and foil 18 are preferably made disposable or removable. Kit 10 can further include a coating device 20 for coating foil 18 by a donor material 54 (not shown, see, e.g., FIGS. 2A-B and 4A-C) during a motion of foil 18. In some embodiments of the present disclosure, coating device 20 has an inlet 22 for continuously receiving foil 18 from supply reel 14, an outlet 24 for continuously releasing foil 18 to be taken up by take-up reel 16, and a coating section 26 between inlet 22 and outlet 24 for coating foil 18 by the donor material. These embodiments are illustrated in FIG. 1A and are particularly useful when it is desired to coat foil 18 from below. Coating device 20 can alternatively include a nozzle 21 for dispensing the donor material onto foil 18. These embodiments are illustrated in FIG. 1A and are particularly useful when it is desired to coat foil 18 from above.

Coating device 20 is preferably made disposable or removable. In contrast, conventional continuous systems are very complex and expensive to implement. The advantage of having coating device 20 disposable (or removable) is that it allows replacing it from time to time thereby simplifying the production process. Moreover, a disposable or removable coating device 20 reduces the risk of contamination of the donor material between dispensing sessions. This is particularly useful in applications which are sensitive to contamination, such as, but not limited to, bio-printing. It should be appreciated that the removable nature of the coating device 20 allows the coating device to be cleaned, reused, refurbished, replaced and disposed of as desired.

Figure 2A:
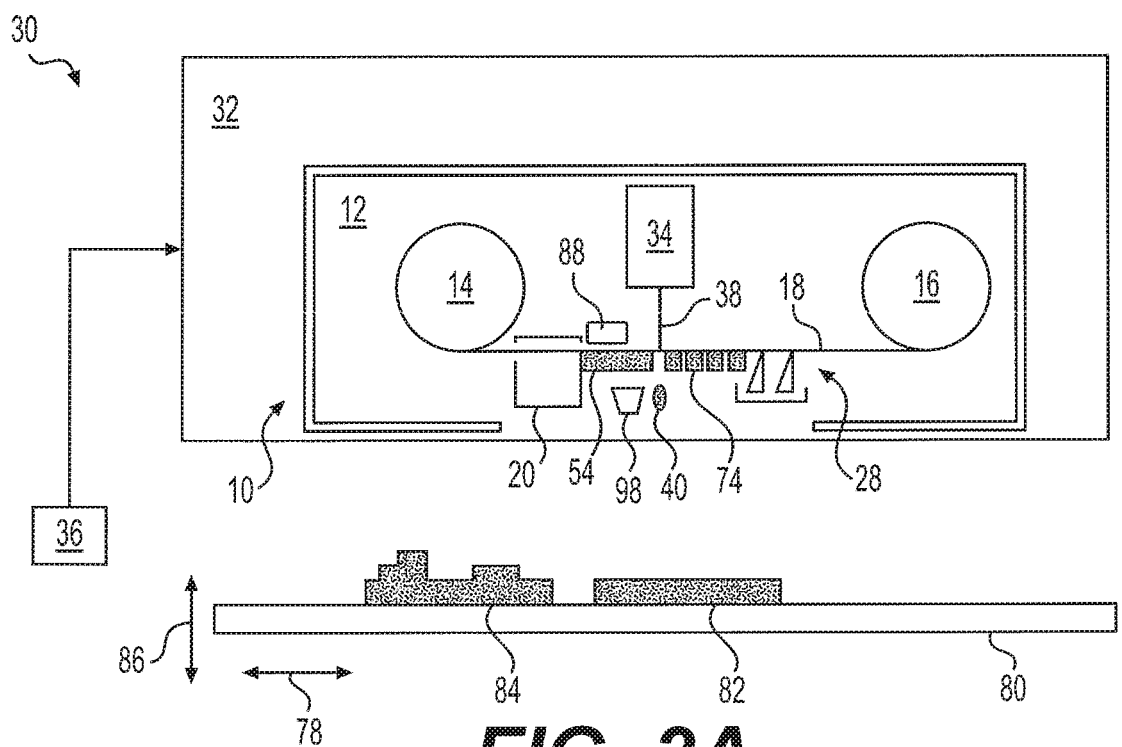
FIGS. 2A and 2B are schematic illustrations of a laser-induced dispensing system, according to several embodiments of the invention.
Figure 2B:
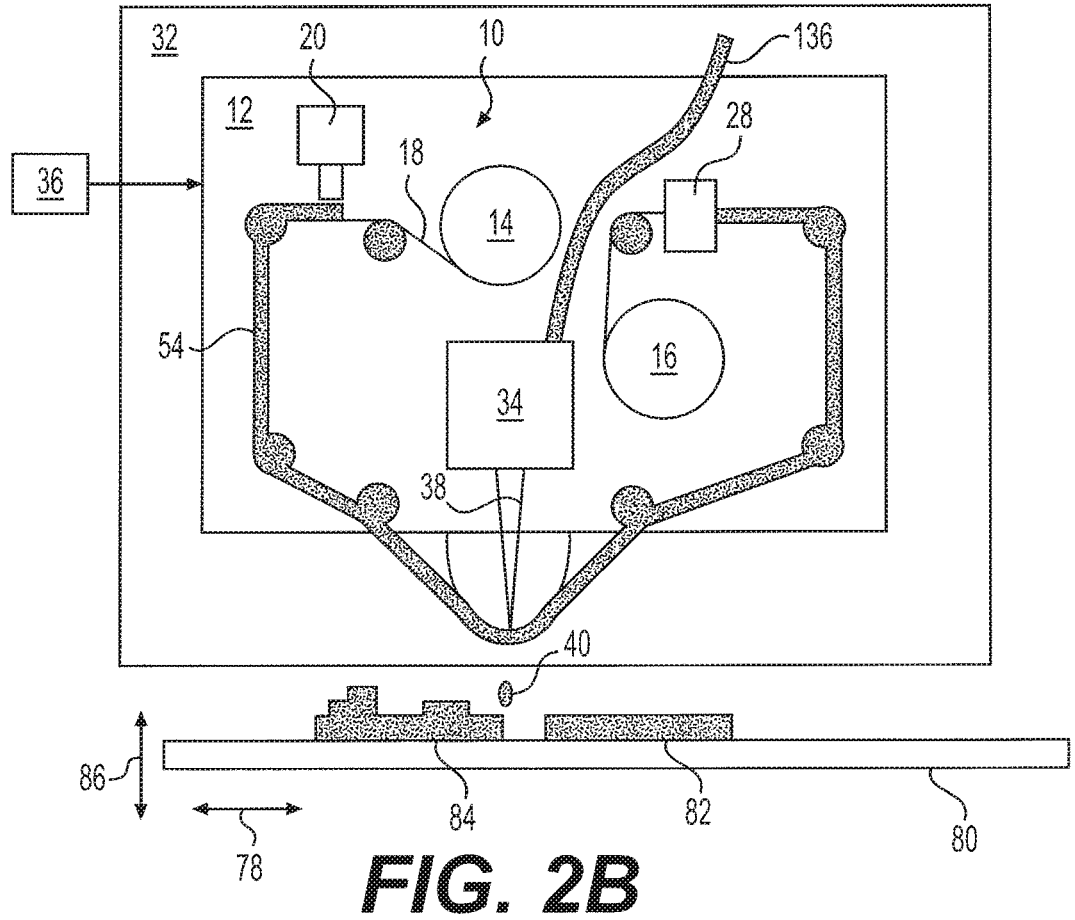

A laser-induced dispensing system 30 incorporating kit 10 is schematically illustrated in FIGS. 2A and 2B, where FIG. 2A illustrates an embodiment of the invention in which foil 18 is coated from below, and FIG. 2B illustrates an embodiment of the invention in which foil 18 is coated from above. System 30 can be a LIFT system and can be used, among other things, for printing. System 30 can comprise kit 10, an irradiation head (or print head) 32 having optics 34, and a controller 36. Controller 36 preferably has a dedicated circuit for controlling cartridge assembly 12 to establish motion of foil 18, and for controlling optics 34 to focus a laser beam 38 onto foil 18 at a location that is downstream of the coating device 20 so as to release droplets 40 of donor material 54 from foil 18. Irrespective of whether or not the donor material 54 is applied by coating device 20 from above (FIG. 2B) or from below (FIG. 2A), laser beam 38 preferably arrives at foil 18 from the side of foil 18 that is opposite to the side that is coated by donor material 54. In some embodiments of the present invention, controller 36 also controls coating device 20 to coat foil 18. For example, controller 36 can control coating device 20 to apply a predetermined amount of the donor material onto foil 18 and/or to coat foil 18 at a predetermined coating rate, as further detailed hereinbelow.

In various exemplary embodiments of the invention, system 30 comprises a waste collector 28 for removing excess donor material 74 from foil 18 following the release of droplets 40. Waste collector 28 may comprise any mechanism that delivers the material to a waste tank or waste cartridge. In the representative illustration of FIG. 2A, which is not to be considered as limiting, waste collector 28 is embodied as one or more blades and a waste cartridge. Additionally, the excess donor material 74 that is removed by the material waste collector may be reused, recycled or discarded.

Optionally, but not necessarily, system 30 also comprises an imaging device 98 (not shown in FIG. 2B) for imaging a section of foil 18, in place, preferably before foil 18 interacts with beam 38. Imaging device 98 can be used for quality control, wherein devices captures an image of donor material 54 before it is dispensed, which image can be processed and analyzed, for example, by an image processor (not shown), to determine the condition of donor material 54. When the image processing and analysis reveal that the donor material 54 is damaged, corrupted or otherwise of low quality, a signal can be transmitted, preferably automatically, to controller 36 to temporarily cease the operation of system 30 until coating device 20 is replaced or refilled with donor material. Use of imaging device 98 is particularly useful when donor material 54 is a biological material. Use of imaging device 98 is also useful when system 30 is used for dispensing more than one type of donor material in which case controller 36 may temporarily cease the operation of system 30 when the image processing and analysis reveal that the donor material is of an incorrect type. Imaging device 98 is preferably a visible light imaging device, but other types of imaging devices (e.g., a thermal imaging device and/or a three-dimensional scanner) are also contemplated.

Cartridge assembly 12 and coating device 20 of kit 10 can be provided as separate units that can be assembled by the operator of system 30 onto head 32. The advantage of having each of cartridge assembly 12 and coating device 20 as a separate unit is that it allows the operator to replace only coating device 20 but not cartridge assembly 12, for example, when it is desired to use a different donor material on the same foil.

In use, a receiver substrate 80 is placed below foil 18, and system 30 is operated to focus beam 38 onto foil 18. Beam 38 typically has an intensity below the plasma breakdown of foil 18. Surface heat absorption occurs on donor material 54. The heat absorption causes melting of donor material 54, and also causes an induced pressure gradient in a forward direction leading to forward acceleration of droplet 40 from material 54 and thus from foil 18. Droplet 40 is thus released and is moved, optionally and preferably with the aid of gravity, toward and onto the substrate 80.

Without subscribing to any particular theory, the effect of the laser pulses can generally be separated into several stages, including (i) light absorption, and (ii) heating and phase transition. For a given donor material, the dispensing process can be controlled by varying one or more laser parameters, including, without limitation, pulse duration, pulse energy, wavelength, and repetition rate.

In some embodiments of the present invention, the temperature of the donor material 54 on foil 18 is reduced, before the interaction with beam 38, to a level that is above but within less than 5° C. or less than 4° C. or less than 3° C. or less than 2° C. or less than 1° C. or less than 0.5° C. or less than 0.25° C. from its freezing temperature. Once material 54 is at the section of foil 18 that interacts with beam 38, the temperature of material 54 is increased and material 54 is dispensed by the mechanism described below. The laser locally heats the cold layer, causing the heated area to be less viscous. The local viscosity gradient is the driving force to eject the material. It was found by the present inventor that this process improves the quality of the dispensing process because it decreases the risks of damage or contamination of the transferred material.

The difference between dispensing at a temperature that is close to the freezing temperature and dispensing at a temperature that is far from the freezing temperature can be better understood with the aid of FIGS. 14A-D and 15A-D.

Figure 14A:
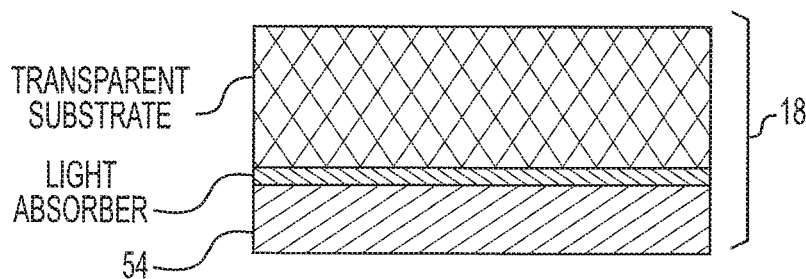
FIGS. 14A-D illustrate a laser-induced dispensing process of a liquid donor material.
Figure 14B:
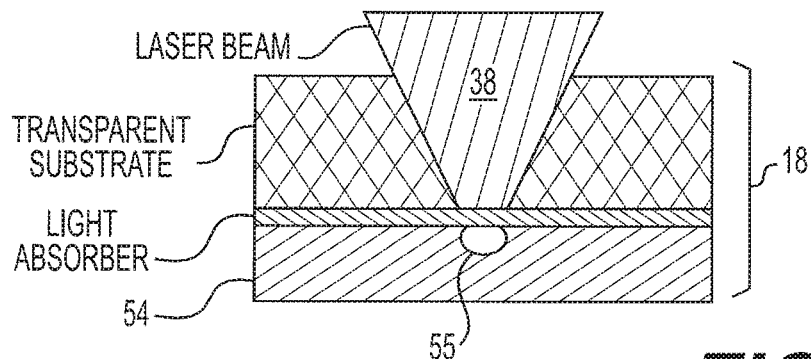
Figure 14C:
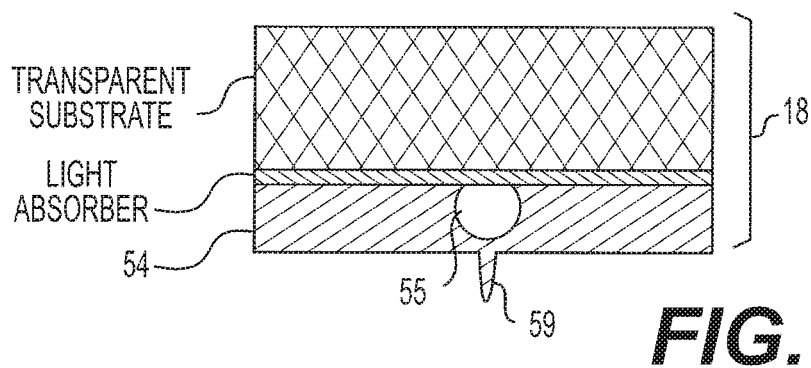
Figure 14D:
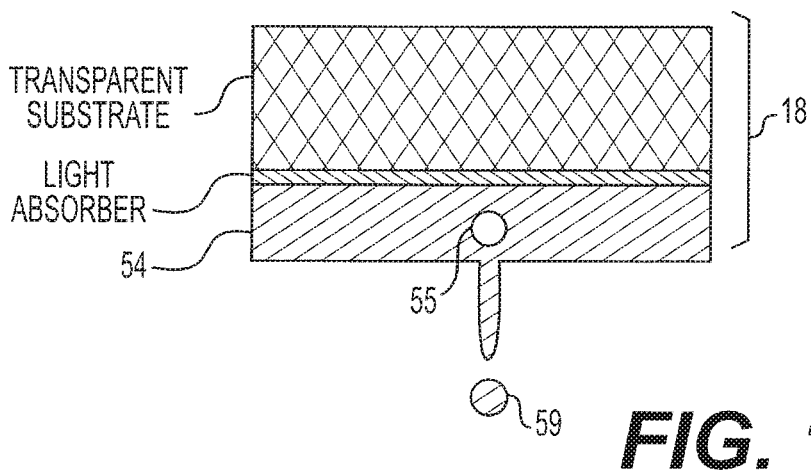

FIGS. 14A-D illustrate a laser-induced dispensing process of a liquid donor material when the temperature of the donor material 54 is far from its freezing temperature. When the foil 18 is irradiated by the laser beam 38 (FIG. 14B), a gas bubble 55 is formed in the layer of donor material 54. The temperature of this bubble is typically above 200° C., and there is a risk that atoms from the light absorber of transparent substrate will migrate and contaminate the donor material 54. The gas pressure results in a force acting on donor material 54 to eject a droplet 59 of donor material 54 (FIGS. 14C and 14D).

FIGS. 15A-D illustrate a laser-induced dispensing process of a liquid donor material when the temperature of the donor material 54 is close to its freezing temperature. When the foil 18 is irradiated by the laser beam 38, there is a local decrease of the viscosity in a region 57 the layer of donor material 54, but no high-temperature gas bubble is formed (FIG. 15B). The viscosity gradient results in a force acting on region 57 to eject a droplet 59 of donor material 54 (FIGS. 15C and 15D).

The temperature of donor material 54 can be reduced by a cooling element 88 that may be in thermal contact with foil 18 and/or placed with device 20. Cooling element 88 can be of any type, including, without limitation, a thermoelectric cooling element, a thermionic cooling element, a thermal-acoustic cooling element, a magnetic cooling element, a liquid-coolant cooling element, a gas recirculation cooling element, and the like.

Preferably, a relative lateral motion 78 is established between substrate 80 and irradiation head 32 so as to form on substrate 80 a donor material pattern 82. In some embodiments, both a relative lateral motion 78 and a relative vertical motion 86 are established, serially or simultaneously, between substrate 80 and irradiation head 32 motion to form on substrate 80 a three-dimensional object 84.

Herein, "lateral" refers to a direction within a plane perpendicularly to the gravitational direction.

Herein, "vertical" refers to a direction generally parallel or antiparallel to the gravitational direction.

Generally, the information for producing the pattern 82 of the layers of the object 84 can be described in the form of two-dimensional bitmaps of the required spatial resolution in both lateral directions. Each two-dimensional bitmap element (e.g., pixel) corresponds to a target location that should be filled with the donor material or left empty. The bitmap may store binary information where, for example, "1"s represent locations which are to be occupied by the donor material in the pattern 82 or object 84 and "0"s represent voids in the pattern 82 or object 84. Thus, "1"s in the bitmap can represent locations on which head 32 dispenses one or more droplets of donor material and "0"s represent locations skipped head 32.

Before providing a further detailed description of the kit and system of the present embodiments as delineated hereinabove, attention will be given to the advantages offered thereby.

The inventor found that one of the drawbacks of conventional LIFT systems is the donor preparation. The donor in such systems consists of a carrier substrate applied with a thin layer of the donor material. During a printing process using conventional systems, it is necessary to provide a fresh layer of the donor material to achieve constant and precise printing conditions. The technique of the present embodiments allows for a continuous supply of donor material, by means of a combination between the locomotion of film 18 from supply reel 14 to take-up real 16 and coating device 20 which coats foil 18 "on the fly," so that by the time the foil interacts with laser beam 38 it is always coated by fresh amount of donor material. The utilization of a disposable or removable coating device reduces the complexity of the system, since it is cheaper and more compact. Moreover, the maintenance is less complex because no cleaning is required as the entire device is disposable or removable. Further, the foil 18 may be pre-coated in advance of being installed, for example, within the cartridge in which case a separate coating device may not be necessary.

Figure 3A:
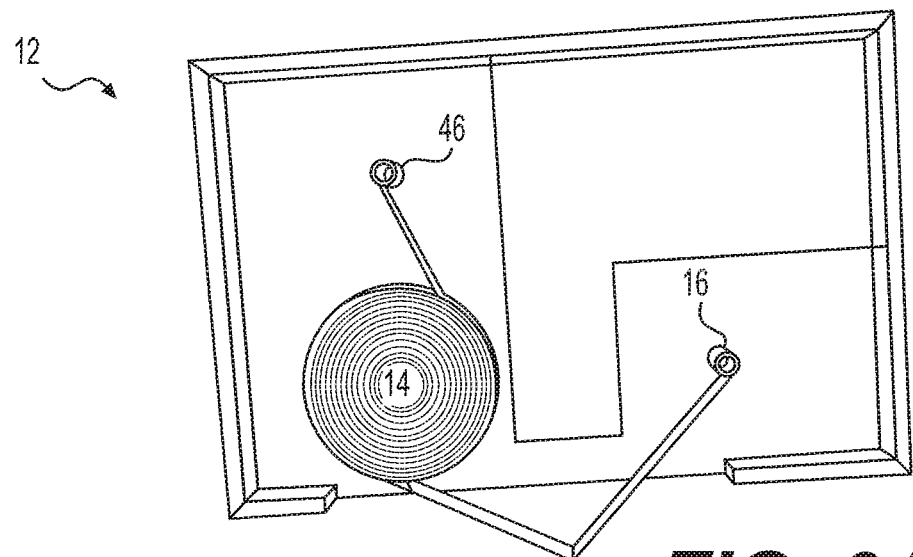
FIGS. 3A-C are schematic illustrations showing a cartridge assembly, according to several embodiments of the invention.
Figure 3B:
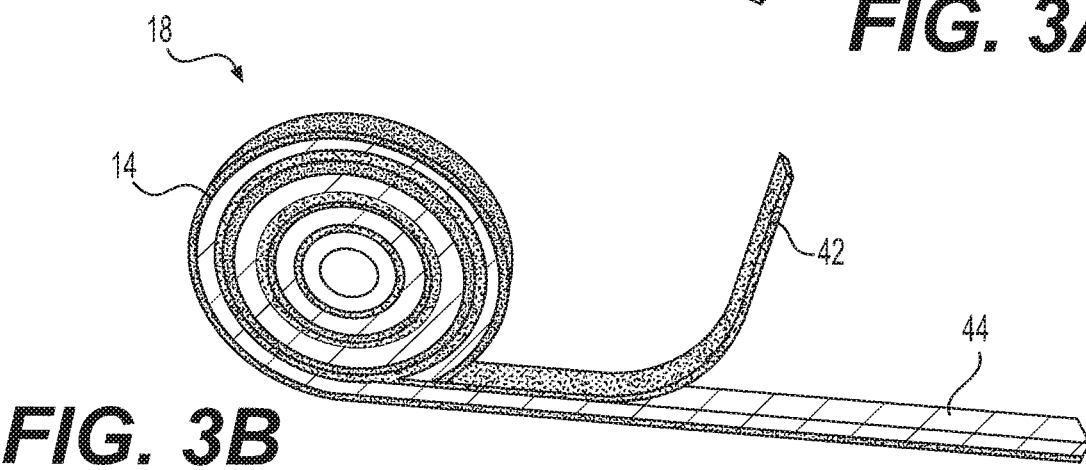
Figure 3C:
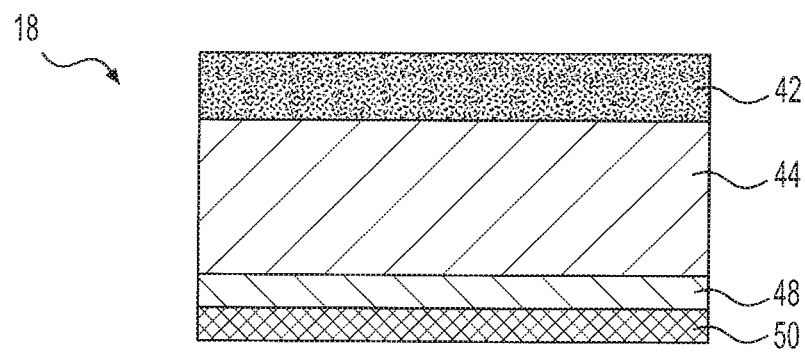

Referring again to the drawings, FIGS. 3A-C are schematic illustrations showing cartridge assembly 12 in greater detail, according to some embodiments of the present disclosure. FIG. 3A illustrates cartridge assembly 12, FIG. 3B illustrates foil 18, and FIG. 3C illustrates a magnified cross-section of foil 18. In the representative illustrations of FIGS. 3B and 3C, which are not to be considered as limiting, foil 18 is a multilayer foil. In some embodiments of the present disclosure, foil 18 comprises a sacrificial protective layer 42 above the light transmissive layer 44. Layer 42 serves for protecting the upper side of layer 44 when foil 18 is wound around reel 14. Preferably, cartridge assembly 12 comprises a lift off reel 46 (see FIG. 3A) for lifting off layer 42 from 44 during the supply of foil 18.

In some embodiments of the present disclosure, foil 18 comprises a heat conducting layer 48 at a side of light transmissive layer 44 that is opposite to optics 34 (e.g., below light transmissive layer 44, when optics 34 is above foil 18), for allowing heat transfer to the donor material, once foil 18 is coated thereby. Layer 48 can be a metallic layer. In some embodiments, foil 18 also comprises a passivation layer 50 at a side of heat conducting layer 48, that is opposite to light transmissive layer 44 (e.g., below heat conducting layer 48, when optics 34 is above foil 18). Layer 50 serves for preventing contact between the donor material and layer 48. This is particularly useful, for example, when the donor material is a biological material.

Following are representative examples, which is not to be considered as limiting, for materials suitable for the layers of foil 18. Sacrificial protective layer 42 can be made for example, from rubber type polymer film, such as, but not limited to, PARAFILM®. Light transmissive layer 44 can be made of Polyethylene naphthalate (PEN), Polyethylene terephthalate (PET), Polyimide (PI), flexible glass, etc, Heat conducting layer 48 can be made of a metal selected from the group consisting of Titanium, Molybdenum, Platinum, gold, etc. The thickness of layer 48 may be comparable to the laser light absorption depth, e.g., 10 nm to 100 nm, and preferably between about 15 nm to about 25 nm. Passivation layer 50 can be made of a metal oxide, such as, but not limited to, titanium oxide, alumina, silica, etc. The thickness of layer 50 may be, e.g., 10 nm to 500 nm, and preferably between about 50 nm to about 150 nm.

Herein, "above" and "below" are with respect to the direction of gravity and describe the position a layer relative to another layer when foil 18 assumes the horizontal direction.

Reference is now made to FIGS. 4A-6B which are schematic illustrations of coating device 20, according to several embodiments of the present invention.

Figure 4A:
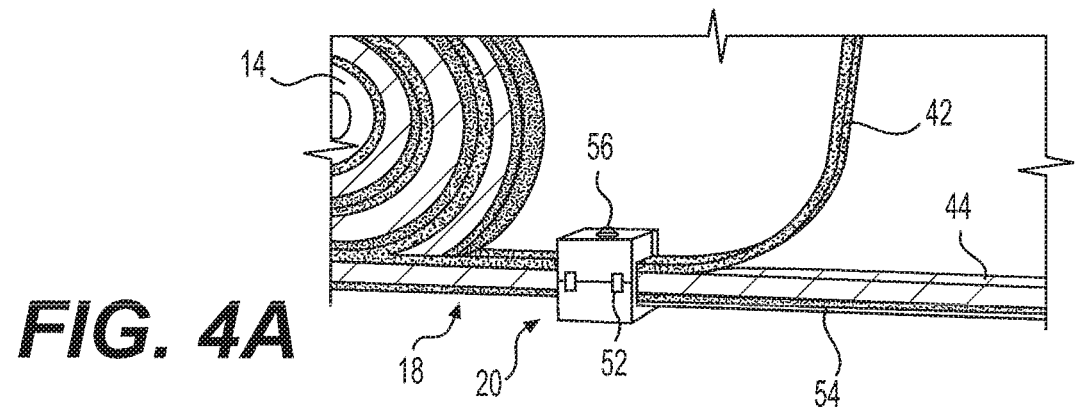
FIGS. 4A-C are schematic illustrations of a coating device, according to several embodiments of the invention.

FIG. 4A is a perspective view showing an exemplified design of device 20. In this exemplified design, which is not to be considered as limiting, device 20 is provided with a quick lock mechanism 52 for allowing the user of kit 10 to easily mount device 20 onto foil 18. Lock mechanism can be, for example, a magnetic mechanism or one or more snap connectors, as desired. In some embodiments of the present disclosure, device 20 comprises a donor material inlet 56 connectable to a source of donor material (not shown) for supplying donor material 54 to device 20.

Figure 4B:
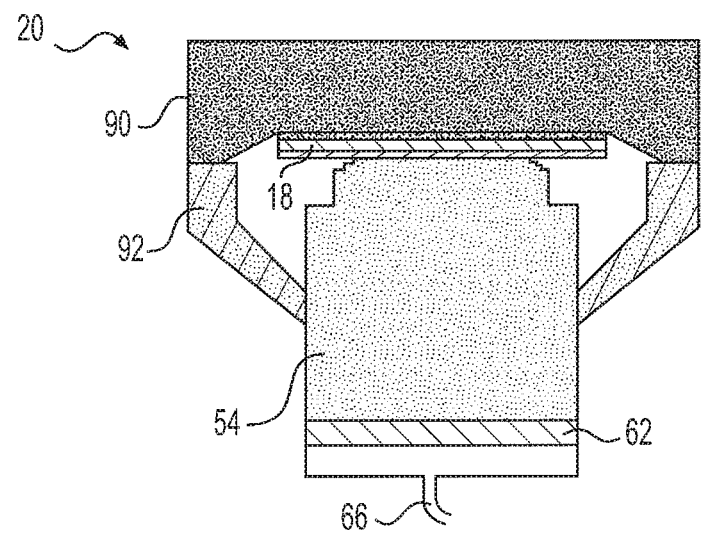
Figure 4C:
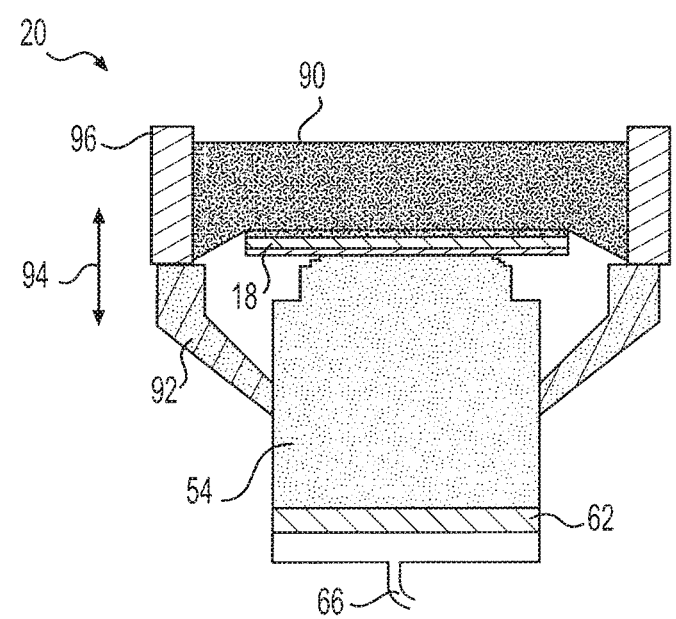

FIGS. 4B and 4C are schematic illustrations of a cross-sectional front view of coating device 20. In this view, the motion of foil 18 is outwardly with respect to the plane of the figures. Shown in FIGS. 4B and 4C are a top cover 90 of device 20 and a holding structure 92 for ensuring that there is a contact between foil 18 and the donor material 54 provided by device 20. In the illustration of FIG. 4B, the holding structure is static so that the vertical position of device 20 is fixed relative to foil 18, so that device 20 is pressed by a constant force against foil 18. In the illustration of FIG. 4C, holding structure 92 is movable 94 in the vertical direction relative to top cover 90, so that the force applied by device 20 on foil 18 can be varied. This can be achieved, for example, using an actuator 96 connected between top cover and structure 92 and configured for establishing motion 94. Actuator 96 can be, for example, in the form of a piezoelectric crystal controllable by controller 36 of system 30. The advantage of varying the vertical position of device 20 is that this allows selecting the thickness of the coating layer of donor material 54 that is formed on foil 18. A variable vertical position also allows coating foil 18 by more than one type of donor material as further detailed hereinbelow.

FIGS. 5A-G are schematic side view illustrations explaining the principles and operations of device 20 in embodiments of the present disclosure in which device 20 comprises a cavity 58 for holding donor material 54. Cavity 58 is located below inlet 22 and outlet 24, for holding donor material 54, and a bias mechanism 60 for upwardly biasing donor material 54 to establish contact between foil 18 and donor material 54 during the motion of foil 18, thereby facilitating "on the fly" coating of foil 18 by material 54 from below. Bias mechanism 60 can be in the form of, for example, a plunger 62 and a mechanical biasing member 64, such as an elastic element, e.g., a spring, for upwardly biasing plunger 62, as exemplified in FIG. 5A. Alternatively, bias mechanism 60 can comprise plunger 62 and a pressure port 66 connectable to a pump system 68 for applying fluid pressure below plunger 62 thereby to upwardly bias plunger 62, as exemplified in FIG. 5B. Optionally, a spacer 72 is used for maintaining foil 18 at a fixed vertical distance relative to device 20, but this need not necessarily be the case, since foil 18 may be maintained at a fixed vertical position by means of tensile forces applied by supply reel 14 and take-up reel 16. The pump system 68 may be a hydraulic pump, pneumatic pump, or other mechanical pump (e.g., utilizing a cylinder and piston), a reversible pump, a constant pump, or variable pump depending upon the desired application.

Use of mechanical biasing member 64 (FIG. 5A) is advantageous since it allows mechanism to be passive and does not require an external pump. A passive mechanism 60 with a mechanical biasing member is particularly useful when system 30 is configured to dispense a single donor material.

Use of pressure port 66 is advantageous since it provides controllability to the biasing applied by mechanism 60. The controllability can be by means of controller 36 that can be configured to control the pressure applied by pump system 68. The pressure can be controlled, for example, for selecting the amount or rate of donor material 54 that is applied on foil 58, wherein higher pressure applied by pump system 68 provides a higher coating rate and lower pressure applied by pump system 68 provides a lower coating rate. The control over the pressure can also be used to provide a temporally selective coating. For example, controller 36 can signal pump system 68 to bias plunger 62 during one-time interval and the cease the bias (e.g., by not applying pressure, or by reversing the operation of the pump system for applying vacuum) during another time interval. Further, the controller 36 may be provided internally or externally with respect to the laser-induced dispensing system 30. For example, the controller may be provided as a Personal Computer (PC) or other work-station that may communicate with the laser-induced dispensing system 30 via software and/or hardware that mediates between the PC and laser-induced dispensing system 30. Also, the controller may be provided directly to the laser-induced dispensing system 30 in order to control the parts thereof.

In some embodiments of the present invention, device 20 comprises a leveling device 70 positioned to level the layer of donor material 54 applied onto foil 18. In the schematic illustrations shown in FIGS. 5A-G, leveling device 70 is illustrated as a blade, while this need not necessarily be the case, since, other types of leveling mechanisms (e.g., by a rod or an air knife) are also contemplated. The advantage of having an air knife for leveling device 70 is that it allows controlling the thickness of donor material 54 on foil 18, by adjusting the gas pressure at the output of the means of air knife. Another advantage is that it eliminates the need to clean or replace the blade or rod. Excess donor material 54 removed by leveling device 70 is optionally and preferably recycled back into the cavity 58, if desired. This can be done by a dedicated conduit or by making the blade forming leveling device hollow and with fluid communication with cavity 58 such that the donor material removed by the blade flows through the blade back into the cavity.

FIGS. 5C-G are schematic illustrations of coating device 20 in embodiments in which device 20 comprises two or more cavities 58A, 58B. These embodiments are particularly useful when it is desired to dispense more than one donor material, in which case cavities 58A, 58B respectively contain different donor materials 54A and 54B. Each of the cavities is optionally and preferably in separate fluid communication with a pump system (not shown in FIGS. 5C-G, see FIG. 5B). Each cavity can communicate, with a separate pump, or, more preferably the same pump system can be used for all cavities, in which case the system can include controllable pump manifold for establishing separate fluid communication to each cavity as known in the art. The selection of the donor material that is used for coating foil 18 is optionally and preferably by means of controller 36. This can be done in more than one way.

In some embodiments of the present invention, controller 36 selects the cavity that applies the coating by controlling the pressure applied by the pump to the respective plunger. For example, controller 36 can signal the pump system to apply pressure to only to one cavity for biasing the plunger upwardly, and not to apply pressure to all other cavities (e.g., maintain the other cavities at ambient pressure). Controller 36 can also signal the pump to apply vacuum to all other cavities.

In some embodiments of the present disclosure, the cavities are movable along the vertical direction, and controller 36 can be configured for vertically displacing the cavities to intermittently generate contact between foil 18 and a donor material in the respective cavity. The locomotion of the cavities 58A and 58B can be, for example, by means of actuator 96 (not shown, see FIG. 4C) which is controllable by controller 36.

Figure 5A:
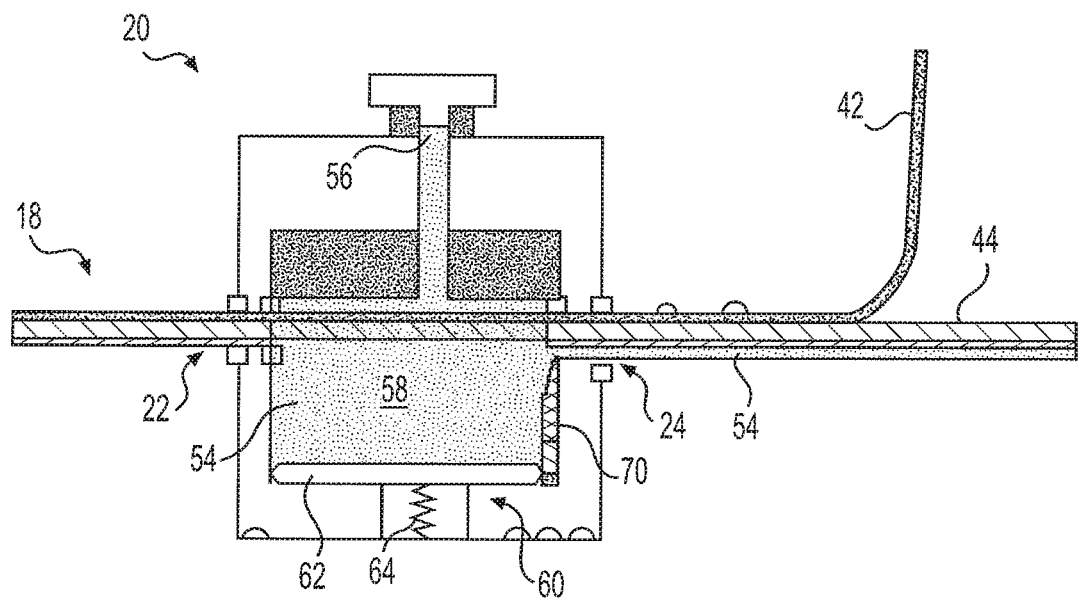
FIGS. 5A-I are schematic illustrations describing the principles and operations of the coating device in embodiments of the invention in which the coating device comprises a cavity for holding a donor material.
Figure 5B:
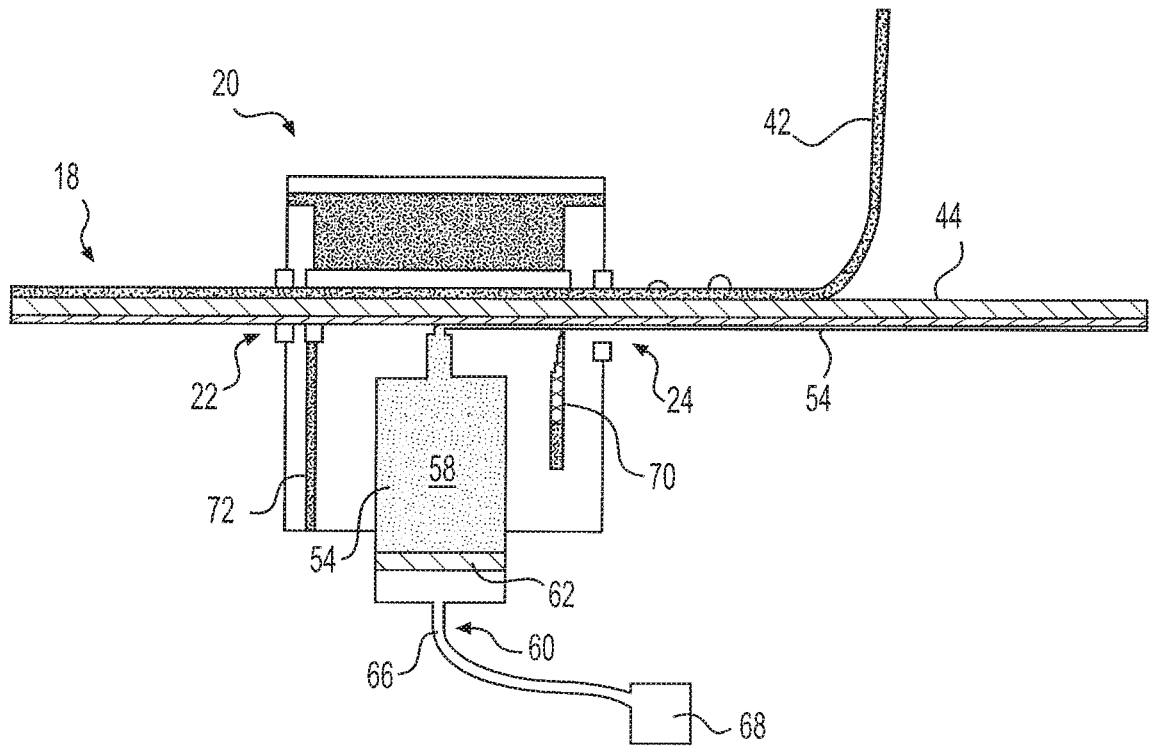
Figure 5C:
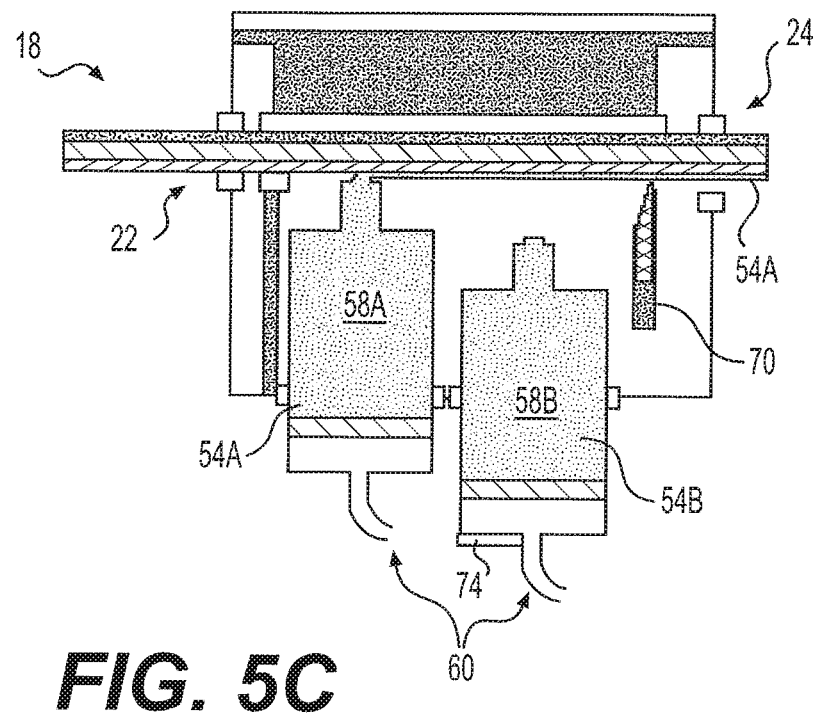
Figure 5D:
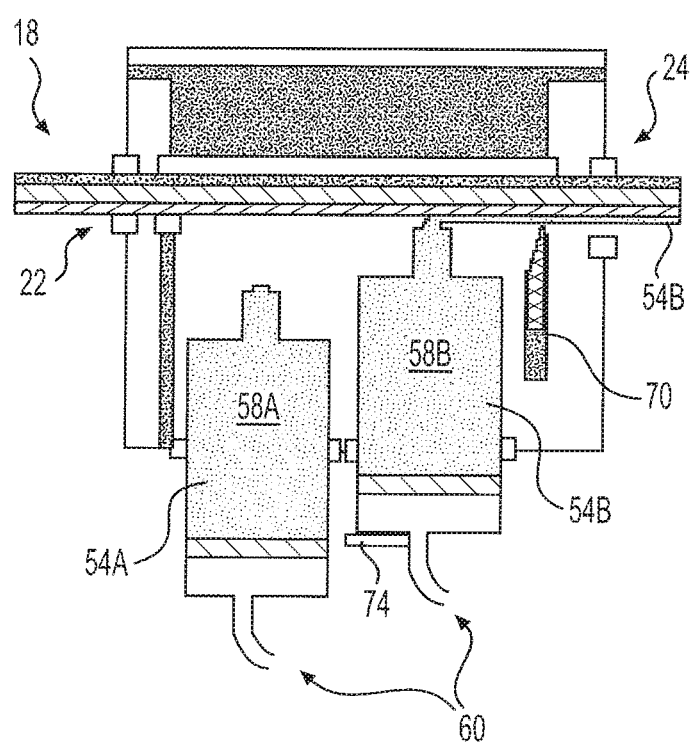

When more than one cavity is employed, the same leveling device 70 can be used for leveling donor material 54A when cavity 58A is displaced to establish contact between donor material 54A and foil 18 (FIG. 5C), and also for leveling donor material 54B when cavity 58B is displaced to establish contact between donor material 54B and foil 18 (FIG. 5D). In these embodiments, the excess donor material is optionally and preferably not recycled back into the cavities.

Figure 5E:
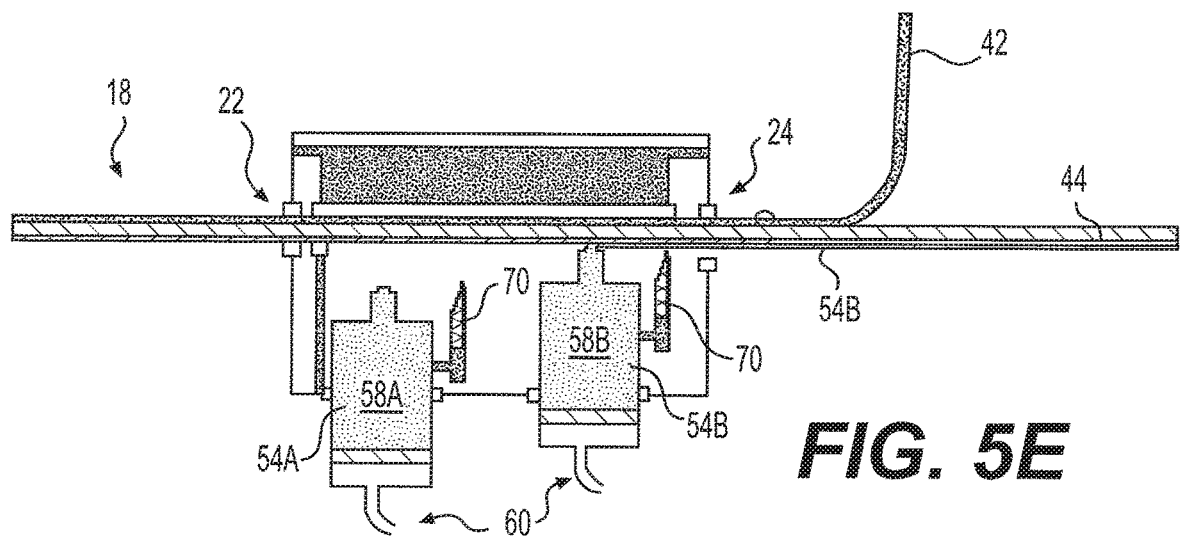
Figure 5F:
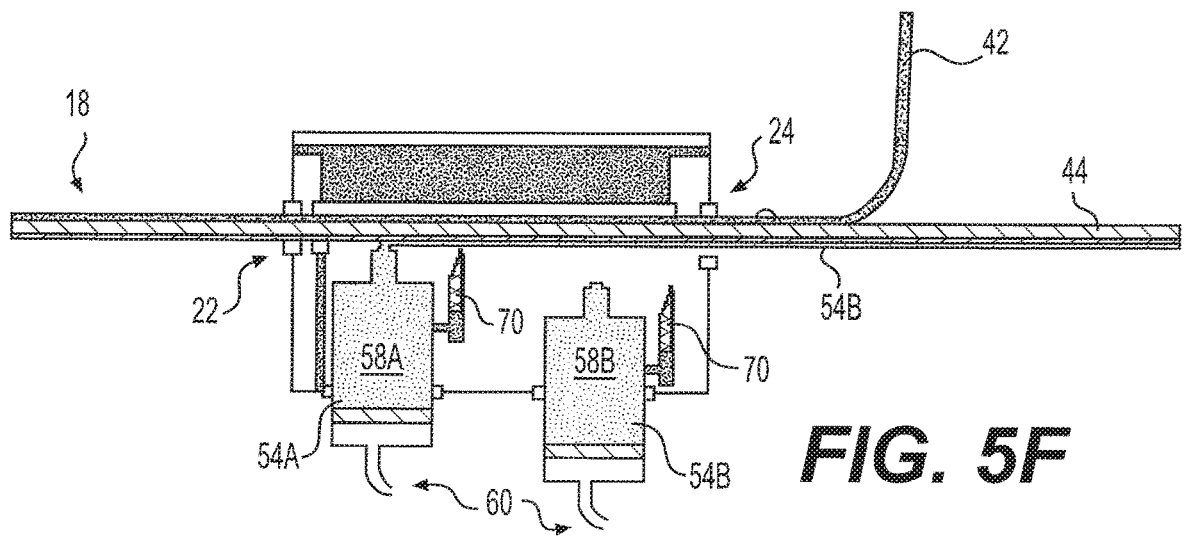

Alternatively, a separate leveling device 70 can be used for each of the cavities, as illustrated in FIGS. 5E-F. In these embodiments, each of the leveling devices can be used for recycling the respective donor material back to the respective cavity, as further detailed hereinabove. Another alternative is to mount a leveling device on a moving member (not shown) that repositions the leveling device adjacent the active cavity.

Figure 5G:
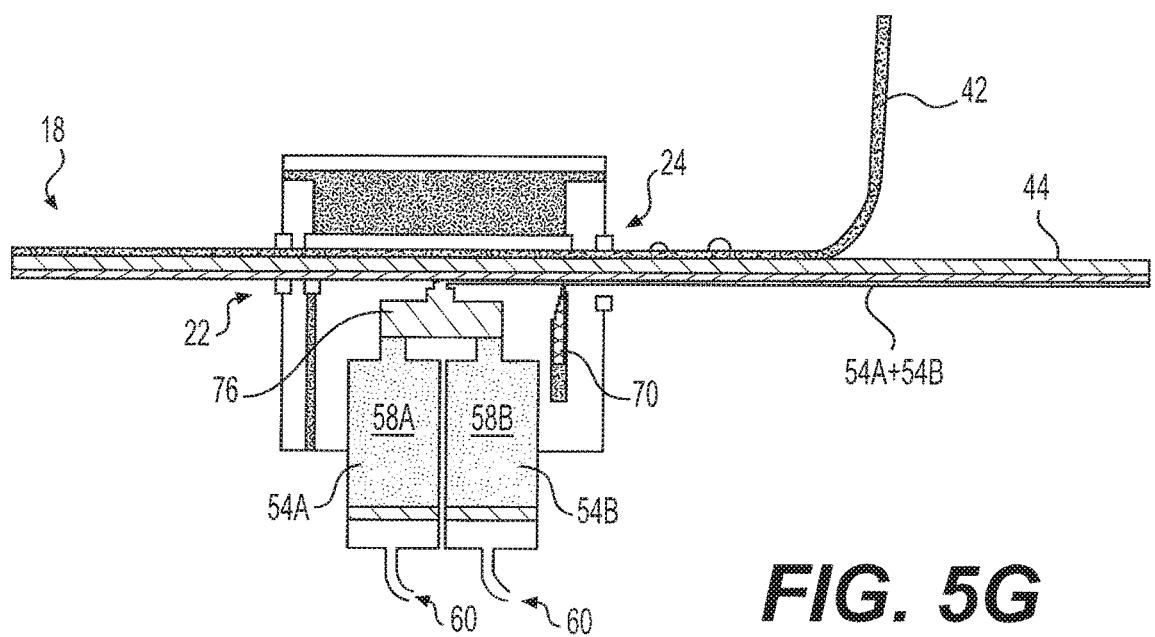
Figure 5H:
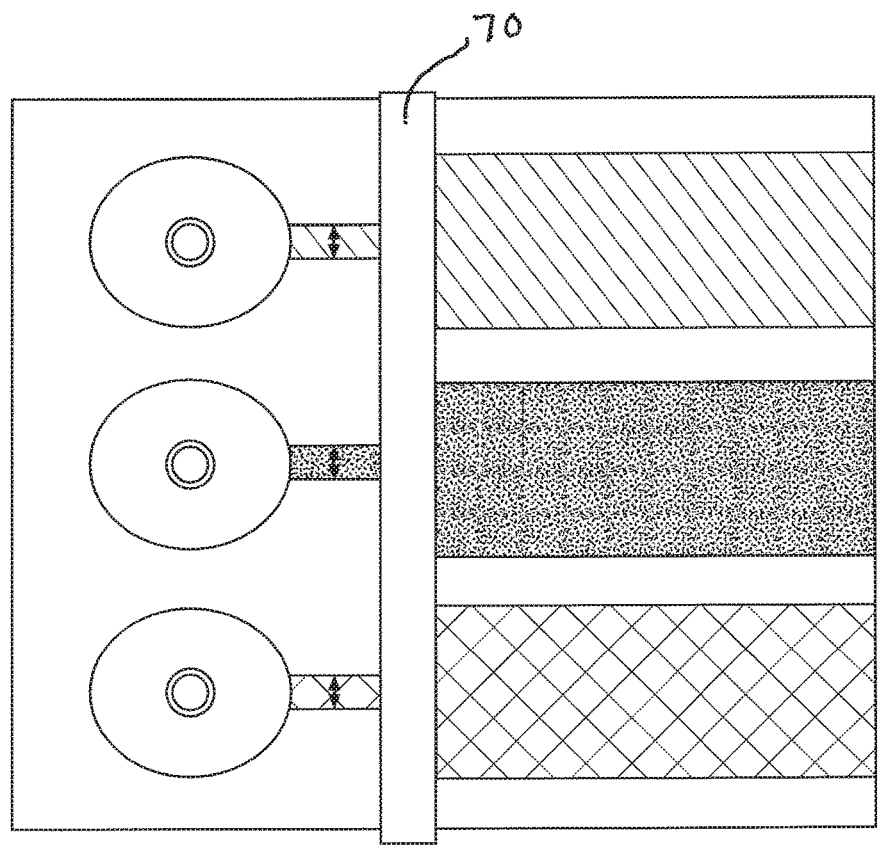
Figure 5I:
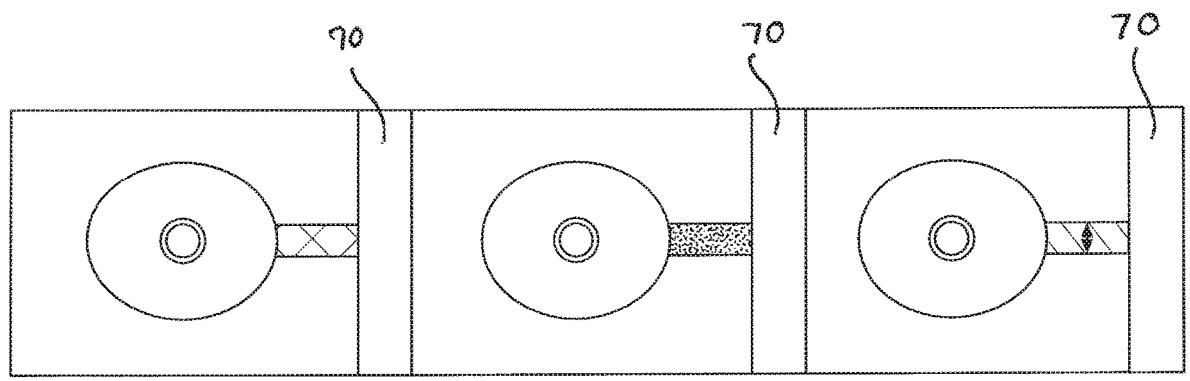

FIG. 5G is a schematic illustration of an embodiment of the present disclosure in which coating device 20 comprises a mixing chamber 76 in fluid communication with each of cavities 58A and 58B for mixing donor materials 54A and 54B prior to the coating. In these embodiments, controller 36 is optionally and preferably configured for controlling the individual pressures within cavities 58A and 58B, to provide a predetermined mixing ratio among donor materials 54A and 54B. Specifically, when it is desired to provide a mixture in which the relative volume of donor material 54A is higher than the relative volume of donor material 54B, controller 36 can control the pump system to apply higher pressure to the plunger of cavity 58A than to the plunger of cavity 58B, when it is desired to provide a mixture in which the relative volume of donor material 54A is lower than the relative volume of donor material 54B, controller 36 can control the pump system to apply lower pressure to the plunger of cavity 58A than to the plunger of cavity 58B, and when it is desired to provide a mixture in which the relative volume of donor material 54A equals the relative volume of donor material 54B, controller 36 can control the pump system to apply equal pressures to the plungers of cavities 58A and 58B. Furthermore, since multiple cavities may be provided, the features of the present disclosure enable multi-material coating. Additionally, a plurality of cavities, for example, makes it possible to deposit different donor materials in parallel along the film width. See FIG. 5H. Furthermore, when different donor materials are deposited in a series coating, a mechanical system, for example, may raise or lower each syringe (for depositing the donor material on the foil) and blade to avoid interference between the materials. See FIG. 5I. It should be appreciated that the mechanical system that raises and lowers the syringe may be, for example, a pneumatic mechanical system such as a pneumatic cylinder, a hydraulic mechanical system or a motorized system incorporating gears and other components that may convert rotational movement to linear movement. However, it should also be understood that any suitable mechanism or other arrangement for lowering and raising a coating mechanism may be provided.

FIGS. 6A and 6B are schematic illustrations of coating device 20 in embodiments of the present disclosure in which there is a source 100 of donor material 54 that is connected to coating device 20. In these embodiments, it is not necessary for device 20 to include a cavity for holding the donor material, because the donor material can be applied to foil 18 directly from source 100. In these embodiments, device 20 comprises an internal conduit 102 for delivering the donor material to foil 18. Internal conduit 102 can be connected to leveling device 70 so as to allow removal of excess donor material 54 to be removed by leveling device 70 and recycled back into the conduit 102, as further detailed hereinabove.

Internal conduit 102 can be connected to source 100 via an external conduit 104, by means of a connector 106 connecting conduits 102 and 104. A flow of donor material 54 within conduits 102 and 104 can be established by means of a pump 108. Controller 36 controls pump 108 in a temporally selective manner, depending on the timing at which it is desired to coat foil 18 by material 54 from source 100. Optionally and preferably, pump 108 is a bidirectional pump. In these embodiments, pump 108 generates an outflow of donor material 54 for coating foil 18 and an inflow of donor material for ceasing the coating process.

Several coating devices, each connectable to a separate source of a different donor material can be employed. In these embodiments, controller selectively controls the pumps of the separate sources to allow each of the different donor materials to coat foil 18, serially or contemporaneously.

Thus, several embodiments of the present disclosure provide the possibility to fabricate an object or pattern using a composite material, which is comprised of two or more individual donor materials having different colors and/or different properties other than colors. Properties other than colors can be selected from the group consisting of transparency, elasticity, electrical conductivity, magnetization, strength and the like. The individual donor materials can be selected for use on the basis of their color or properties so as to obtain a material with a third, different color or property or a combination of their colors or properties. The resulting composite material can, for example, have a property or properties different to those of each of the two or more individual donor materials used, depending on the relative amounts of each individual donor material dispensed and the order or "structure" of their deposition.

The ability of the system of the present embodiments to utilize two or more different donor materials makes it is possible to use many more, and more varied donor materials than has been possible to date in conventional LIFT systems.

The relative amounts of the different donor materials can be selected according to the desired property of the pattern or object to be fabricated. For example, when it is desired to form a pattern of a particular color, each of the respective amounts of materials can be selected to prepare the specific color.

Suitable donor materials to be used with coating device 20, in any of the above embodiments, include, without limitation, metals (e.g., aluminum, molybdenum, tin, titanium, tungsten and alloys thereof), metal oxides, dielectric materials, semiconductor material, magnetic materials, organic materials, inorganic materials, polymeric materials, and biological materials (e.g., proteins, oligopeptides, polypeptides, whole cells, biological tissues, enzymes, cofactors, nucleic acids, DNA, RNA, antibodies, antigens, oligosaccharides, polysaccharides, oligonucleotides, lectins, biotins, streptavidins, lipids). The donor material is preferably in liquid form, but may also be a powder or a suspension. When the donor material is in a powder form, the foil is optionally and preferably pre-coated or continuously coated with a glue to bind the powder to the foil.

Figure 7A:
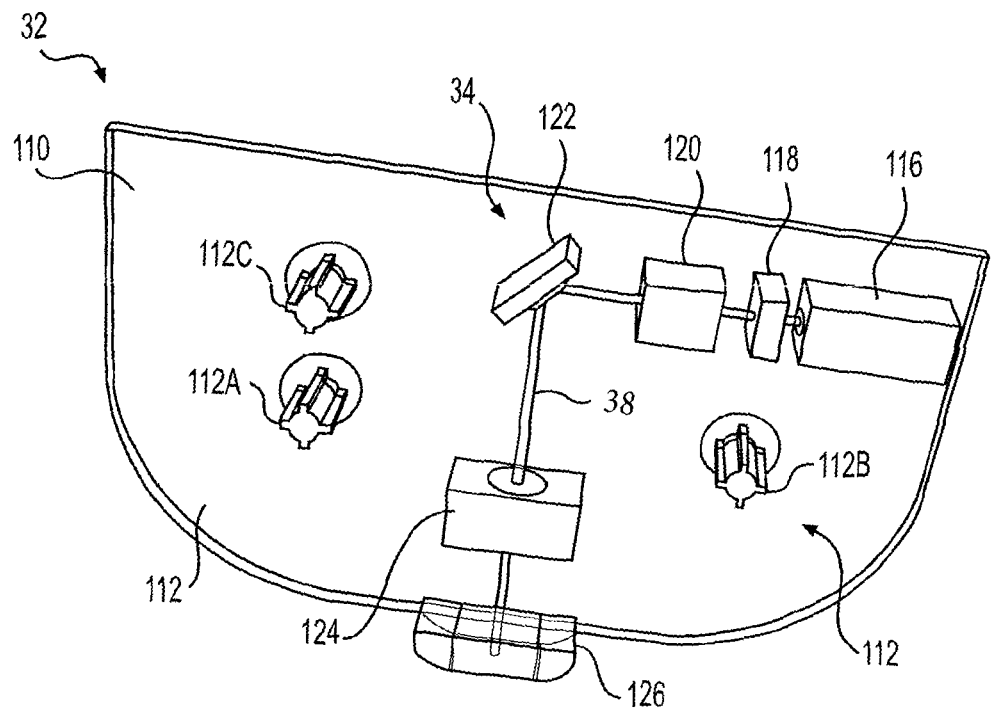
FIGS. 7A and 7B are schematic illustrations showing a top view (FIG. 7A) and a side view (FIG. 7B) of an irradiation head, according to several embodiments of the invention.
Figure 7B:
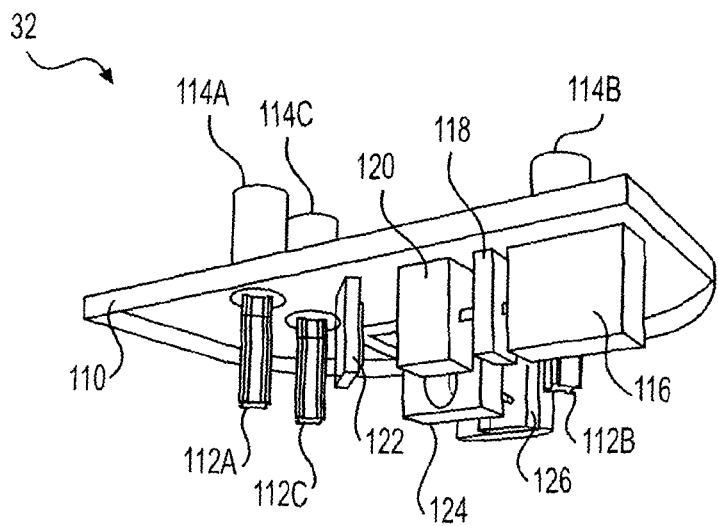

Reference is now made to FIGS. 7A and 7B which are schematic illustrations showing a top view (FIG. 7A) and a side view (FIG. 7B) of irradiation head 32, according to some embodiments of the present disclosure. Shown in FIGS. 7A and 7B is irradiation head 32 before cartridge 12 and device 20 are assembled thereon. Head 32 comprises a head body 110 and a plurality of hubs 112 rotatable mounted on body 110. In the representative illustration of FIGS. 7A and 7B, which is not to be considered as limiting, three hubs 112A, 112B and 112C are illustrated. Hub 112A can serve for rotating supply reel 14 of cartridge assembly 12, hub 112B can serve for rotating take-up reel 16 of cartridge assembly 12, and hub 112C can serve for rotating lift off reel 46 of cartridge assembly 12. Each of hubs 112A, 112B and 112C can be respectively connected to a motor 114A, 114B, 114C, such as, but not limited to, an electrical DC motor. However, it is to be understood that it is not necessary for all the hubs to be connected to a motor. For example, hub 114A can be allowed to freely rotate when hub 114B rotates to take up the foil released from the supply reel. Further, any number of hubs can be coupled to any number of motors. For example, one motor may be configured to drive multiple hubs by connecting the hub(s) and motors(s) via, for example, a belt or gear mechanism that is capable of coupling, for example, the speed of the motor with a movement (rotational or otherwise) of the hubs.

Optics 34 of head 32 can comprise a laser source 116 for generating the laser beam 38, a modulator 118 for modulating beam 38, a beam expander 120 for expanding the spot size of beam 38 following its modulation, an optical scanning device 122 for scanning the beam following its expansion, and an optical focusing element 124 for focusing beam 38. Laser source 116 can be embodied as a solid-state microchip having a semiconductor diode pump laser providing a pump beam, and a microchip laser cavity, as known in the art. Also, the laser source can be selected to provide a laser beam suitable for an intended application. For example, the laser source 116 can be selected to provide a laser beam having a wavelength within the range of from about 450 nm to about 650 nm.

Modulator 118 optionally and preferably applies a spatial grayscale intensity modulation to beam 38 to shape its intensity profile. A number of competing technologies may be used as a spatial light modulator. Digital micro mirror devices are particularly useful as such commercially available devices having a transmission wave length from the ultraviolet to the infrared thereby enabling light more freedom of choice in the selection of a laser light source. Other types of modulators, such as, but not limited to, a liquid crystal modulator and an acousto-optic modulator, are also contemplated.

Beam expander 120 can be a diffractive or refractive beam expander, and can be selected to increase the spot size of beam 38 by any amount. Preferably, beam expander 120 provides at least a twofold increase of the spot's diameter. The expansion of the beam reduces divergence, and is also advantageous since it allows the focusing element 124 to take advantage of a reduction in spot size.

Optical scanning device 122 can be embodied as a scanning mirror, or a digital light processing (DLP) system, and focusing element 124 can be a refractive lens system or a diffractive system.

Head 32 optionally and preferably comprises a foil holder 126 for holding foil 18 of cartridge assembly 12. Preferably holder 126 is transparent to beam 38. Alternatively, holder can include an aperture through which beam 38 passes to imping on foil 18. Holder 126 is preferably rotatable so as to adjust the orientation of foil 18 relative to beam 38. Holder 126 is preferably displaceable (e.g., vertically movable) along the direction of beam 38 so as to adjust the distance between foil 18 and focusing element 124 thereby to ensure focusing of beam 38 onto foil 18. However, it should be appreciated that the holder 26 may be moveable (or displaceable) in any direction in order to adjust a distance or orientations between the foil 18 and focusing element 124.

An additional feature of the present disclosure is that the laser beam may be delivered to head 32 from an external source, in which case optics 34 couples laser beam 38 to irradiation head 32 from an external laser source. At least one advantage of this feature is that it allows using a larger scale laser system and a larger scale optics to generate and optionally also modulate and/or expand beam 38. Thus, in accordance with the aforementioned feature it is not necessary for head 32 to include laser source 116, and it is optionally and preferably not necessary for head 32 to include modulator 118 and/or beam expander 120.

Representative example(s) that may employ the above feature is illustrated in FIGS. 8A-E.

Figure 8A:
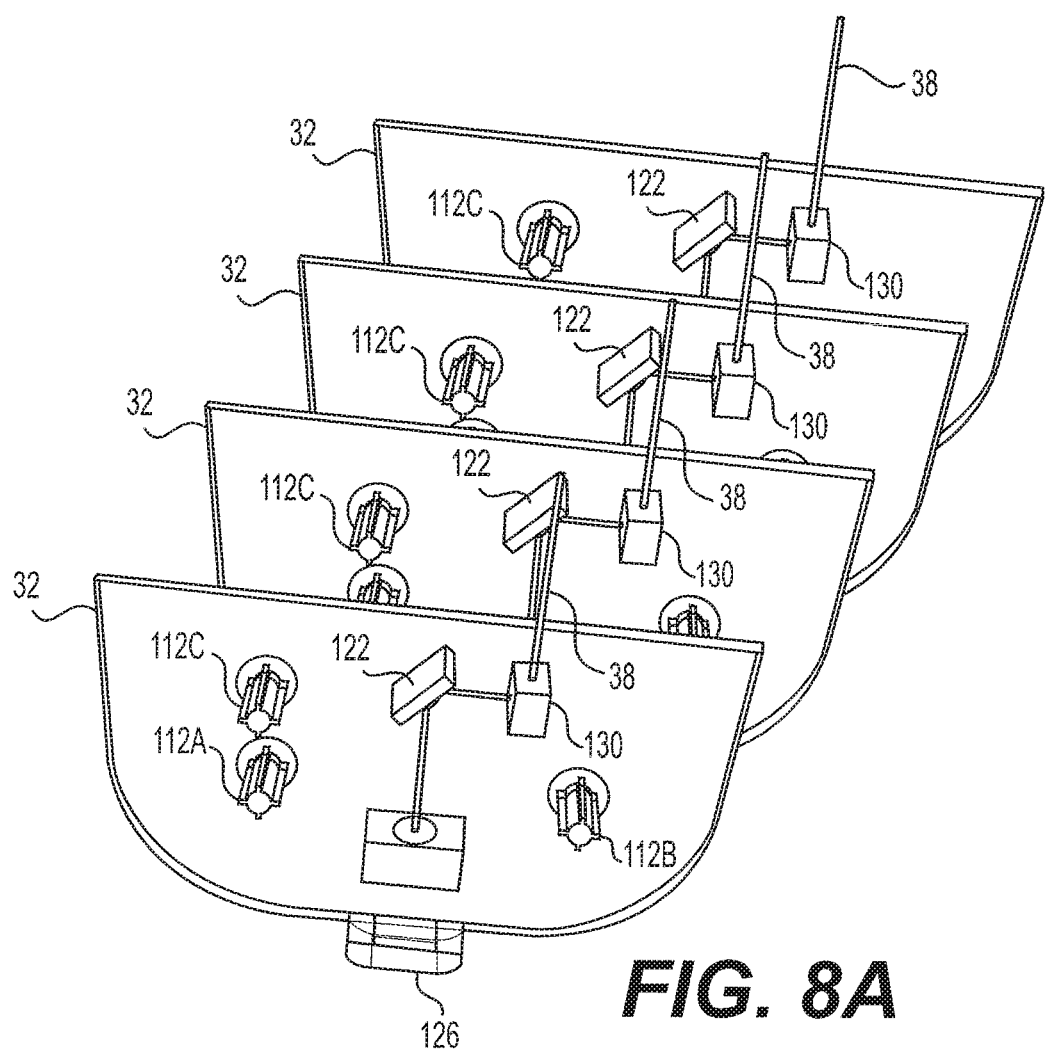
FIG. 8A is a schematic illustrating a plurality of irradiation heads.
Figure 8B:
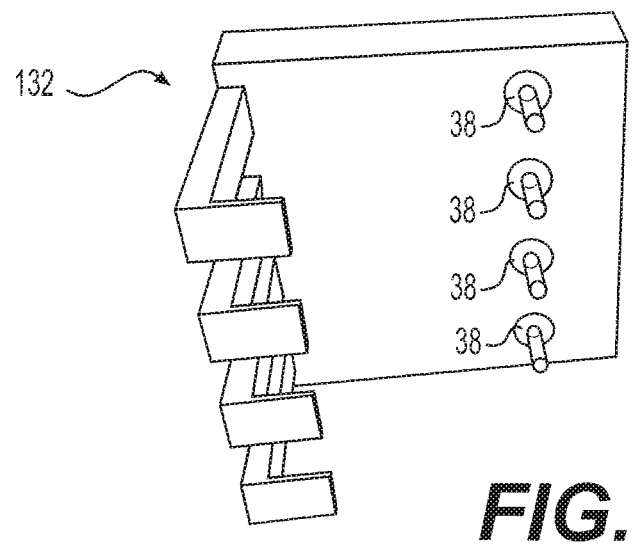
FIG. 8B is a schematic illustration of a multi-slot structure constructed and designed for receiving the plurality of irradiation heads.

Shown in FIG. 8A is a plurality of irradiation heads 32 each comprising an optical coupler 130 that couples a laser beam 38 from an external source (not shown) into the respective head. FIG. 8B is a schematic illustration of a multi-slot structure 132 constructed and designed for receiving the irradiation heads 32 and providing a light beam 38 to each head to be coupled thereto by a respective optical coupler. Each of beams 38 can be generated by a separate laser source, but, more preferably, a single source can be used for all the heads, wherein the laser beam generated by the laser source can be used or scanned to serially be used by the individual heads, or split into secondary beams that are coupled by couplers 130. While FIGS. 8A-B illustrate embodiments in which an external laser source is used with a plurality of irradiation heads, some embodiments of the present disclosure also contemplate use of external laser source when system 30 comprises a single irradiation head.

Figure 8C:
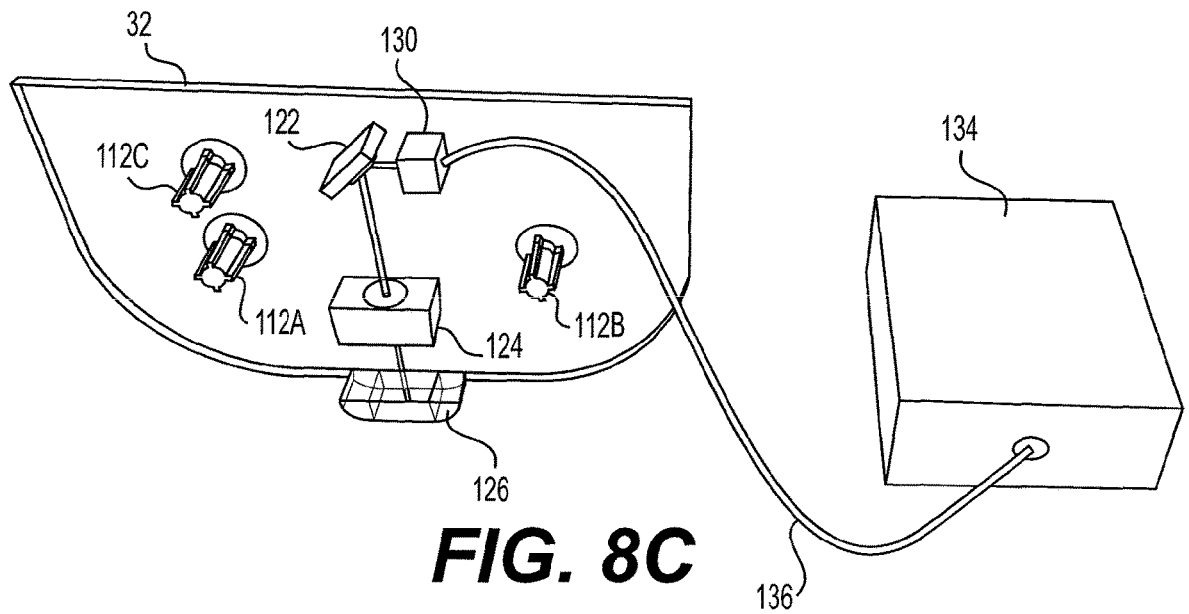
FIG. 8C is a schematic illustration in which the laser beam is delivered to head from an external laser source by an optical waveguide.
Figure 8D:
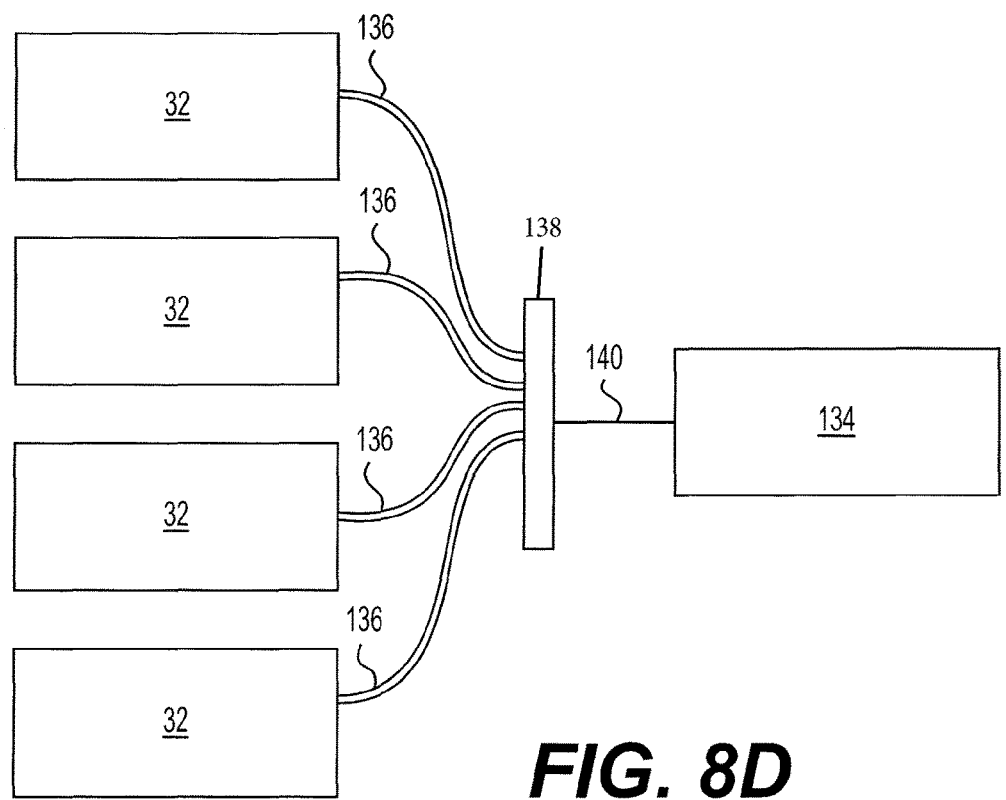
FIG. 8D, which illustrates a similar configuration to FIG. 8C, illustrates a plurality of heads in which case a respective plurality of waveguides (e.g., a fiber bundle) can be used to deliver a respective plurality of beams to the heads.

FIG. 8C is a schematic illustration in which the laser beam is delivered to head 32 from an external laser source 134 by means of an optical waveguide 136, such as, but not limited to, an optical fiber, in which case optical coupler 130 is connectable to waveguide 136. FIG. 8D illustrates a similar configuration with a plurality of heads 32, in which case a respective plurality of waveguides 136 (e.g., a fiber bundle) can be used to deliver a respective plurality of beams to the heads 32. The beams can be split, by a multiway beam splitter 138 that receives an output beam 140 from external laser source 134, splits output beam 140 into a plurality of secondary beams, and couples each secondary beam into one of the waveguides 136.

The use of optical waveguides 136 is advantageous because it allows the head 32 to be devoid of scanning parts.

Figure 8E:
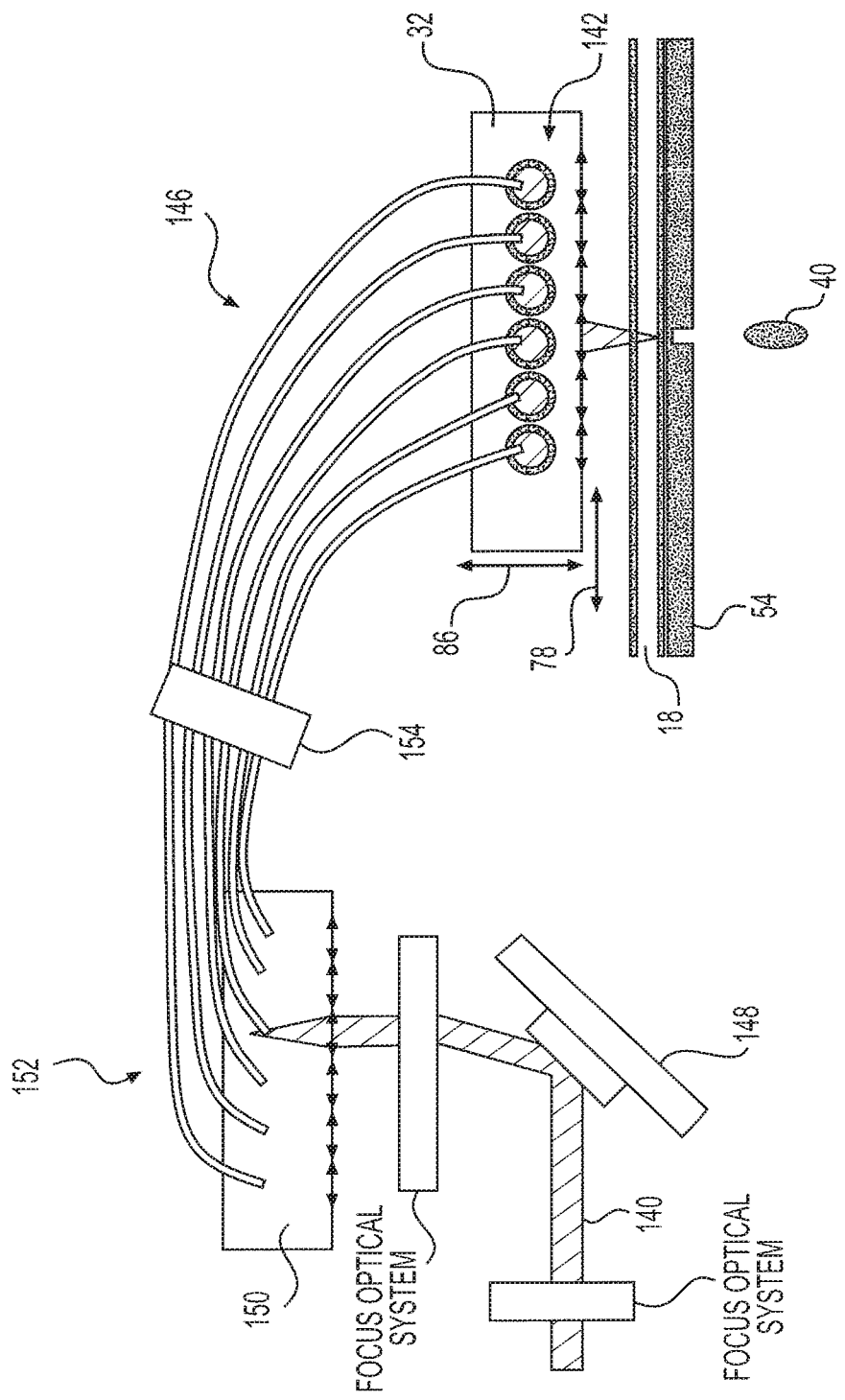
FIG. 8E is a schematic illustration of an embodiment in which irradiation head comprises an array of optical nozzles.

FIG. 8E is a schematic illustration of an embodiment in which irradiation head 32 comprises an array 142 of optical nozzles, for generating a respective plurality of laser beam focal spots. Each optical nozzle can include a separate focusing element and include a separate optical coupler for receiving a waveguide 146 guiding a beam to be focused by the focusing element of the respective nozzle. The individual beams can be provided from an output beam 140 from of an external laser source (not shown). For example, a beam scanning system 148 can be used for scanning the output laser beam 140 to selectively couple laser beam 140 into the optical nozzles 142. In the representative example illustrated in FIG. 8E, which is not to be considered as limiting, beam scanning system 148 scans output laser beam 140 to selectively couple beam 140 onto an a lens element of an external lens array 150, which couples the beam 140 into a respective optical waveguide 152. An optical waveguide connector 154 is used for connecting waveguides 152 to waveguides 146.

The nozzle array of the head can be arranged in a manner such that a plurality of rows of donor material are formed on the substrate when the head performs a lateral motion along a direction generally perpendicularly to the lengthwise direction of the array.

Figure 9A:
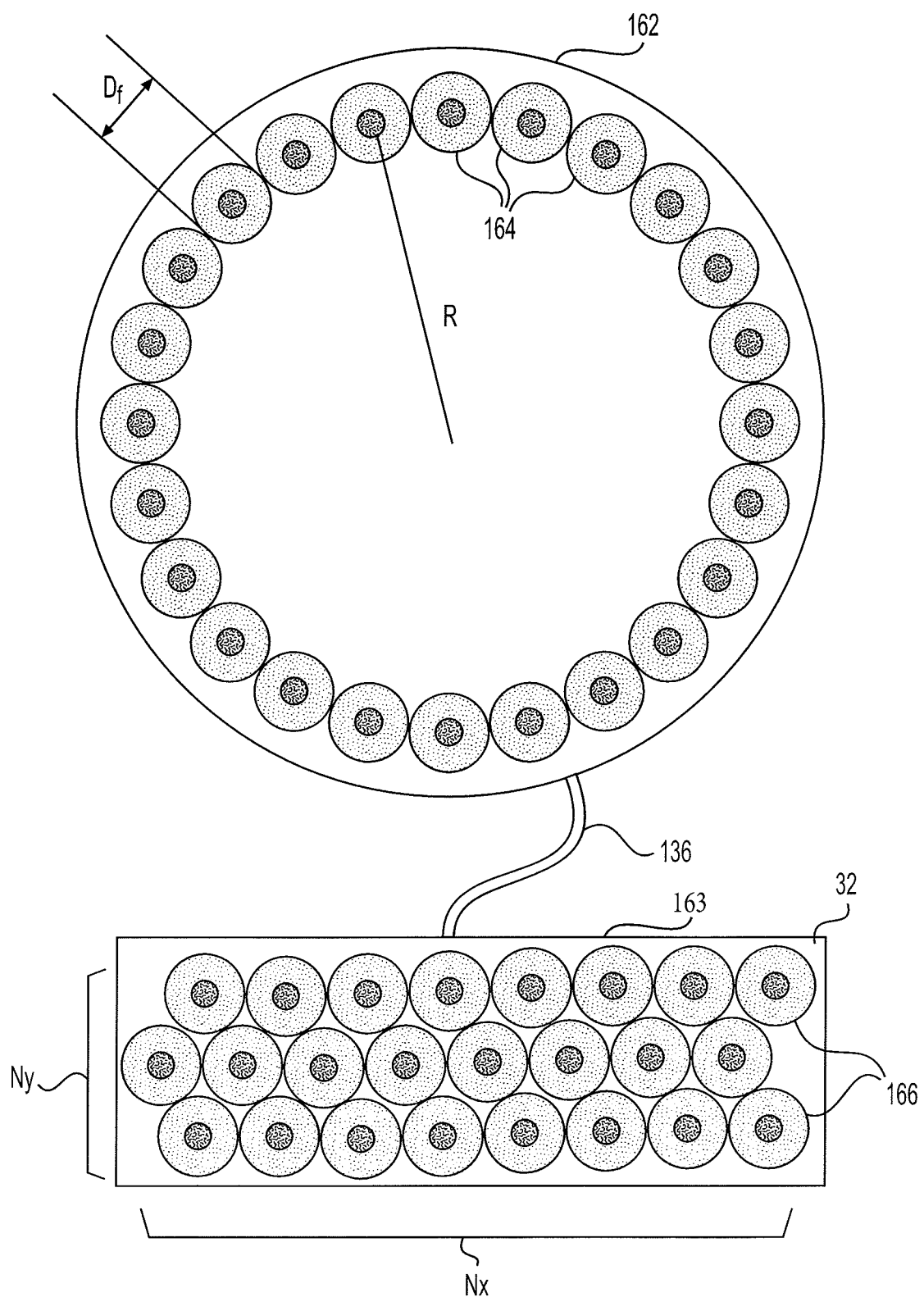
FIGS. 9A-9F are schematic illustrations of embodiments in which a laser beam is delivered to a multi-nozzle head by plurality of waveguides, wherein the light beam is coupled into waveguides by means of a rounded optical coupler.
Figure 9B:
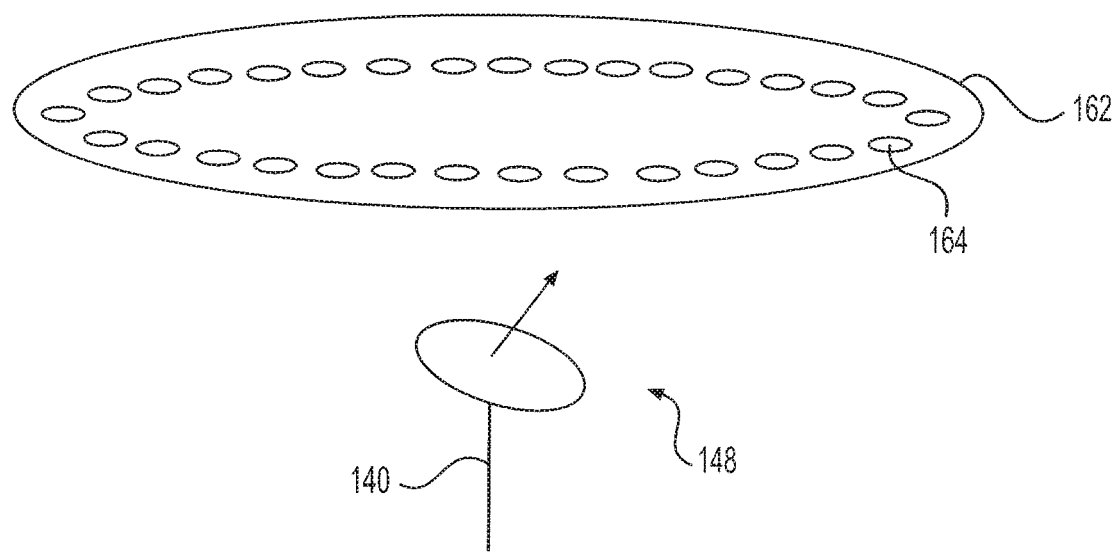

FIGS. 9A and 9B are schematic illustrations of embodiments of the present disclosure in which the laser beam 140 is delivered to a multi-nozzle head 32 by a plurality of waveguides 136 (e.g., a fiber bundle), wherein the light beam is coupled into waveguides 136 by means of a rounded (e.g., circular, elliptical, and oval) multi-port optical coupler 162 (or first interface). In these embodiments, the entry ports 164 of waveguides 136 are arranged on coupler 162 to form one or more concentric closed round shapes, e.g., circles, ovals and ellipses. The exit ports 166 of waveguides 136 can be arranged on head 32 in a rectangular or interlaced manner.

Figure 9C:
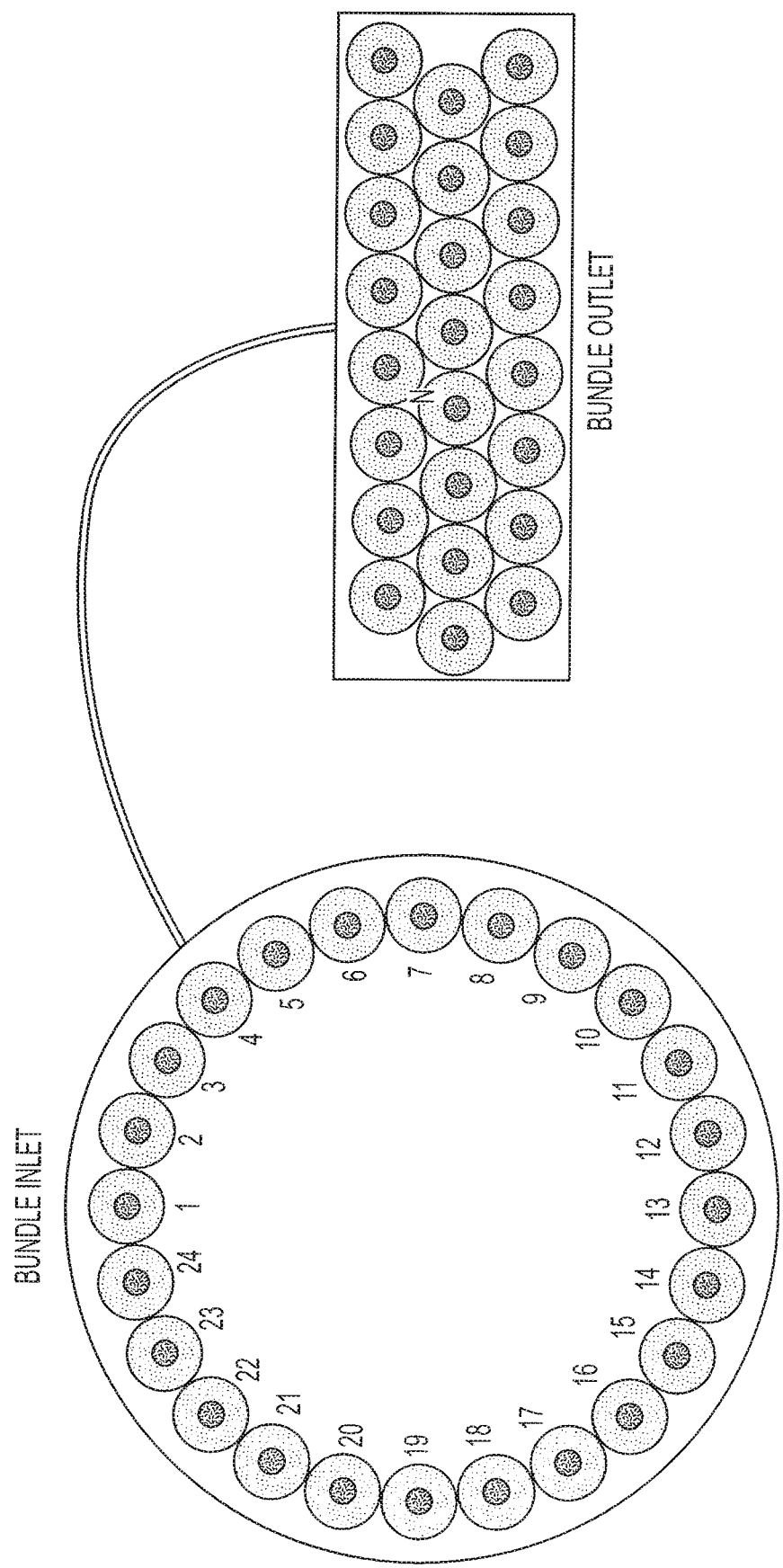
Figure 9D:
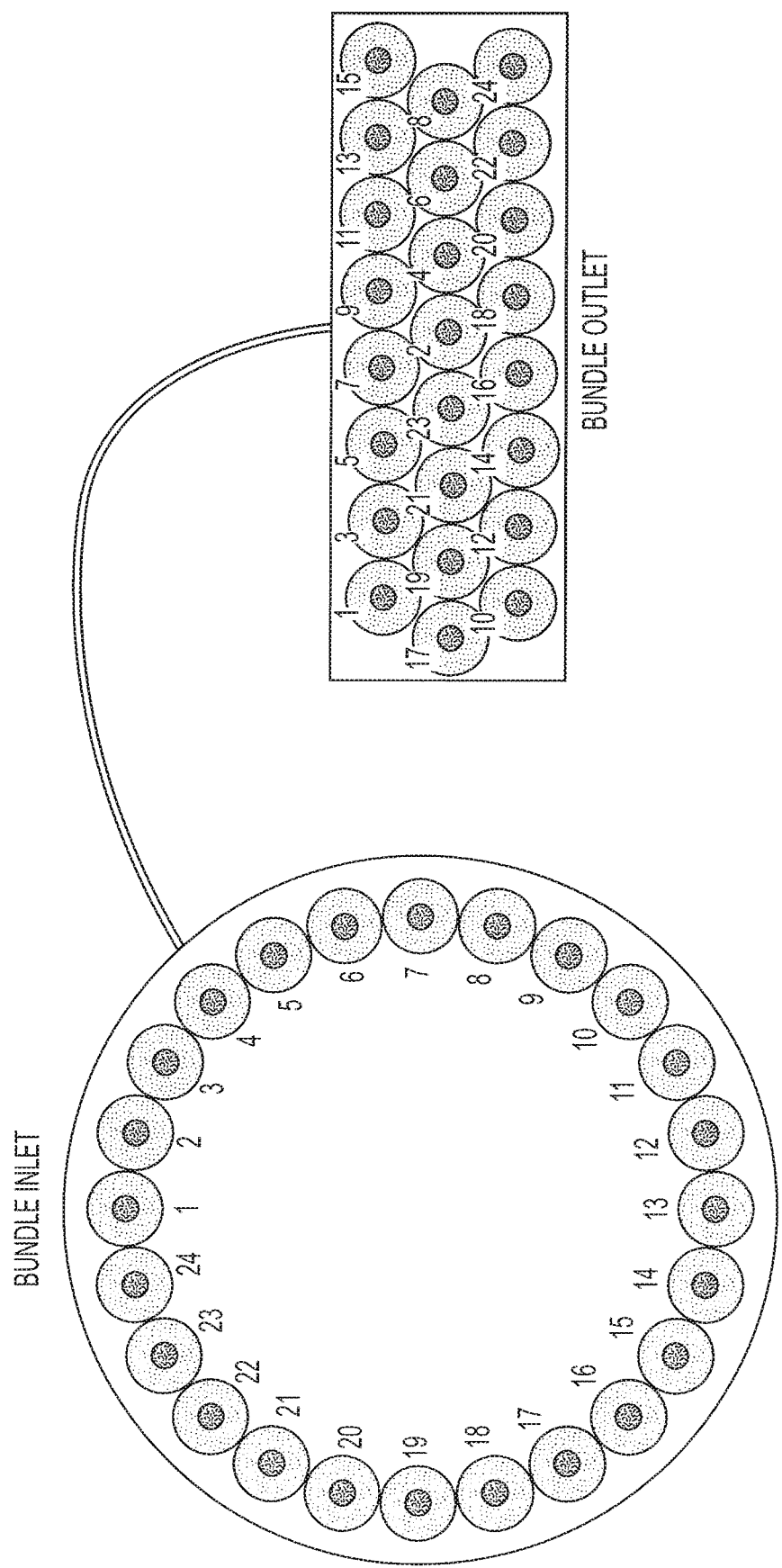

Also, FIG. 9C illustrates an exemplary feature of arranging each of the optical fibers such that all of the optical fibers having a first end that is adjacent to a first end of another of the optical fibers at the first interface has a second end that is non-adjacent to a second end of the another of the optical fibers at the second interface. It is noted that the fiber bundle may include any number of optical fibers necessary or desired for a given application. For example, a bundle with optical fibers represented by Nt may be arranged such that the fibers at the inlet are sequentially ordered and the fibers at the outlet are arranged with a specified gap (or separated by a predefined number of intervening fibers). For example, N at the outlet may be represented by $(N-1)+\Delta$, where $\Delta$ may define a constant gap of any predetermined or desired number, but preferably between 1 to 3. FIG. 9D illustrates an example where $\Delta=1$.

The number of optical fibers may be provided in any suitable number. For example, the number of optical fibers may be in the range of approximately 1,000-2,000. However, this number could be higher or lower depending upon the given application and desired resolution. For example, by providing a greater number of optical fibers the donor material may be deposited at a higher resolution. Similarly, if a higher resolution is not required for a given application, the number of optical fibers may be reduced accordingly.

Additionally, the scanning system may be provided such that pulse of the laser defines a scan rate. For example, the scan rate may be 100,000 pulses per second and could range between 10,000 and 700,000 pulses per second depending upon the given application. As an even further alternative, a continuous laser may be provided with an optical shutter than selectively blocks the laser beam in a manner that the laser beam only enters entry ports of the desired optical fibers. For example, the optical shutter may move in and out of a path of the laser beam so as to block the laser beam from entering entry ports of optical fibers that are not intended to transmit the laser beam toward a surface of, for example, the donor material.

Also, the shutter mechanism could be provided with an aperture that opens and closes to selectively allow the laser beam from a laser source to enter only desired optical fibers that are provided at the first interface.

As an even further alternative, such a shutter mechanism could be provided separately from the laser source at a position intermediate the laser source and entry ports of the optical fibers and/or at a position intermediate the exit ports of the optical fibers and the donor material to be deposited on a substrate.

The laser-induced dispensing system 30 for material processing may incorporate the fiber bundle illustrated in FIGS. 9A and 9B. The optical fibers of the fiber bundle 136 may receive laser beams (e.g., generated by pulsing the laser) from a laser source 134 at a first interface 162 of the fiber bundle and transmit the laser beams from a second interface 163 of the fiber bundle 136.

Further, the optical fibers may have first ends (e.g., entry ports 164) arranged at the first interface 162 and second ends (e.g., exit ports 166) arranged at the second interface 163. Optics may be provided to direct the laser beams transmitted from the second interface 163 by the optical fibers toward a material to be deposited on a substrate. For example, the optics provided to the optical fiber bundle in FIG. 9A may include an array of optical nozzles as illustrated, for example, in FIG. 8E, i.e., in order to provide the multi-nozzle head 32. Additionally, in the present context "laser beams" may refer to the plurality of light emissions produced by "pulsing" the laser beam 140 generated by the laser source 134.

Further, optics provided to the fiber bundle in FIG. 9A may focus the laser beams on the material to be deposited and, as a result, cause the material to be deposited to be released onto the substrate as illustrated in, for example, FIG. 2A. Additionally, each of the optical fibers may be arranged such that all of the optical fibers having a first end that is adjacent to a first end of another of the optical fibers at the first interface have a second end that is non-adjacent to a second end of the of the optical fibers at the second interface.

In the present context, adjacent refers to an arrangement in which there are no intervening ends of optical fibers positioned between the specified optical fibers that are immediately next to each other. Further, non-adjacent refers to an arrangement in which there is at least an intervening end of an optical fiber that is positioned between the specified optical fibers. Preferably the number of intervening optical fibers may be between 1 and 3. However, the number of intervening optical fibers may be selected to be suitable based upon the given application.

Additionally, the laser-induced dispensing system may be provided such that the print head (e.g., multi-nozzle head 32) includes the optics and the laser source may be an external laser source provided external to the print head 32. Further, the first ends of the optical fibers may be arranged at the first interface in any suitable polygonal configuration (e.g., rectangular, triangular, trapezoidal, etc.) and the second ends of the optical fibers may also be arranged at the second interface in a polygonal configuration.

In an alternative arrangement, the first ends 164 of the optical fibers may be arranged at the first interface 162 in one of a circular, elliptical and oval configuration and the second ends 166 of the optical fibers may be arranged at the second interface 163 in a polygonal configuration. See FIG. 9A.

Additionally, a beam scanning system 148 may be provided to scan the laser beams from the laser source 134 so as to selectively couple laser beams outputted from the laser source 134 onto a lens element of an external lens array. For example, the first interface 162 (or coupler) of the fiber bundle in FIG. 9A may be provided with an external lens array similar to the arrangement illustrated in FIG. 8E (see, for example, 150 in FIG. 8E). The external lens array may couple the outputted laser beams into respective optical fibers 136 by transmitting the outputted laser beams into the first ends 164 of the optical fibers at the first interface 162.

Figure 10A:
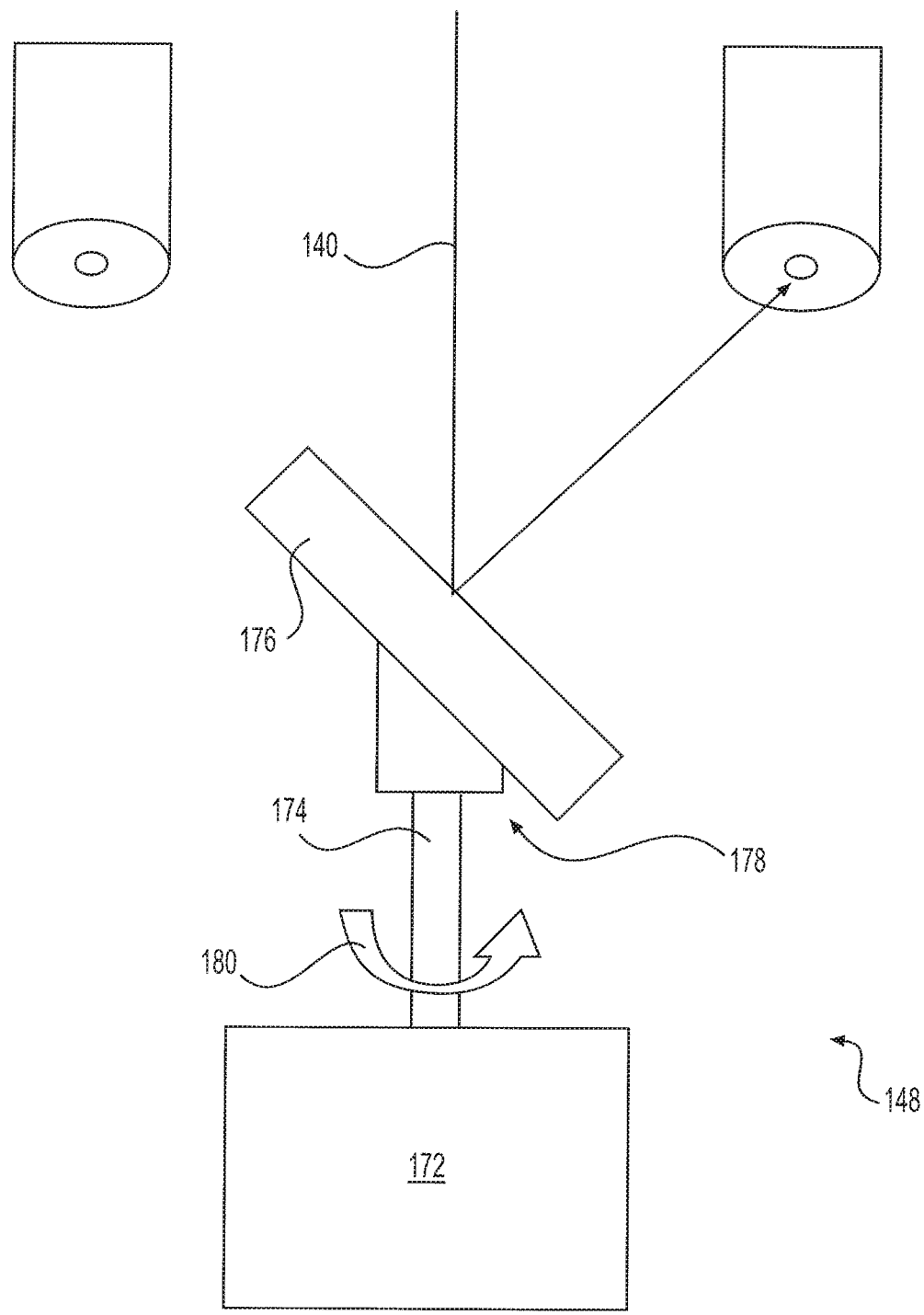
FIG. 10A is a schematic illustration of a rotary mirror system, according to some embodiments of the present disclosure.
Figure 10B:
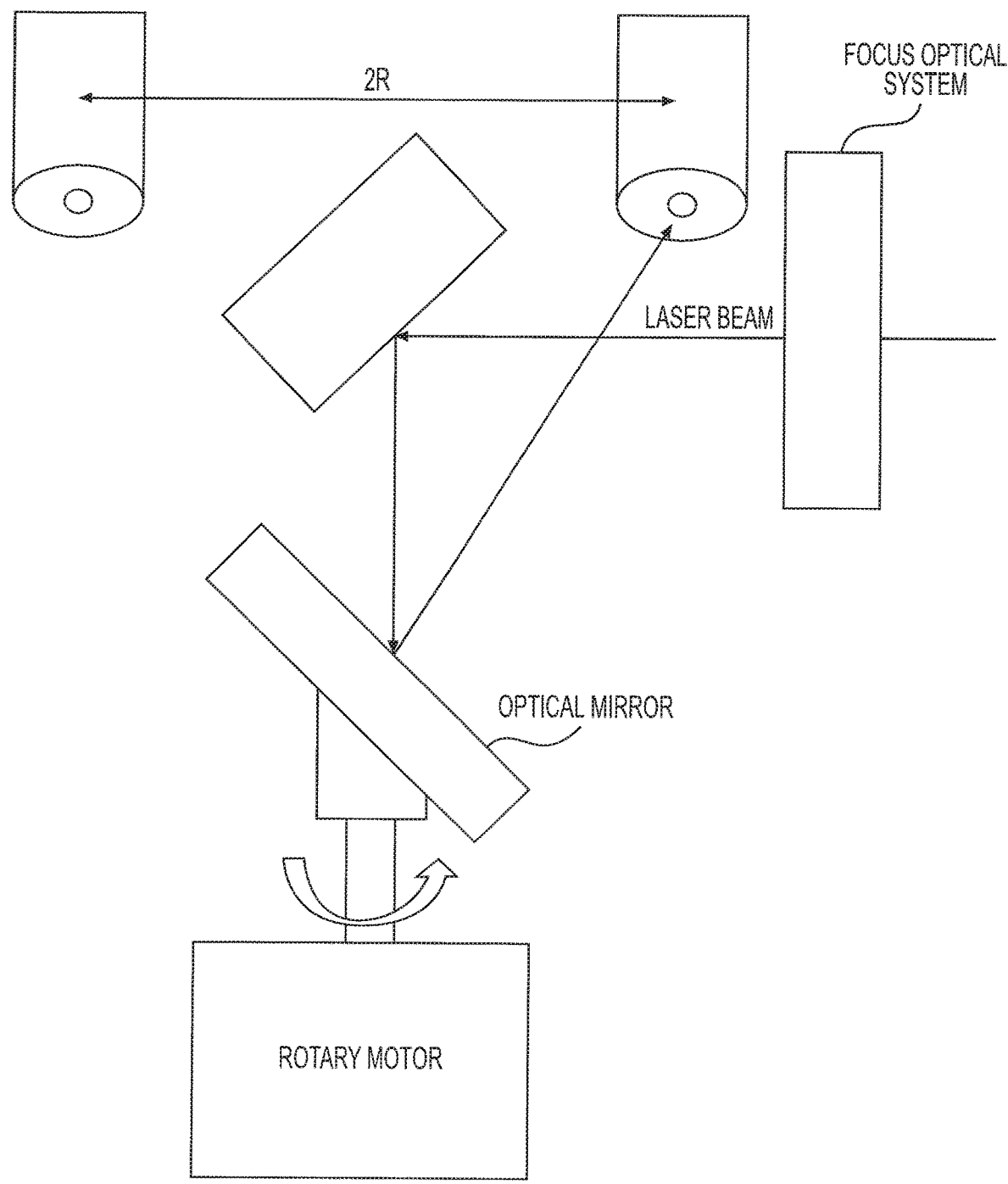
FIG. 10B is a schematic illustration of a folding mirror system, according to some embodiments of the present disclosure.
Figure 10C:
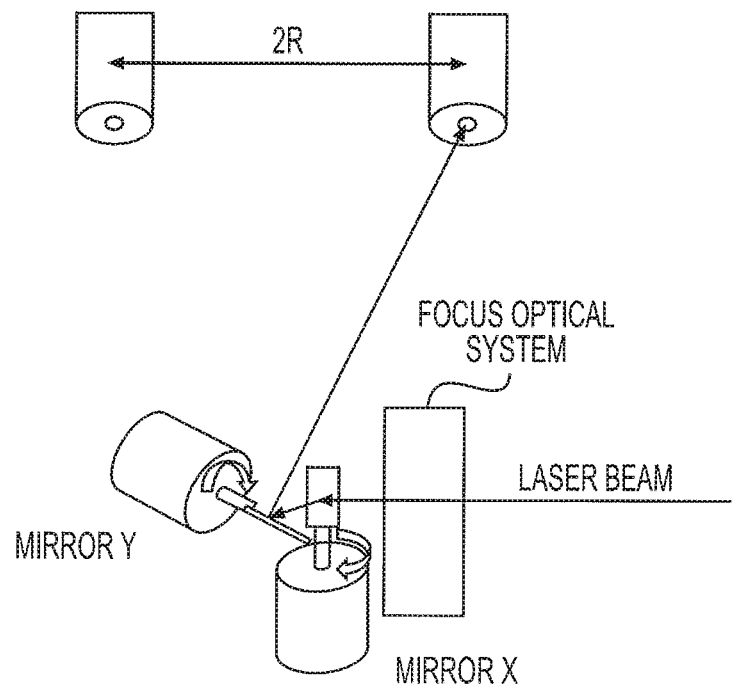
FIG. 10C is a schematic illustration of a two mirror system having a focus optical system positioned intermediate the two mirror system and entry ports of the optical fiber bundle, according to some embodiments of the present disclosure.
Figure 10D:
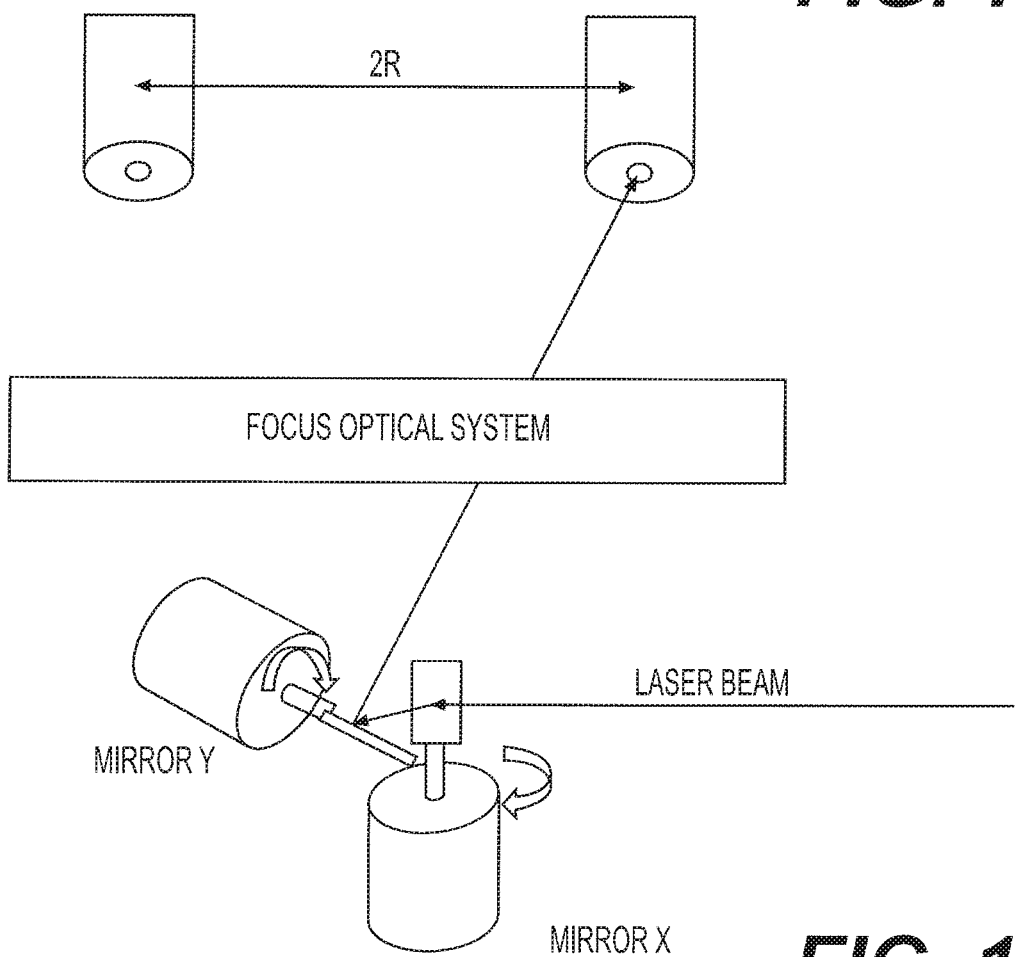
FIG. 10D is a schematic illustration of a two mirror system having a focus optical system positioned in front of the two mirror system so as to focus the laser beam onto the two mirror system, according to some embodiments of the present disclosure.

The beam scanning system 148 may also include a motor 172, a shaft 174 connected to the motor 172, and a reflecting mirror 176 mounted at an end of the shaft 174 so as to be oriented at angle with respect to a rotational axis of the shaft 174. This arrangement allows the shaft to rotate and, in turn, causes the reflecting mirror 176 to also rotate. As a result, the outputted laser beams may be sequentially reflected into the first ends 164 of the optical fibers at the first interface 162. Further, the motor 172 may be rotated at a constant speed. See FIG. 10A, which is a schematic illustration of the scanning system 148. Further, the scanning system may include a folding mirror assembly as illustrated in FIG. 10B. As an even further alternative, the scanning system may include a two mirror system in which galvo mirrors and/or a resonating mirror is provided to reflect the laser beam. The focus optical system may be provided upstream or downstream, of the two mirrors. See FIGS. 10C and 10D.

Additionally, the second ends of the optical fibers 166 at the second interface 163 may be connected to a corresponding array of optical nozzles that generate respective laser beam focal spots that are configured to be focused on the material to be deposited. The optical nozzle may be in an arrangement similar to 142 illustrated in FIG. 8E. As also described with respect to FIG. 8E, when the multi-nozzle head 32 of FIG. 9A is provided with an array of optical nozzles, each of the optical nozzles may also include a respective focusing element that focuses respective laser beams transmitted from the second ends 166 of the optical fibers at the second interface 163.

Furthermore, the second ends 166 of the optical fibers themselves may function as an array of "virtual nozzles" by directly emitting laser beams onto a donor material.

The optical fibers may be multi-mode optical fibers. For example, each of the multi-mode optical fibers may have a core diameter of at least 25 μm and a cladding diameter of at least 65 μm. Additionally, the array of optical nozzles may be arranged such that successive emitted laser beams are emitted from non-adjacent ones of the array of optical nozzles as the outputted laser beams from the laser source are coupled into the first ends 164 of the optical fibers at the first interface 162.

In the present context, non-adjacent refers to an arrangement in which there is at least an intervening nozzle that is positioned between the specified nozzles.

Further, the fiber bundle in FIG. 9A may be provided in a plurality and incorporated into a plurality of separate print heads having a respective array of optical nozzles (i.e., in a manner similar to the arrangement illustrated in FIG. 8D in which fiber bundles are connected to corresponding print heads 32).

Additionally, a method of dispensing a donor material on a receiver substrate is provided. For example, the method may include outputting laser beams from a laser source, providing a fiber bundle having optical fibers that receive the laser beams at a first interface of the fiber bundle and transmit the laser beams from a second interface of the fiber bundle, and arranging first ends of the optical fibers at the first interface and arranging second ends of the optical fibers at the second interface.

The fiber bundle in FIG. 9A, when incorporated into the system illustrated in FIG. 2A, provides a preferable arrangement in which optics may focus the laser beams on the donor material, thereby causing droplets of the donor material to be released and deposited onto the receiver substrate. The laser beams may be focused on the donor material at a predetermined intensity such that an energy absorbed by the donor material from the focused laser beams causes the droplets of the donor material to be released. As a result, each of successive droplets of the donor material may be released in a non-adjacent order.

The laser beams may be focused on the donor material through the light transmissive layer and each of successively emitted laser beams, among the focused laser beams, may be emitted from the second ends of the optical fibers in a non-adjacent order so as to cause release of the droplets in the non-adjacent manner. As shown in FIG. 10A, the scanning system 148 in embodiments of the present disclosure in which a rotary mirror system is employed. These embodiments are particularly useful in configurations in which a rounded (e.g., circular, oval, elliptical, etc.) multi-port optical coupler is employed. In these embodiments, system 148 comprises the motor 172, such as, but not limited to, a DC or AC electric motor. Motor 172 rotates a shaft element 174 on which the focusing (or reflecting) mirror 176 is mounted at an angle 178 to shaft element 174. Upon rotation 180 of shaft element 174 by rotor 172, focusing mirror 176 also rotates and sequentially focuses (or reflects) light beam 140 onto the entry ports 164 of bundle 136.

The advantage of having a rounded (e.g., circular, oval, elliptical, etc.) multi-port optical coupler 162, is that it facilitates high throughput printing since it allows in-coupling of the light beam in a more efficient way as compared to a rectangular coupler. This issue will now be explained. When a rectangular coupler is used, the scanning system 148 accelerates at the beginning of each line of entry ports of the optical waveguides and decelerates at the end of each line. The acceleration and deceleration are typically executed at an offset from the entry ports of the optical waveguides to allow scanning the entry ports at constant speed. In such a configuration, the printing process is temporarily ceased at the end of each line. When a rounded (e.g., circular, oval, elliptical, etc.) optical coupler is employed, the scanning system 148 can perform a continuous rotary motion at constant speed, since the end of a scan cycle is also the beginning of the next scan cycle. An additional advantage of a circular multi-port optical coupler is that with such a coupler the scanning system can include a resonating mirror, which is more robust and less expensive than linear optical scanners. In other words, the circular multi-port optical coupler of the present disclosure does not require acceleration or deceleration and therefore, is free of printing interruption or an undesirable "relaxation time." Additionally, the aforementioned features allow, for example, use of a resonating mirror, which is much more robust and cheaper than linear optical scanners of the same velocity.

In some embodiments of the present disclosure, the fibers are connected to coupler 162 such that successive drops are deposited from non-adjacent optical nozzles on head 32. This can be done by crossing the fibers in bundle 136 such that fibers that have adjacent entry ports 164 at coupler 162 have non-adjacent exit ports at head 32. The advantage of this embodiment is that it improves the throughput of printing as will now be explained. When the laser-induced printer dispenses two droplets that are close to each other, it is oftentimes necessary to apply a relaxation time of a few milliseconds during which no droplet is dispensed. Such a relaxation time reduces the throughput. It is typically not possible to exploit the relaxation time for depositing droplets spaced apart from the most-recently deposited droplets, since this requires high acceleration of the beam. The present embodiment allows for depositing droplets spaced apart from each other using a constant angular speed of the laser beam, since adjacent entry ports correspond to non-adjacent exit port.

As a representative example for the motion of the beam over coupler 162, consider a configuration in which coupler 162 is circular, and the scanning system 148 imparts on beam 140 a rotary motion according to the set of equations:

$$X(t)=R\cos(\omega t) \text{ and } Y(t)=R\sin(\omega t)$$

where X and Y are the rectangular coordinate of the intersection between beam 140 and coupler 162, R is the distance between entry ports 164 and the center of coupler 162 and ω is the angular speed of system 148. Or more simply put, R may be a radius of the bundle. The laser frequency f can satisfy the equation $\omega=D_f f/L$, where $D_f$ is the diameter of each entry port 164 and L is the length of head 32. In this case, each lengthwise row of head 32 has about $Nx=L/D_f$ exit ports, and each widthwise column of head 32 has about $Ny=2\pi R/(L \cdot N_{head})$ exit ports, where $N_{head}$ is the number of heads in system 30. The linear velocity of the film can be set to $fD_f^2/L$. As a numerical example, suppose that the scanning system 148 has a resonant mirror rotation at a frequency of about 2 kHz ad positioned at an angle of about 20° relative to the normal to the plane of coupler 162. Suppose further that R is about 60 mm, the focus length of system 148 is about 200 mm, the diameter of beam 140 is 6 mm and the diameter $D_f$ of the entry port is 125 μm. In this case, it was found by the present inventor that the dispensing speed can be above $10^6$ drops per second.

Further, as illustrated in FIG. 17A, a circular motion at the inlet of the fiber bundle can be provided to satisfy the following set of equations:

$$X(t)=R\cos(\omega t) \text{ and } Y(t)=R \cdot a \cdot \sin(\omega t),$$

where R is the distance between entry ports of the optical fibers and the center of the coupler, "a" is an elliptic factor, and ω is the angular speed of system.

Additionally, a scanning velocity of the beam at the distance R from the center may satisfy the equation: $V_s = \omega R$.

Furthermore, so that each pulse of the laser beam having a frequency "f" may enter the center of the optical fiber, the circular motion at the inlet of the optical fiber bundle may also be provided to satisfy the equation $V_s = fD$. With "D" being the diameter of the optical fiber.

Therefore, the angular velocity of the system may be provided to satisfy the equation:

$$\omega = \frac{D \cdot f}{R}$$

Also, as illustrated in FIG. 17B, the printing area may be defined by a generally rectangular shape with width Ly and length Lx and the film motion at the outlet of the fiber bundle may be provided to satisfy the following set of equations:

$$Lx = Nx \cdot D$$

$$Ly = Ny \cdot D$$

$$N\text{head} = Nx \cdot Ny$$

where $N_x$ is the number of fibers in the length direction at the outlet, $N_Y$ is the number of fibers in the width direction at the outlet, and $N_{head}$ is the total number of fibers.

Further, the time to complete the printing in the area may be:

$$t = \frac{Ny \cdot Nx}{f}$$

Additionally, the film velocity may be provided to satisfy the equation:

$$Vf = \frac{Ly}{t} = \frac{Ny \cdot D}{\left(\frac{Ny \cdot Nx}{f}\right)} = \frac{D \cdot f}{Nx} = \frac{D^2 \cdot f}{Lx}$$

Also, the angular velocity may be provided to satisfy the equation:

$$Vf = \frac{D^2 \cdot \left(\frac{D \cdot \omega}{R}\right)}{Lx} = \frac{D^3 \cdot \omega}{Lx \cdot \left(\frac{N_{head} \cdot D}{2 \cdot \pi}\right)} = \frac{2 \cdot \pi \cdot D^2 \cdot \omega}{Lx \cdot N_{head}}$$

Figure 11A:
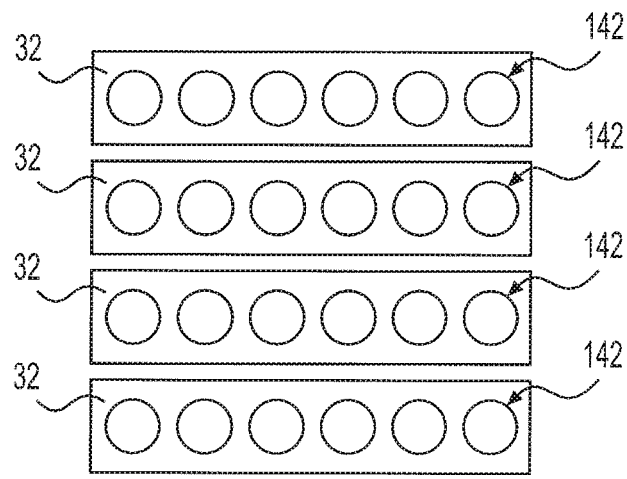
FIGS. 11A and 11B are schematic illustrations two-dimensional arrays of nozzles, according to several embodiments of the invention.
Figure 11B:
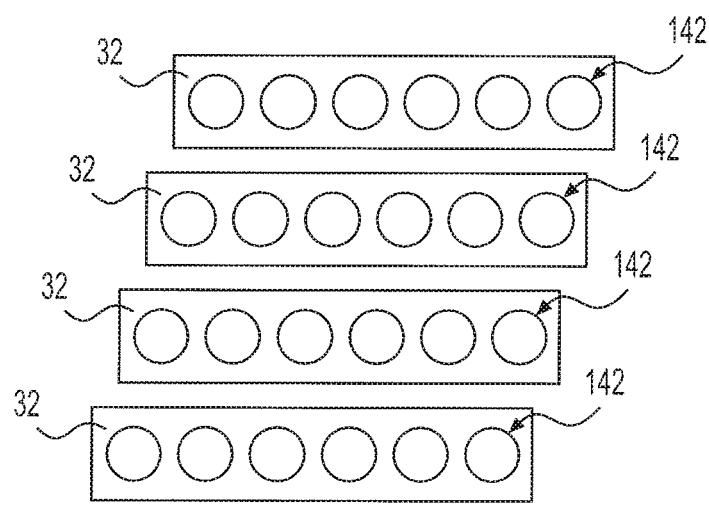

System 30 can also employ a plurality of irradiation heads, each comprising an array of optical nozzles. The heads can be aligned to form a two-dimensional array of nozzles, and scanning system 148 can provide two-dimensional scanning, both among individual optical nozzles of the same head and among arrays of different heads. These embodiments are illustrated in FIGS. 11A and 11B, showing a plurality of heads 32 each having an array 142 of optical nozzles arranged to form a two-dimensional nozzle array. The advantage of this configuration is that it provides high throughput and that it provides more flexibility in dispensing more than one type of material. For example, each irradiation head 32 can be mounted with a coating device providing a different donor material, and the controller can control the operation of scanning system 148 to dispense the different materials according to a two-dimensional bitmap describing the pattern or the layers of the object to be formed. The arrays of heads can be registered such that the nozzles of different heads are one behind the other, as illustrated in FIG. 11A, or, alternatively, they can be registered in an interlaced fashion as illustrated in FIG. 11B. The advantage of the latter embodiment is that it increases the resolution of the formed pattern, and also increases the throughput since more rows can be formed upon a single lateral motion along a direction generally perpendicularly to the lengthwise direction of the arrays.

Further, as illustrated in FIG. 18, at least one of the optical fibers of the optical fiber bundle may be connected to a light detector. Therefore, accuracy of the scanning system may be ensured by connecting the optical fiber(s) of the optical fiber bundle to the light detector. As a result, matching or conformity between the laser frequency and the scanning velocity can be ensured and corrected if necessary. For example, each time a laser beam is coupled into the at least one optical fiber that is connected to the light detector, e.g., a position of an optical mirror of the scanning system can be determined based upon information received.

The light detector may be a Si photodiode; Photo-thermal Sensor, Pyroelectric Sensor or any other device suitable for detecting light. Furthermore, an attenuator may be provided between the optical fiber and light detector and order to reduce the power of the laser beam received by the light detector.

In any of the above embodiments, the laser beam can be of any wavelength from about 300 nm to about 2000 nm, more preferably from about 800 nm to about 1200 nm, e.g., about 1064 nm, and can be generated by any laser source, including, without limitation, an. Nd:YAG laser source, an Nd:YLF laser source, an Nd:YVO4 laser source, an Nd:GdVO4 laser source, a Yb:YAG laser source, an Er:YAG laser source, an Er:Cr:YSGG laser source, an Er:YSGG laser source, and a Gd:WO4 laser source. The laser beam can be operated at a pulse duration of from about 2 ns to about 200 ns, or from about 3 ns to about 8 ns, or from about 4 ns to about 6 ns, e.g., about 5 ns. The pulse energy of the laser beam is preferably less than 100 µJ or less than 80 µJ or less than 60 µJ, e.g., 50 µJ or less. The pulse repetition frequency can be from about 10 kHz to about 700 kHz.

In any of the above embodiments, the following dimensions for the foil 18 can be employed. Width from about 2 cm to about 10 cm, hub radius (e.g., hubs 112A-C, FIG. 7A) from 0.2 cm to about 0.5 cm, length from about 10 m to about 500 m, overall thickness from about 50 µm to about 150 µm, thickness of heat conducting layer from about 15 nm to about 25 nm (e.g., about 20 nm), thickness of passivation layer from about 5 nm to about 15 nm (e.g., about 10 nm), thickness of protective layer from about 5 µm to about 15 µm (e.g., about 10 µm).

In any of the above embodiments, the rolling speed of foil 18 can be from about 10 mm/s to about 10 m/s.

As used herein the term "about" refers to ±10%.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the present disclosure may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of the present disclosure may be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable subcombination or as suitable in any other described embodiment of the present disclosure. Certain features described in the context of various embodiments are not to be considered essential features of those embodiments, unless the embodiment is inoperative without those elements.

Various embodiments and features of the present disclosure as delineated hereinabove and as claimed in the claims section below find support in the following examples.

EXAMPLES

Reference is now made to the following examples, which together with the above descriptions illustrate some embodiments of the present disclosure in a non limiting fashion.

Figure 12:
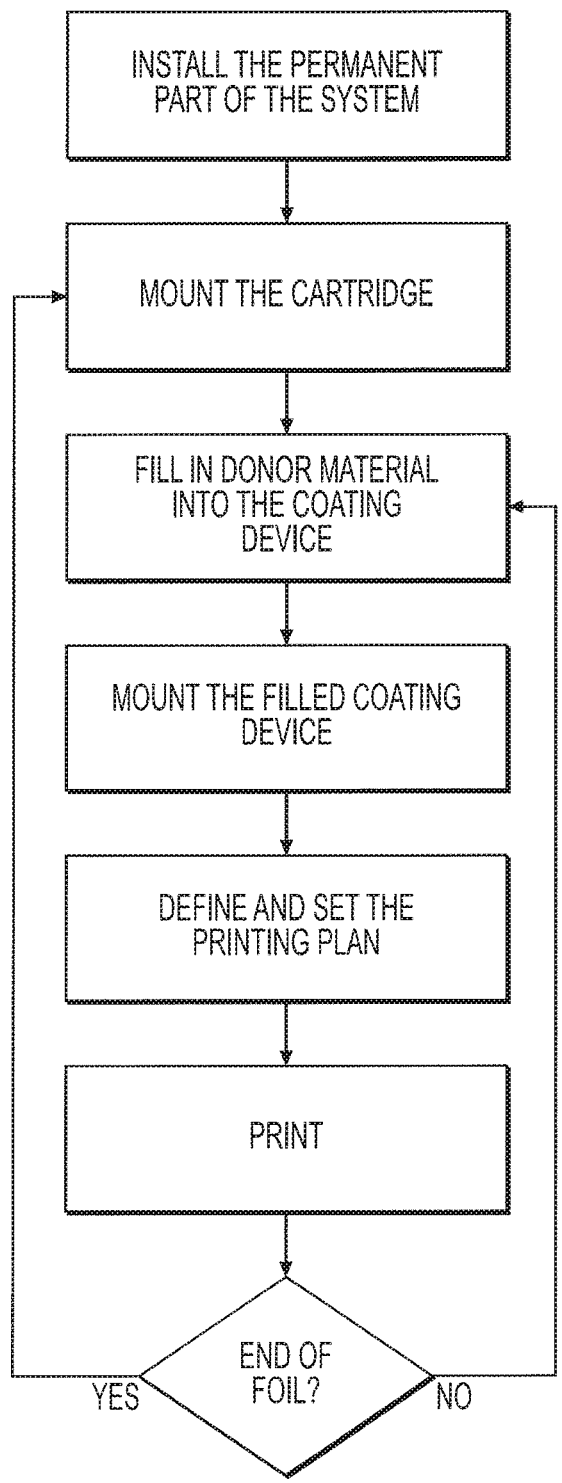
FIG. 12 is a flowchart diagram illustrating a printing scenario according to some embodiments of the present invention.
Figure 13A:
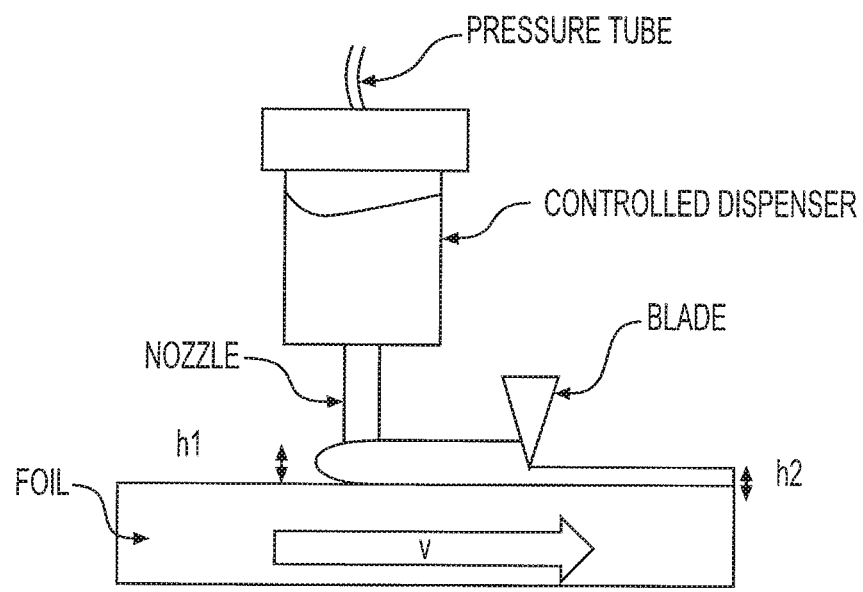
FIGS. 13A and 13B are illustrations of a side view (FIG. 13A) and a top view (FIG. 13B) of a preferred design of a blade coating device, according to some embodiments of the present invention.
Figure 13B:
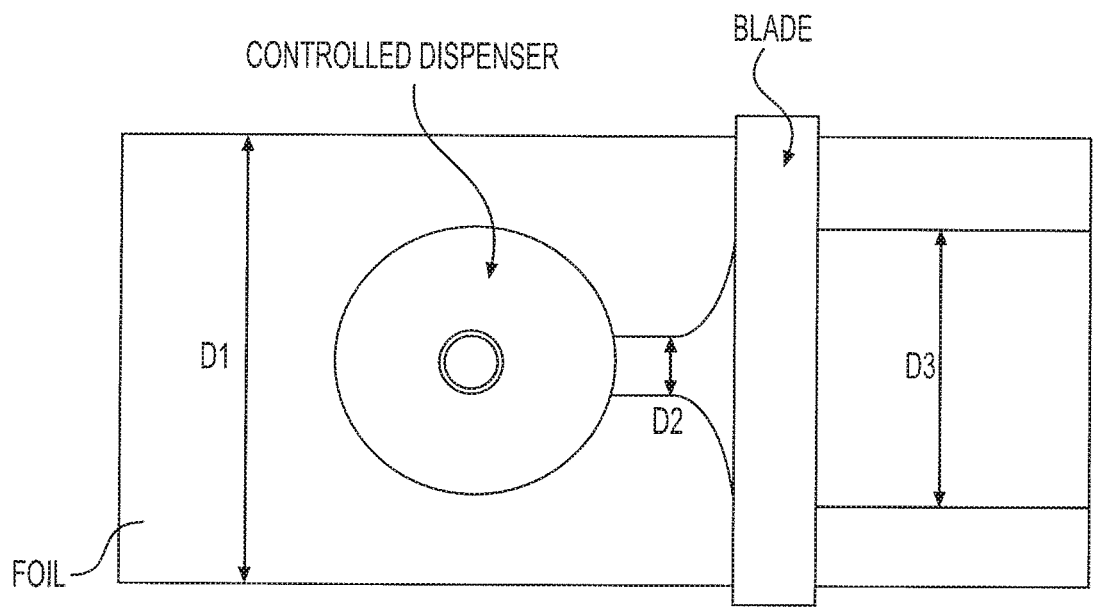

A printing scenario according to some embodiments of the present disclosure is illustrated in the flowchart diagram of FIG. 12. Once laser-induced dispensing system is installed, the cartridge assembly is mounted on the system. Donor material is filled into the coating device, and the coating device is then mounted on the system (for example, on the cartridge assembly). Alternatively, the coating device may be pre-filled with a Donor material such that the coating device may be mounted within the system without, for example, an operator of the laser dispensing system having to fill the coating device. The printing plan is set by the computer and the printing process begins. Once the coating device is empty, additional donor material is loaded into the coating device, or the coating device is replaced with a filled coating device. Once the end of the foil is reached, a new cartridge assembly is mounted on the system. FIGS. 13A and 13B are illustrations of a side view (FIG. 13A) and a top view (FIG. 13B) of a preferred design of a prototype coating device, according to some embodiments of the present disclosure. The prototype coating device includes a dispenser controlled by pressure applied by a pressure tube. The dispenser has dispensing nozzle through which the donor material is applied to the foil. The vertical distance between the foil and the nozzle's outlet port is denoted h1. The prototype coating device also includes a blade that levels the applied donor material. The vertical distance between the blade and the foil (hence the thickness of the donor material layer on the foil) is denoted h2. The linear speed of the foil is denoted v1. The width of the foil is denoted D1. The width of the donor material layer on the foil before leveling (generally corresponding to the diameter of the nozzle) is denoted D2. The width of the donor material layer on the foil once spread by the blade is denoted D3. The quantities h1, h2, D2 and D3 satisfy the relation $D2 \cdot h1 = D3 \cdot h2$, and the volume of donor material that is dispensed equals $D3 \cdot h2 \cdot v1$. The width D3 of the donor material layer can therefore be selected by judicial selection of h1. For example, a value of $D3=15\pm2$ mm, can be achieved by selecting $h1=1.5\pm0.2$ mm, $h2=20$ µm and D2=200 μm. When the motion speed of the foil is 10 mm/s, the volume of donor material that is dispensed in this case is 3 μl/s.

Figure 13C:
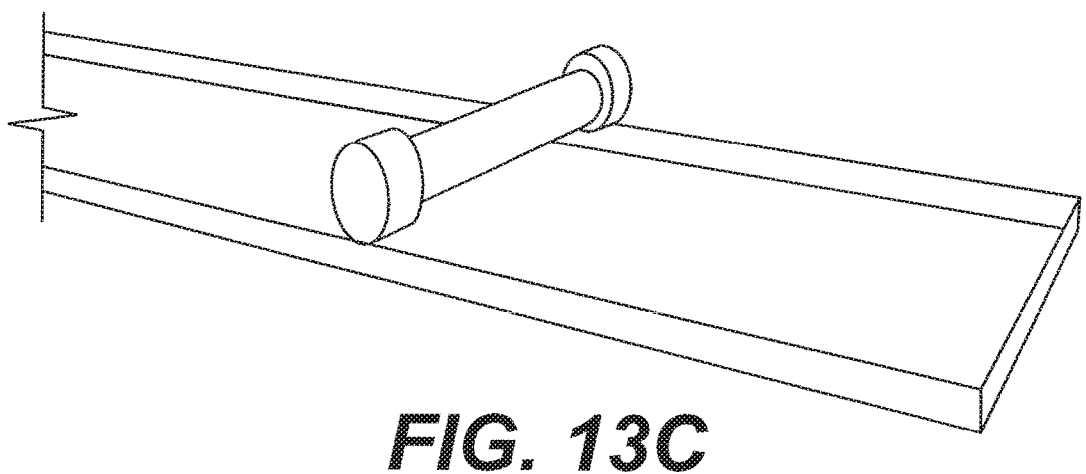
FIGS. 13C and 13D are illustrations of an orthogonal view (FIG. 13C) and a sectional view (FIG. 13D) of a preferred design of a rod coating device, according to some embodiments of the present invention.
Figure 13D:
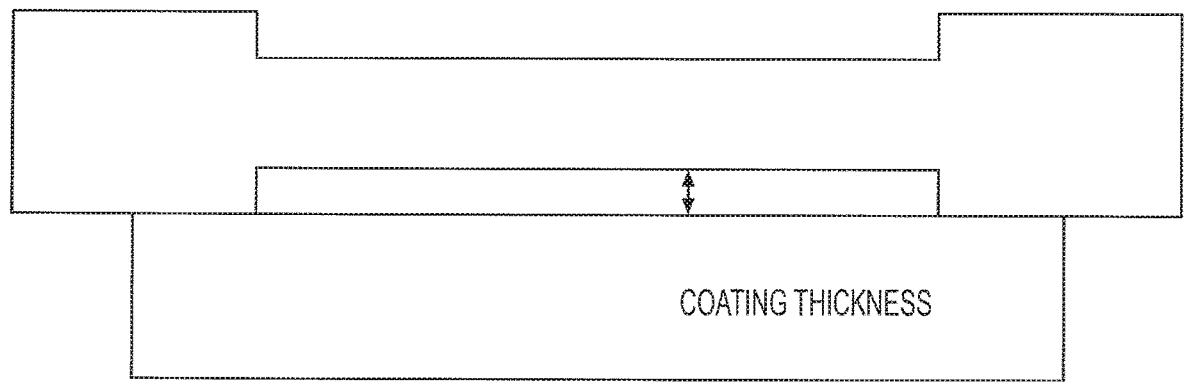

Also, as an alternative to a blade or a rod may be used to level a coating material applied to the foil 18. The rod may be defined by a pair of cylindrical end portions having a connecting cylindrical portion of smaller diameter interposed in between and connecting the pair of cylindrical end portions. Central axes of the cylindrical end portions and connecting cylindrical portion may be aligned with each other. The structure of the rod allows for the coating material to be easily levelled on a surface of the foil. See FIGS. 13C and 13D.

Figure 13E:
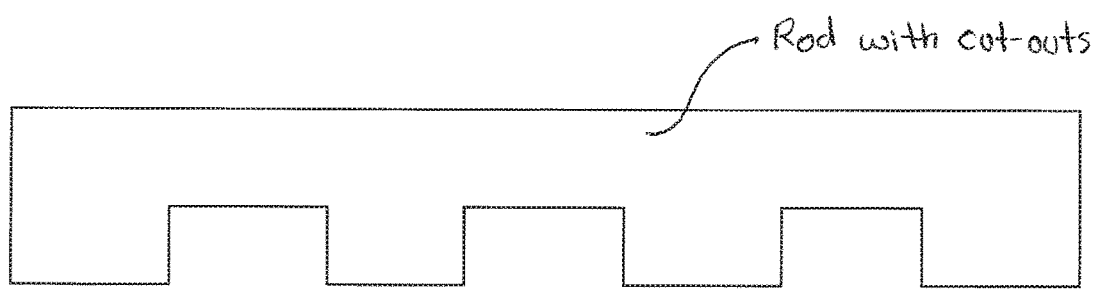
FIG. 13E illustrates a view of a rod coating device that has multiple cut-outs on a surface thereof.

Also, it should be appreciated that the levelling device 70 can be provided in any suitable form. For example, the levelling device may be provided as a roller that is able to rotate in order to spread a coating or as a rod having multiple cut-outs formed in a surface therefore. When provided with multiple cut-outs (See FIG. 13E), the rod may be capable of spreading/levelling multiple different types of coatings while avoiding mixing between the different coatings. Further, regardless of the form, the levelling device may be fixed (or stationary) and/or movable (e.g., able to translate and/or rotate).

Figure 16A:
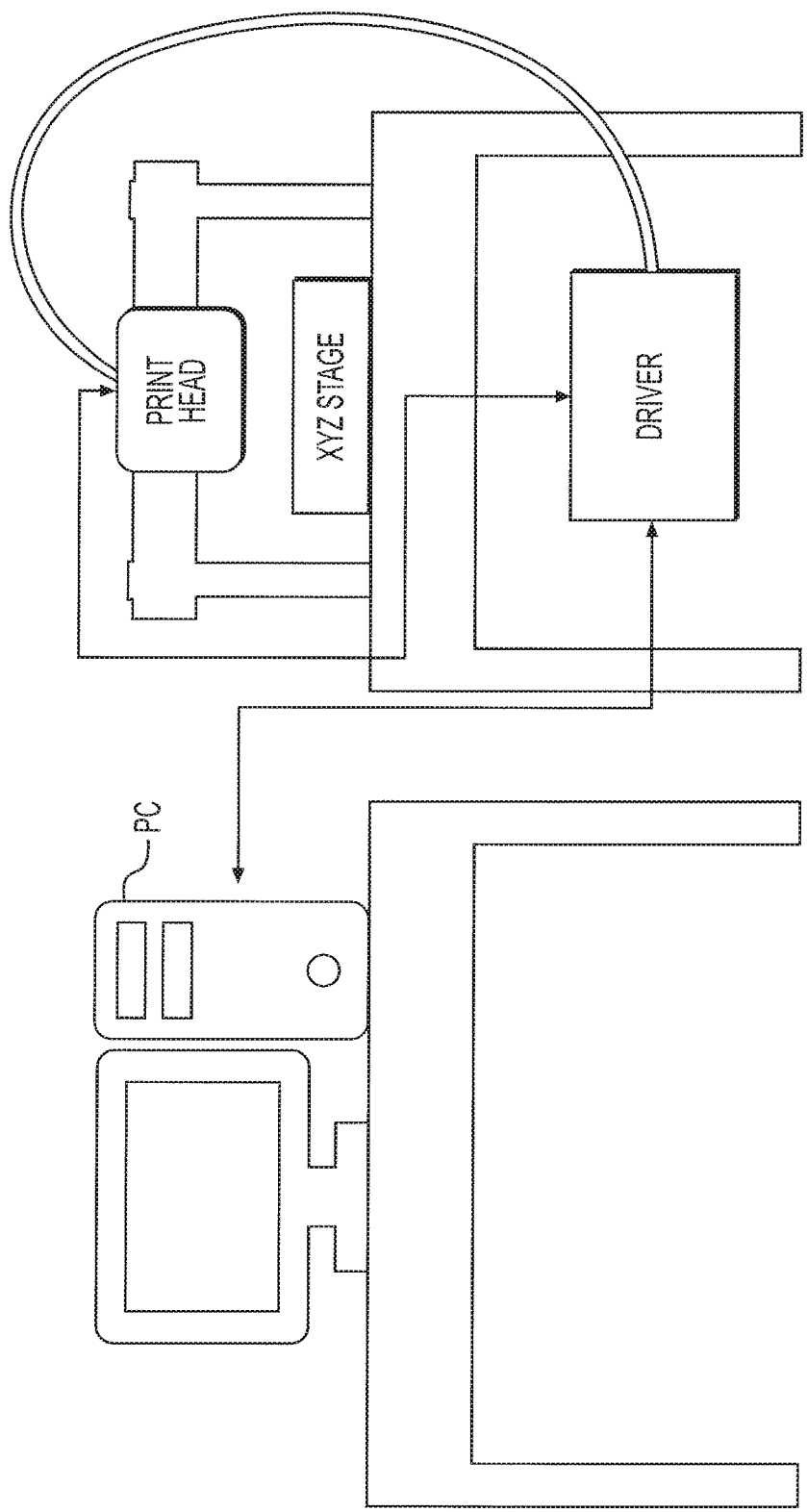
FIGS. 16A and 16B is a schematic illustration of an overall printing arrangement that may incorporate the fiber bundle of FIG. 9A.
Figure 16B:
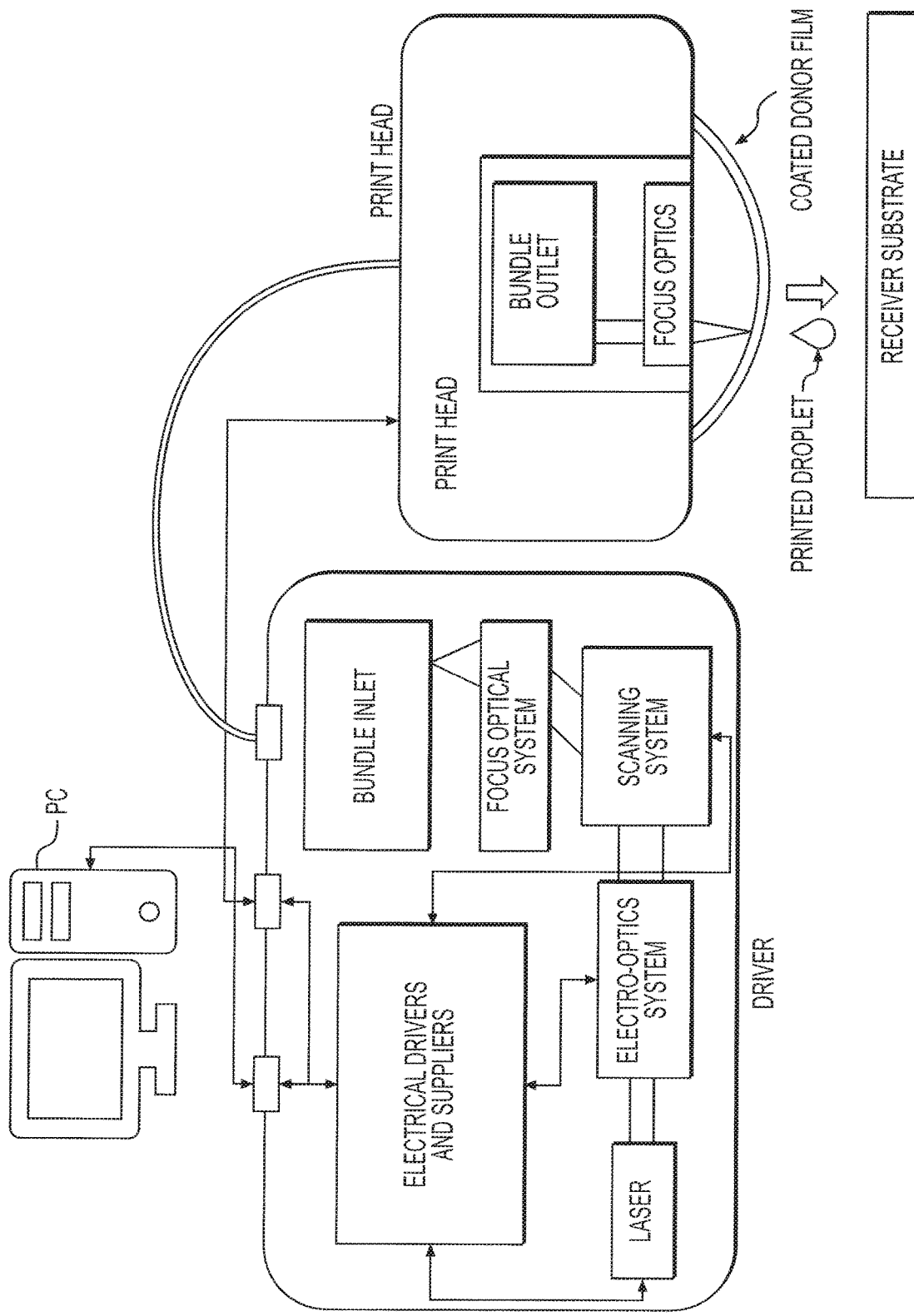

FIGS. 16A and 16B illustrate a non-limiting embodiment of the fiber optical bundle of FIG. 9A being incorporated into a printing system. FIG. 16A illustrates a computer that interfaces with a driver to control a print head. The print head may be decoupled from the driver by using the optical fiber bundle of the present disclosure, thereby minimizing the size of the print head.

As illustrated in FIG. 16B, the optical fiber bundle may be coupled to a driver at a first interface (e.g., optical fiber bundle inlet) and may be coupled to a print head at a second interface (e.g., optical fiber bundle outlet). Focus optics and a coated donor film may also be provided on the print head. Additionally, in order to provide a compact print head, the optical fiber bundle arrangement allows for a scanning system, scanning optics, laser and other components to be provided separately in a driver, thereby allowing the size of the print head to be minimized. The driver may include any necessary hardware and/or software necessary for interfacing between a computer and the print head, and for controlling the laser, electro-optics system, scanning system, and focus optical system. Further, the focus optical system can include any number of lens, mirrors and other optical components suitable for any given focusing operation.

Figure 9E:
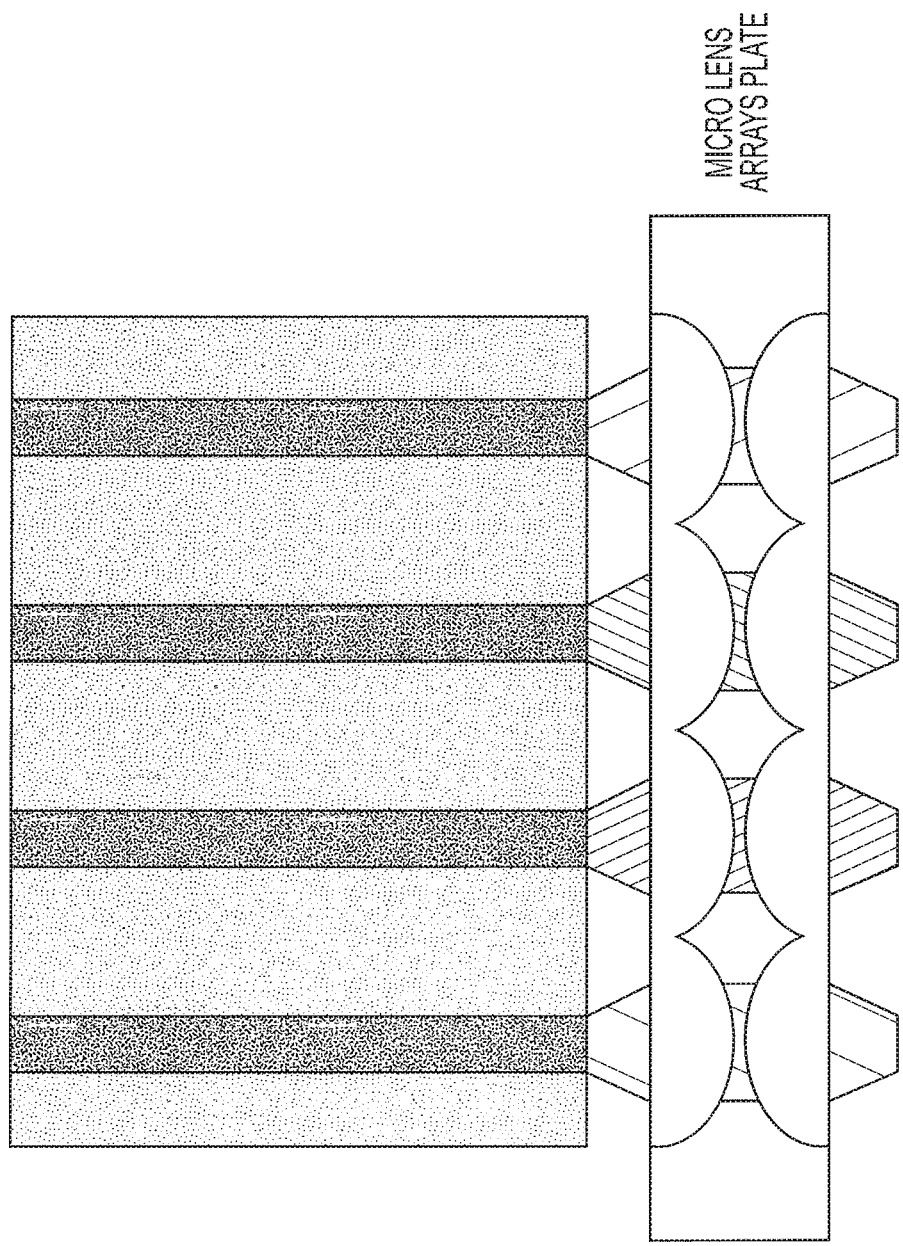

Additionally, focus optics in the form of a micro lens array plate may be provided at the second interface of the fiber bundle so as to provide a "virtual nozzle" array that focuses the light beams on the foil. See, e.g., FIG. 9E.

Figure 9F:
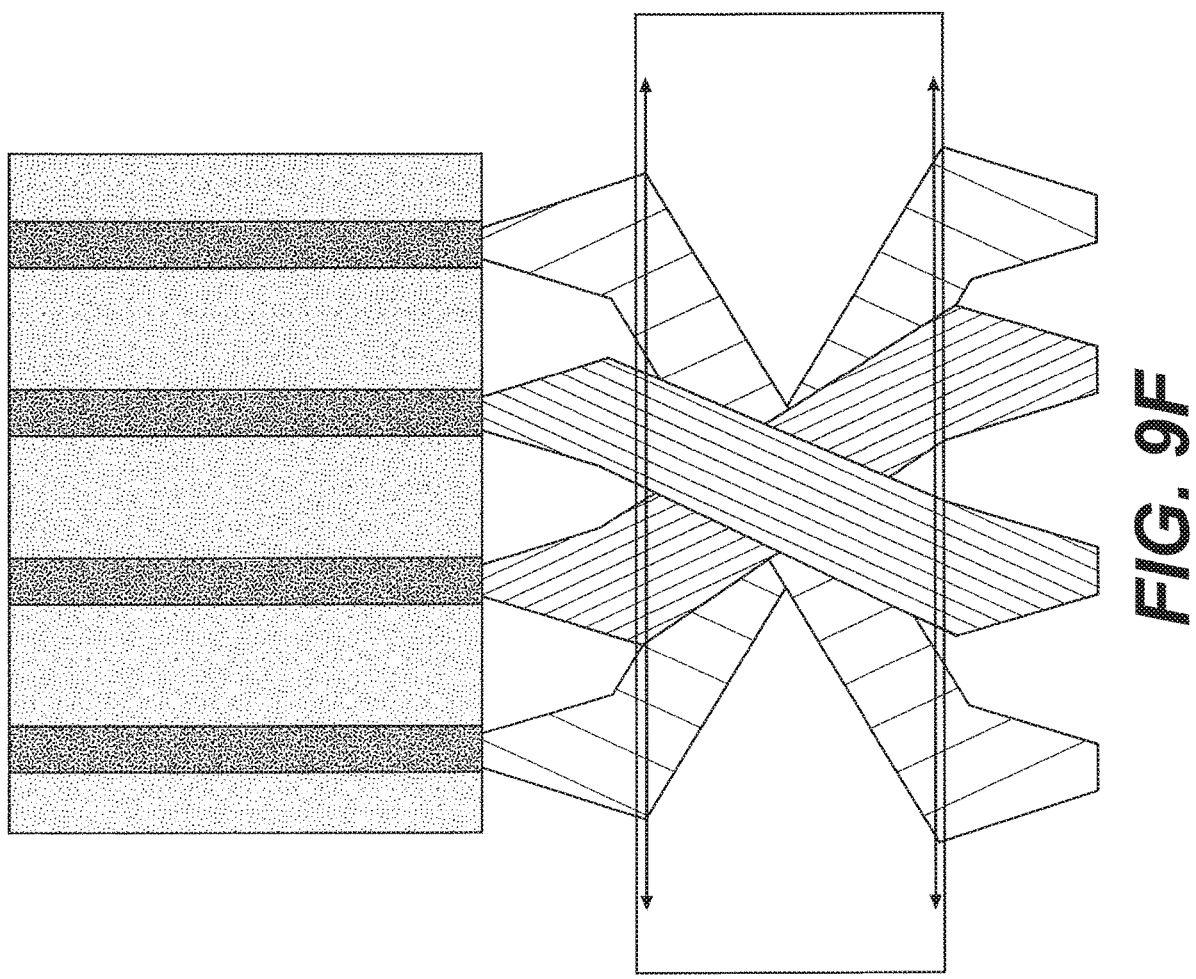

Also, focus optics at the outlet of the optical fiber bundle may be provided to invert an image, e.g., a light beam entering a position at a first interface of the focus optics can be directed along a path such that light beam exits at a position at a second interface of the focus optics that is an inversion of the first point. See, e.g., FIG. 9F. Further, the focus optics could be configured to direct the light beam entering the position(s) at the first interface along any desired path to produce, e.g., as desired arrangement.

Although the present disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A laser-induced dispensing system, comprising:
   a cartridge assembly having a supply reel for supplying a foil having a light transmissive layer wound around the supply reel, and a take-up reel for taking up the foil;
   a coating device for coating the foil by a donor material during a motion of the foil;
   an irradiation head having optics configured for focusing a laser beam; and
   a controller for controlling (i) the cartridge assembly to establish the motion of the foil, and (ii) the optics to focus the laser beam onto the foil at a location downstream of an outlet of the coating device so as to release droplets of the donor material from the foil,
   wherein the foil further comprises a sacrificial protective layer above the light transmissive layer, and
   wherein the cartridge assembly further comprises a lift off reel for lifting off the sacrificial protective layer during the supply of the foil.

2. The laser-induced dispensing system according to claim 1, further comprising a laser induced forward transfer system.

3. The laser-induced dispensing system according to claim 1, wherein the coating device has an inlet for continuously receiving the foil from the supply reel, and a coating section between the inlet and the outlet, wherein the coating of the foil by the donor material occurs in the coating section, and wherein the outlet continuously releases the foil to be taken up by the take-up reel.

4. The laser-induced dispensing system according to claim 3, wherein the coating device comprises a cavity located below the inlet and the outlet for holding the donor material, and a bias mechanism for biasing the donor material towards the foil so as to establish contact between the foil and the donor material during the motion of the foil.

5. The laser-induced dispensing system according to claim 4, wherein the bias mechanism comprises a plunger and a mechanical biasing member for biasing the plunger towards the foil.

6. The laser-induced dispensing system according to claim 4, wherein the bias mechanism comprises a plunger and a pressure port connectable to a pump for applying fluid pressure thereby to bias the plunger towards the foil.

7. The laser-induced dispensing system according to claim 1, wherein the coating device is configured to coat the foil by applying the donor material to the foil from below the foil.

8. The laser-induced dispensing system according to claim 1, wherein the coating device is configured to coat the foil by applying the donor material to the foil from above the foil.

9. The laser-induced dispensing system according to claim 1, wherein the coating device comprises a nozzle for dispensing the donor material onto the foil.

10. The laser-induced dispensing system according to claim 1, wherein the coating device comprises a donor material inlet connectable to a source of donor material for supplying the donor material to the coating device.

11. The laser-induced dispensing system according to claim 1, wherein the coating device comprises a plurality of cavities, each containing a different donor material, and a mixing chamber in fluid communication with each of the cavities for mixing donor materials from different cavities prior to the coating, and wherein the controller is configured for controlling individual pressures within the cavities, the individual pressures being selected to provide a predetermined mixing ratio among the donor materials.

12. The laser-induced dispensing system according to claim 1, further comprising a source of donor material connectable to the coating device via a conduit, and a bidirectional pump for establishing flow of the donor material in the conduit, wherein the controller is configured to control the bidirectional pump in a temporally selective manner.

13. The laser-induced dispensing system according to claim 1, wherein the controller is configured to control the coating device to vary a thickness of the donor material on the foil.

14. The laser-induced dispensing system according to claim 1, further comprising an imaging device for imaging a section of the foil, in situ, before the foil interacts with the laser beam.

15. The laser-induced dispensing system according to claim 1, further comprising a cooling element for cooling the donor material.

16. The laser-induced dispensing system according to claim 15, wherein the cooling is to a temperature above, but within less than 5° C. from, a freezing temperature of the donor material.

17. A laser-induced dispensing system, comprising:
a cartridge assembly having a supply reel for supplying a foil having a light transmissive layer wound around the supply reel, and a take-up reel for taking up the foil;
a coating device for coating the foil by a donor material during a motion of the foil;
an irradiation head having optics configured for focusing a laser beam; and
a controller for controlling (i) the cartridge assembly to establish the motion of the foil, and (ii) the optics to focus the laser beam onto the foil at a location downstream of an outlet of the coating device so as to release droplets of the donor material from the foil,
wherein the foil further comprises a heat conducting layer below the light transmissive layer for transferring heat to the donor material.

18. The laser-induced dispensing system according to claim 17, wherein the foil further comprises a passivation layer below the heat conducting layer.

19. The laser-induced dispensing system according to claim 17, wherein the controller is further configured for activating and deactivating the coating by the coating device.

20. The laser-induced dispensing system according to claim 17, wherein the controller is further configured for controlling the coating device to coat the foil at a predetermined rate.

21. The laser-induced dispensing system according to claim 17, further comprising a waste collector for removing donor material that remains on the foil following the release of the droplets from the foil.

22. The laser-induced dispensing system according to claim 17, wherein the irradiation head comprises a laser source mounted on a body of the irradiation head for generating the laser beam.

23. The laser-induced dispensing system according to claim 17, wherein the optics is configured for coupling the laser beam to the irradiation head from a laser source generating the laser beam and located external to the irradiation head.

24. The laser-induced dispensing system of claim 23, wherein the coupling is by direct propagation of the laser beam.

25. The laser-induced dispensing system of claim 23, wherein the coupling is by an optical waveguide.

26. The laser-induced dispensing system according to claim 17, further comprising a plurality of irradiation heads for generating a plurality of laser beam focal spots.

27. The laser-induced dispensing system according to claim 26, further comprising a beam scanning system configured for scanning the laser beam to selectively couple the laser beam into the irradiation heads.

28. The laser-induced dispensing system according to claim 27, wherein at least two of the irradiation heads comprises an array of optical nozzles for generating the plurality of laser beam focal spots, wherein the at least two irradiation heads are arranged to form a two-dimensional array of the optical nozzles, and wherein the beam scanning system is configured for two-dimensionally scanning the laser beam to selectively couple the laser beam into the optical nozzles of the array.

29. The laser-induced dispensing system according claim 17, wherein the irradiation head comprises an array of optical nozzles for generating a plurality of laser beam focal spots, and the laser-induced dispensing system further comprises a beam scanning system configured for scanning the laser beam to selectively couple the laser beam into the array of optical nozzles.

30. The laser-induced dispensing system of claim 29, wherein the coupling is by a plurality of optical waveguides arranged to form a round shape on an optical coupler.

31. The laser-induced dispensing system of claim 30, further comprising a rotary mirror configured to sequentially focus the laser beam onto respective entry ports of the plurality of optical waveguides.

32. The laser-induced dispensing system according to claim 30, wherein the plurality of optical waveguides are crossed such that adjacent entry ports at the optical coupler correspond to non-adjacent exit ports on the irradiation head.

33. The laser-induced dispensing system according to claim 17, further comprising a beam scanning system configured for scanning the laser beam, wherein the beam scanning system is external to the irradiation head.

34. The laser-induced dispensing system according to claim 17, wherein the coating device comprises a plurality of vertically movable cavities each containing a different donor material, and wherein the controller is configured for vertically displacing the cavities to intermittently generate contact between the foil and the donor material in a respective one of the cavities.

35. The laser-induced dispensing system according to claim 34, wherein the coating device further comprises a mixing chamber in fluid communication with each of the cavities for mixing the donor materials from different cavities prior to the coating, and wherein the controller is configured for controlling individual pressures within the cavities, the individual pressures being selected to provide a predetermined mixing ratio among the donor materials.

\* \* \* \* \*